US012799720B2

(12) United States Patent
Fukuda

(10) Patent No.: US 12,799,720 B2
(45) Date of Patent: Nov. 17, 2026

(54) WORKING VEHICLE AND MANAGEMENT SYSTEM TO MANAGE ATTACHMENTS

(71) Applicant: Kubota Corporation, Osaka (JP)

(72) Inventor: Yuji Fukuda, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 163 days.

(21) Appl. No.: 18/776,442

(22) Filed: Jul. 18, 2024

(65) Prior Publication Data

US 2026/0022539 A1 Jan. 22, 2026

(51) Int. Cl.

| | |
|---|---|
| ***E02F 9/26*** | (2006.01) |
| ***E02F 3/36*** | (2006.01) |
| ***E02F 3/96*** | (2006.01) |
| ***G08C 17/02*** | (2006.01) |

(52) U.S. Cl.

CPC .............. *E02F 9/26* (2013.01); *E02F 3/3663* (2013.01); *E02F 3/968* (2013.01); *E02F 3/3631* (2013.01); *G08C 17/02* (2013.01)

(58) Field of Classification Search

CPC ................................ A01B 76/00; A01B 79/00

See application file for complete search history.

(56) References Cited

U.S. PATENT DOCUMENTS

| | | | | |
|---|---|---|---|---|
| 10,509,100 | B1 * | 12/2019 | Reed | H04W 4/023 |
| 2008/0303669 | A1 * | 12/2008 | Lazo | G06K 19/0717 340/572.1 |
| 2016/0284185 | A1 * | 9/2016 | Maison | G06K 7/00 |
| 2017/0156258 | A1 * | 6/2017 | Reich | A01C 7/084 |
| 2018/0211450 | A1 * | 7/2018 | Gresch | G07C 5/02 |
| 2022/0412040 | A1 * | 12/2022 | Zitterbart | E02F 3/431 |

* cited by examiner

*Primary Examiner* — Jelani A Smith
*Assistant Examiner* — Oluwabusayo Adebanjo Aworunse
(74) *Attorney, Agent, or Firm* — Keating & Bennett, LLP

(57) ABSTRACT

A working vehicle includes a receiver to receive a wireless signal which is transmitted from a transmitter in or on an attachment and which includes identification information and vibration information relating to the attachment, and a controller configured or programmed to, if the vibration information included in the wireless signal does not indicate vibration of the attachment, determine that the attachment from which the wireless signal is transmitted is a not-attached attachment not attached to a hitch, and generate management information and cause a memory and/or a storage to store the management information, the management information being information in which the identification information of the attachment determined as being the not-attached attachment is associated with storage location information indicating a storage location of the not-attached attachment, the storage location information being the vehicle position information acquired by a position detector when the receiver received the wireless signal.

32 Claims, 32 Drawing Sheets

Fig.3

| Attachment ID | Display data |
|---|---|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.4

| Attachment ID | Control data<br>Amount of supply of hydraulic fluid |
|---|---|
| ATT0001 | None |
| ATT0002 | Small |
| ATT0003 | Large |
| ⋮ | ⋮ |

<Attachment information collecting process>

L1

| Name | Attachment ID | Specifications |
|---|---|---|
| Bucket | ATT0001 | Excavation, Large, Total length, Total width, etc. |
| Spreader | ATT0002 | Spreading, Total length, Total width, etc. |
| Skid cutter | ATT0003 | Mowing, Small, Total length, Total width, etc. |
| Pallet fork | ATT00xy | Cargo handling, Total length, Total width, etc. |
| Bucket | ATT00xx | Excavation, Small, Total length, Total width, etc. |
| | ... | ... |

Fig.9

<Telematics process>

Fig.27B

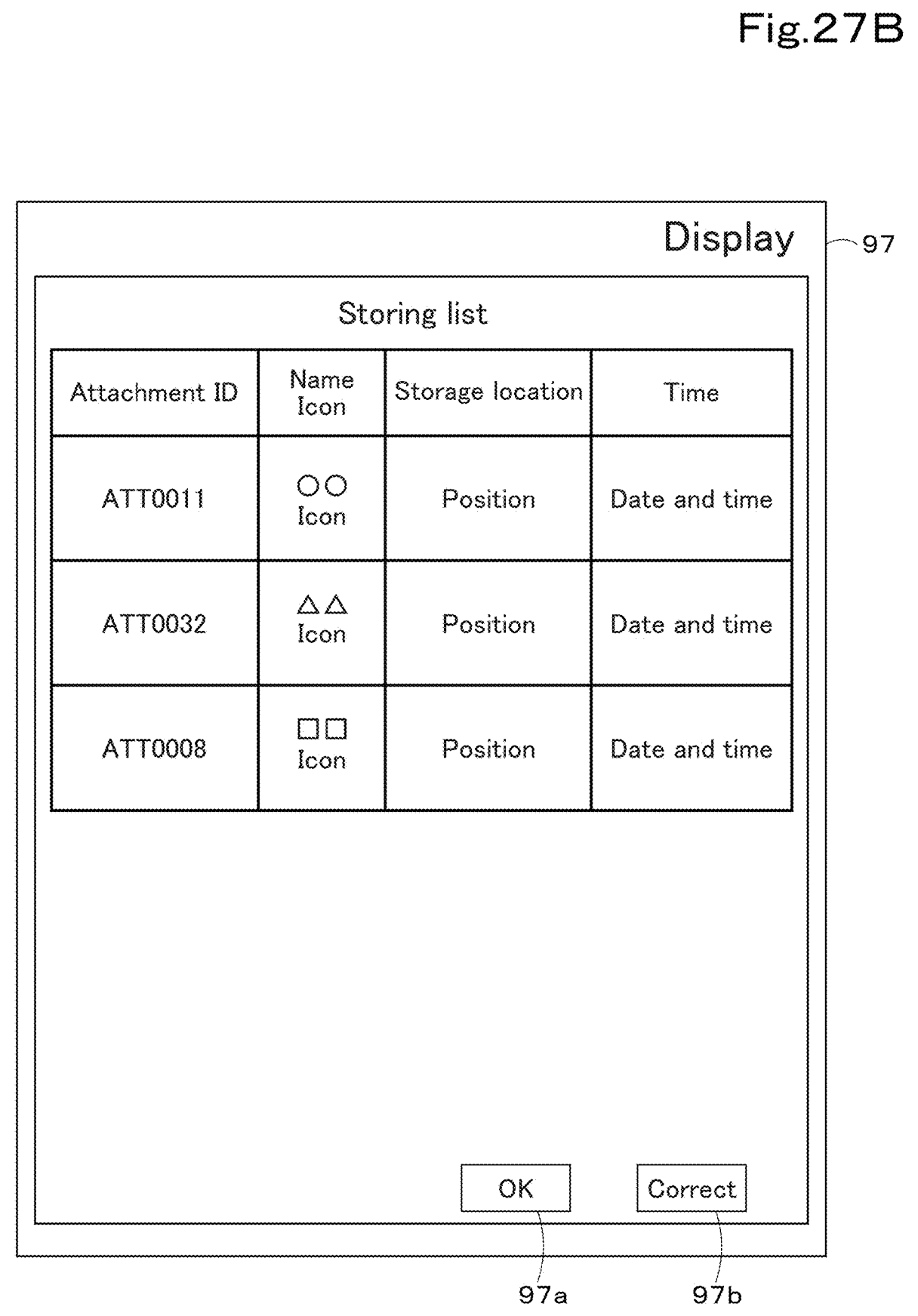

Display 97

Storing list

| Attachment ID | Name Icon | Storage location | Time |
|---|---|---|---|
| ATT0011 | ○○ Icon | Position | Date and time |
| ATT0032 | △△ Icon | Position | Date and time |
| ATT0008 | □□ Icon | Position | Date and time |

OK 97a

Correct 97b

WORKING VEHICLE AND MANAGEMENT SYSTEM TO MANAGE ATTACHMENTS

BACKGROUND OF THE INVENTION

1. Field of the Invention

The present invention relates to techniques to manage attachments relating to working vehicles and management systems.

2. Description of the Related Art

For example, the specification of U.S. Patent Application Publication No. 2022/412040 discloses a system to automatically determine the positions of attachments in the vicinity of a working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit, and transmits the identification information of the attachment to the controller. The controller performs an appropriate operation (work operation) of the working vehicle based on the received identifying signal.

However, in related systems as described above, although it is possible to identify the attachment attached to the working vehicle, it is not possible to identify the storage locations of attachments that are present in the vicinity of the working vehicle but not attached to the working vehicle. Therefore, it is not possible to appropriately manage the attachments that are not attached.

SUMMARY OF THE INVENTION

One or more example embodiments of the present invention make it possible to appropriately manage attachments.

A working vehicle according to an example embodiment of the present invention includes a hitch to attach and detach an attachment thereto and therefrom, a receiver to receive a wireless signal which is transmitted from a transmitter in or on the attachment and which is compliant with a near field communication standard, a position detector to acquire vehicle position information indicating a position of the working vehicle, a memory and/or a storage, and a controller, wherein the wireless signal includes identification information and vibration information relating to the attachment, and the controller is configured or programmed to if the vibration information included in the wireless signal does not indicate vibration of the attachment, determine that the attachment from which the wireless signal is transmitted is a not-attached attachment not attached to the hitch, and generate management information and cause the memory and/or the storage to store the management information, the management information being information in which the identification information of the attachment determined as being the not-attached attachment is associated with storage location information indicating a storage location of the not-attached attachment, the storage location information being the vehicle position information acquired by the position detector when the receiver received the wireless signal.

The working vehicle may further include a first operation switch to be operated to attach the attachment to the hitch. The controller may be configured or programmed to, if the first operation switch is operated and the vibration information included in the wireless signal indicates vibration of the attachment, determine that the attachment from which the wireless signal is transmitted is an attached attachment attached to the hitch, and delete the management information relating to the attachment determined as being the attached attachment.

The working vehicle may further include a second operation switch to be operated to allow the attachment to be detached from the hitch. The controller may be configured or programmed to, if the second operation switch is operated and the vibration information included in the wireless signal from the attachment determined as being the attached attachment does not indicate vibration of the attachment, determine that the attachment from which the wireless signal is transmitted is the not-attached attachment detached from the hitch, and cause the memory and/or the storage to store the management information in which the identification information of the attachment determined as being the not-attached attachment is associated with the storage location information indicating the storage location of the not-attached attachment, the storage location information being the vehicle position information acquired by the position detector when the receiver received the wireless signal.

The controller may be configured or programmed to, if a received signal strength of the wireless signal is greater than a first predetermined value and the vibration information included in the wireless signal does not indicate vibration of the attachment, determine that the attachment is the not-attached attachment.

The working vehicle may further include a time counter. The controller may be configured or programmed to cause the memory and/or the storage to store the storage location information associated with time information measured by the time counter when the receiver received the wireless signal.

The working vehicle may further include an operation switch to be operated to attach the attachment to the hitch and allow the attachment to be detached from the hitch. The controller may be configured or programmed to, if the operation switch is operated to attach the attachment and the vibration information included in the wireless signal indicates vibration of the attachment, determine that the attachment from which the wireless signal is transmitted is an attached attachment attached to the hitch, and delete the management information relating to the attachment determined as being the attached attachment.

The controller may be configured or programmed to, if the operation switch is operated to allow the attachment to be detached and the vibration information included in the wireless signal from the attachment determined as being the attached attachment does not indicate vibration of the attachment, determine that the attachment from which the wireless signal is transmitted is the not-attached attachment detached from the hitch, and cause the memory and/or the storage to store the management information in which the identification information of the attachment determined as being the not-attached attachment is associated with the storage location information indicting the storage location of the not-attached attachment, the storage location information being the vehicle position information acquired by the position detector when the receiver received the wireless signal.

The controller may be configured or programmed to cause the memory and/or the storage to store the storage location information associated with time information measured by the time counter when the receiver received the wireless signal.

The working vehicle may further include a communicator to perform data communication with an external information processor. The controller may be configured or programmed to cause the communicator to transmit the management information stored in the memory and/or the storage to the external information processor.

The controller may be configured or programmed to cause the communicator to transmit, to the external information processor at one or more first intervals, the vehicle position information, attached attachment information relating to the attachment which is attached, and the management information.

The controller may be configured or programmed to delete, from the memory and/or the storage, the vehicle position information, the attached attachment information, and the management information transmitted from the communicator to the external information processor.

The working vehicle may further include a time counter. The controller may be configured or programmed to, if determining that the attachment is an attached attachment, cause the memory and/or the storage to store the attached attachment information including information in which the identification information of the attachment determined as being the attached attachment is associated with acting time information relating to the attachment, the acting time information being determined by time information measured by the time counter and relating to a time period during which the attachment has been in action.

The working vehicle may further include a hydraulic fluid outlet port to supply hydraulic fluid to the attachment. The acting time information relating to the attachment may be total time information indicating a total time for which hydraulic fluid has been delivered from the hydraulic fluid outlet port to the attachment.

The receiver may be operable to receive an object wireless signal transmitted from a transmitter in or on an object to be transported by the attachment. The object wireless signal may include object information relating to the object. The controller may be configured or programmed to, when in a transported-object management mode, determine that a position indicated by the vehicle position information acquired by the position detector when a load on the attachment reached a predetermined value or below is a drop-off position at which the object indicated by the object information included in the object wireless signal was unloaded from the attachment.

The controller may be configured or programmed to switch from an attachment management mode in which the attachment is managed to the transported-object management mode when the identification information of the attachment indicates a specific attachment or when a user selects the specific attachment, and make a determination regarding the object using the object wireless signal from the object instead of the wireless signal from the attachment.

The controller may be configured or programmed to cause the memory and/or the storage to store object management information in which the object information and placement information indicating the drop-off position are associated with each other.

The working vehicle may further include a time counter. The controller may be configured or programmed to cause the memory and/or the storage to store the placement information associated with time information measured by the time counter when the receiver received the object wireless signal.

The working vehicle may further include a communicator to perform data communication with an external information processor. The controller may be configured or programmed to cause the communicator to transmit the object management information to the external information processor.

The working vehicle may further include a communicator to perform data communication with an external information processor. The controller may be configured or programmed to cause the communicator to transmit, to the external information processor at one or more first intervals, the vehicle position information and attached attachment information relating to the attachment which is attached.

A management system according to an example embodiment of the present invention includes a working vehicle, and an information processor external to the working vehicle, wherein the working vehicle includes a prime mover, a hitch to attach and detach an attachment thereto and therefrom using power from the prime mover, a receiver to receive a wireless signal which is transmitted from a transmitter in or on the attachment and which is compliant with a near field communication standard, a controller, a position detector to acquire vehicle position information indicating a position of the working vehicle, and a communicator to perform data communication with the information processor, wherein the wireless signal includes identification information and vibration information relating to the attachment, the controller is configured or programmed to cause the communicator to transmit, to the information processor at one or more first intervals, the vehicle position information and attached attachment information relating to the attachment which is attached, and the information processor is configured or programmed to, when the information processor stops receiving the vehicle position information and the attached attachment information because of stoppage of the prime mover of the working vehicle, store, as storage location information indicating a storage location of the attachment attached to the working vehicle, the vehicle position information last received.

The management system may further include a portable terminal. The information processor may be configured or programmed to cause the communicator to transmit, to the portable terminal, the storage location information indicating the storage location of the attachment.

The information processor may be configured or programmed to, if the information processor receives the vehicle position information and the attached attachment information at one or more second intervals longer than the one or more first intervals because of stoppage of the prime mover of the working vehicle, store, as the storage location information indicating the storage location of the attachment attached to the working vehicle, the vehicle position information received at the one or more second intervals.

The management system may include the above-described working vehicle, and a portable terminal. The portable terminal may include a terminal receiver to receive the wireless signal transmitted from the transmitter in or on the attachment, a terminal position detector to acquire terminal position information indicating a position of the portable terminal, a terminal memory and/or a storage, and a terminal controller. The terminal controller may be configured or programmed to, if the vibration information included in the wireless signal does not indicate vibration of the attachment, determine that the attachment from which the wireless signal is transmitted is the not-attached attachment, and generate management information and cause the terminal memory and/or a storage to store the management information, the management information being information in which the identification information of the attachment determined as being the not-attached attachment is associated with storage location information indicating a storage location of the not-attached attachment, the storage location information being the terminal position information acquired by the terminal position detector when the terminal receiver received the wireless signal.

The terminal controller may be configured or programmed to prepare a storing list including the management information and cause the terminal memory and/or a storage to store the storing list.

The terminal controller may be configured or programmed to exclude, from the storing list, the identification information of the attachment determined as being an attached attachment.

The portable terminal may include a terminal time counter. The terminal controller may be configured or programmed to associate the identification information of the attachment determined as being the not-attached attachment with time information measured by the terminal time counter when the terminal position detector acquired the terminal position information.

The portable terminal may include a terminal communicator to perform data communication with an external information processor. The terminal controller may be configured or programmed to cause the terminal communicator to transmit the storing list to the external information processor.

The terminal controller may be configured or programmed to determine that the attachment is an attached attachment if the vibration information included in the wireless signal indicates vibration of the attachment and the identification information of the attachment indicated by attached attachment information received by the terminal communicator from the external information processor matches the identification information included in the wireless signal.

The terminal controller may be configured or programmed to determine that the attachment is a moved attachment moved by a carrier if the vibration information included in the wireless signal indicates vibration of the attachment and the identification information of the attachment indicated by the attached attachment information received by the terminal communicator from the external information processor does not match the identification information included in the wireless signal.

The portable terminal may include a display. The terminal controller may be configured or programmed to approve the storing list upon receipt of an instruction to approve the storing list displayed on the display from a user, and correct the storing list upon receipt of an instruction to correct the storing list displayed on the display from the user.

The transmitter may include a beacon transmitter to periodically transmit an advertisement signal including the identification information and the vibration information relating to the attachment in or on which the transmitter is provided. The terminal receiver may include a beacon scanner to receive the advertisement signal.

The terminal controller may be configured or programmed to determine whether the attachment from which the advertisement signal is transmitted is the not-attached attachment based on the vibration information included in the advertisement signal received by the terminal receiver in a predetermined period of time from when an instruction to start preparing a storing list was provided.

The predetermined period of time may be an interval at which the advertisement signal is transmitted, the interval starting when the instruction to start preparing the storing list is provided.

The above and other elements, features, steps, characteristics and advantages of the present invention will become more apparent from the following detailed description of example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 3 is a diagram showing an example of the relationship between attachment IDs and their corresponding pieces of display data.

FIG. 4 is a diagram showing an example of the relationship between attachment IDs and their corresponding pieces of control data.

FIG. 9 is a screen showing an example of an attachment list.

FIG. 27B is a diagram showing an example of a storing list displayed on a display.

DETAILED DESCRIPTION OF THE EXAMPLE EMBODIMENTS

Figure 1:
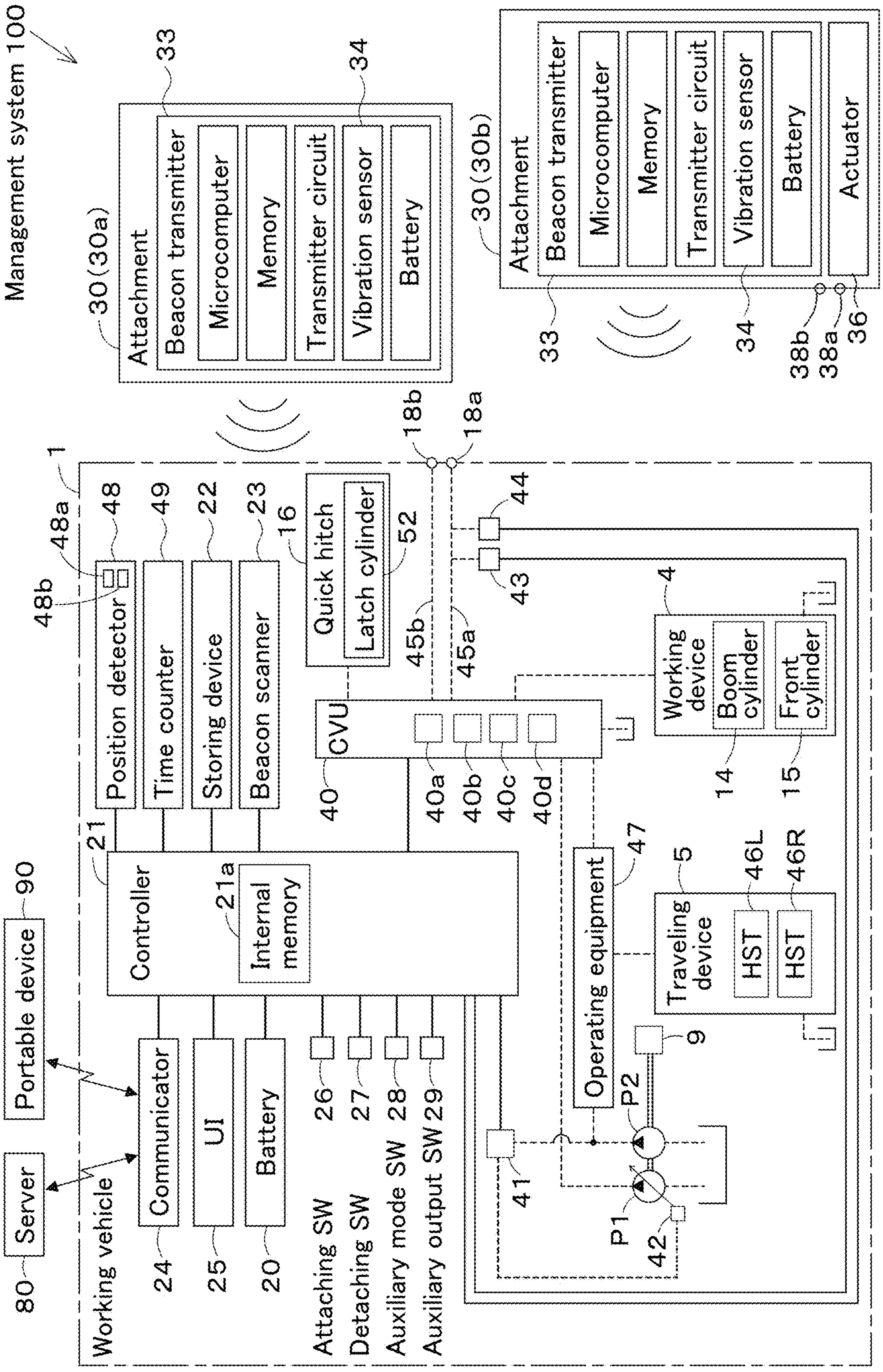
FIG. 1 is a block diagram of a management system and a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings as needed.

Figure 19:
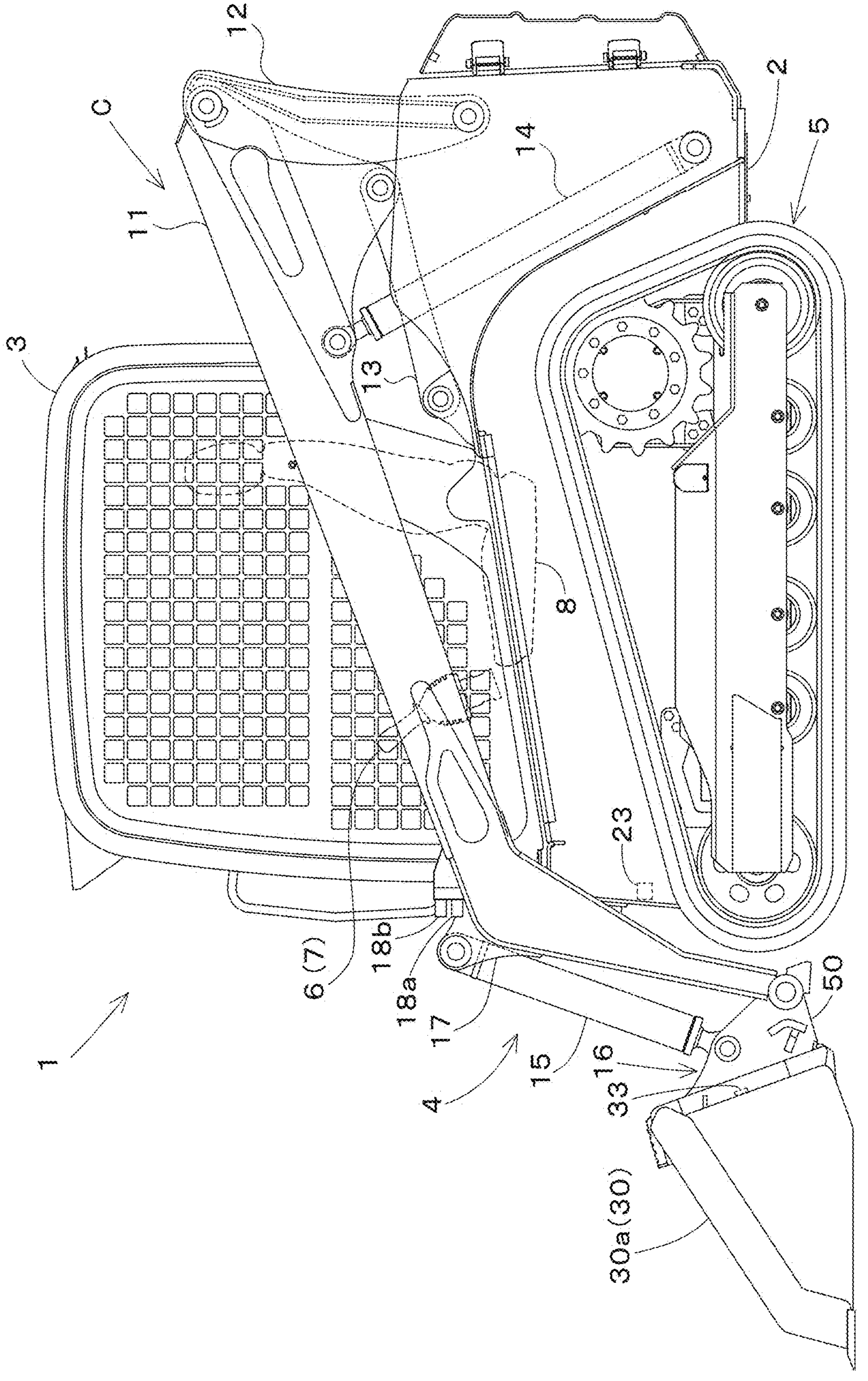
FIG. 19 is a side view of a working vehicle.

FIG. 19 is a side view of a working vehicle 1 according to the present example embodiment. In the present example embodiment, a compact track loader is discussed as an example of the working vehicle 1. Note, however, that the working vehicle according to a example embodiment of the present invention is not limited to a compact track loader, and may be, for example, some other construction machine or agricultural machine such as a skid-steer loader, a backhoe, or a tractor.

The working vehicle 1 includes a machine body 2, a cabin 3, a working device 4, and traveling device(s) 5. The cabin 3 is provided on the machine body 2. The cabin 3 includes a seat 8, operation members (manual operators) to be operated by an operator seated on the seat 8, and/or the like. The operation members include a travel operator 6 to operate the traveling devices 5 and a work operator 7 to operate the working device 4.

The traveling devices 5 are provided on the left and right sides of the machine body 2 and support the machine body 2 such that the machine body 2 is allowed to travel. The traveling devices 5 are crawler traveling devices. The operator operates the travel operator 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right. Note that the traveling devices 5 are not limited to the crawler traveling devices and may be tire traveling devices.

The working device 4 is attached to the machine body 2. The working device 4 includes an attachment 30, a linkage 16, and a position changer C. The attachment 30 is, for example, a working tool such as a bucket 30*a*, and can be attached to and detached from the linkage 16. Examples of attachments 30 other than the bucket 30*a* include earth augers, angle brooms, crushers, grapples, cold planers, sweepers, skid cutters, skid graders, stump grinders, snow blowers, snow pushers, spreader, dozer blades, trenchers, breakers, pallet forks, hopper brooms, mowers, rippers, loader booms, rotary tillers, bale grabs, and bale handlers. Attachments 30 of each type may have different specifications such as work content, structures, sizes and/or shapes.

The linkage 16 is provided on the position changer C to attach and detach an attachment 30 thereto and therefrom. The position changer C is provided with the linkage 16, and changes the relative position between the linkage 16 and the machine body 2. A first end portion (rear end portion) of the position changer C is connected to the machine body 2, and the linkage 16 is provided on a second end portion (front end portion) of the position changer C. The position changer C is operable to, for example, cause the linkage 16 to move up and down and/or change the relative position between the linkage 16 and the machine body 2 to move the position of the attachment 30 connected to the linkage 16.

In the present example embodiment, the position changer C includes boom(s) 11, lift link(s) 12, control link(s) 13, boom cylinder(s) 14, and front cylinder(s) 15. The booms 11, the lift links 12, the control links 13, the boom cylinders 14, and the front cylinders 15 are provided at the left and right of the cabin 3. The left and right booms 11 are connected to each other by a connector 17 at an intermediate portion of their front portion. The left boom 11 has, at the front portion thereof, a hydraulic fluid outlet port (power output port) 18*a* and a hydraulic fluid inlet port 18*b*.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the machine body 2 via a shaft. Upon operation of the work operator 7 along a first direction by the operator of the working vehicle 1, the boom cylinders 14 extend or retract and the booms 11 ascend or descend (swing upward or downward).

Note that the position changer C mentioned above is an example and that this does not imply any limitation. For example, in the case where the working vehicle is a backhoe, the position changer C includes an arm and a boom and the like, and in the case where the working vehicle is a tractor, the position changer C includes a lifting device such as a three-point linkage.

The following details the linkage 16. The linkage 16 includes, for example, a quick hitch (hitch) to attach and detach an attachment 30 thereto and therefrom. The booms 11 are provided with the quick hitch 16 at the distal ends thereof. The quick hitch 16 is a linkage configured to easily attach and detach any of various attachments (hydraulic driven working tools) 30 such as the bucket 30*a*. The user of the working vehicle 1 can easily change attachments 30 using the quick hitch 16. The quick hitch 16 is therefore also called "quick changer". In the example shown in FIG. 19, the bucket 30*a* which is an example of the attachment 30 is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operator 7 along a second direction by the operator, the front cylinders 15 extend or retract and the quick hitch 16 swings upward or rearward. With this, the bucket 30*a* attached to the quick hitch 16, swinging upward or downward, performs shoveling or dumping.

Figure 20:
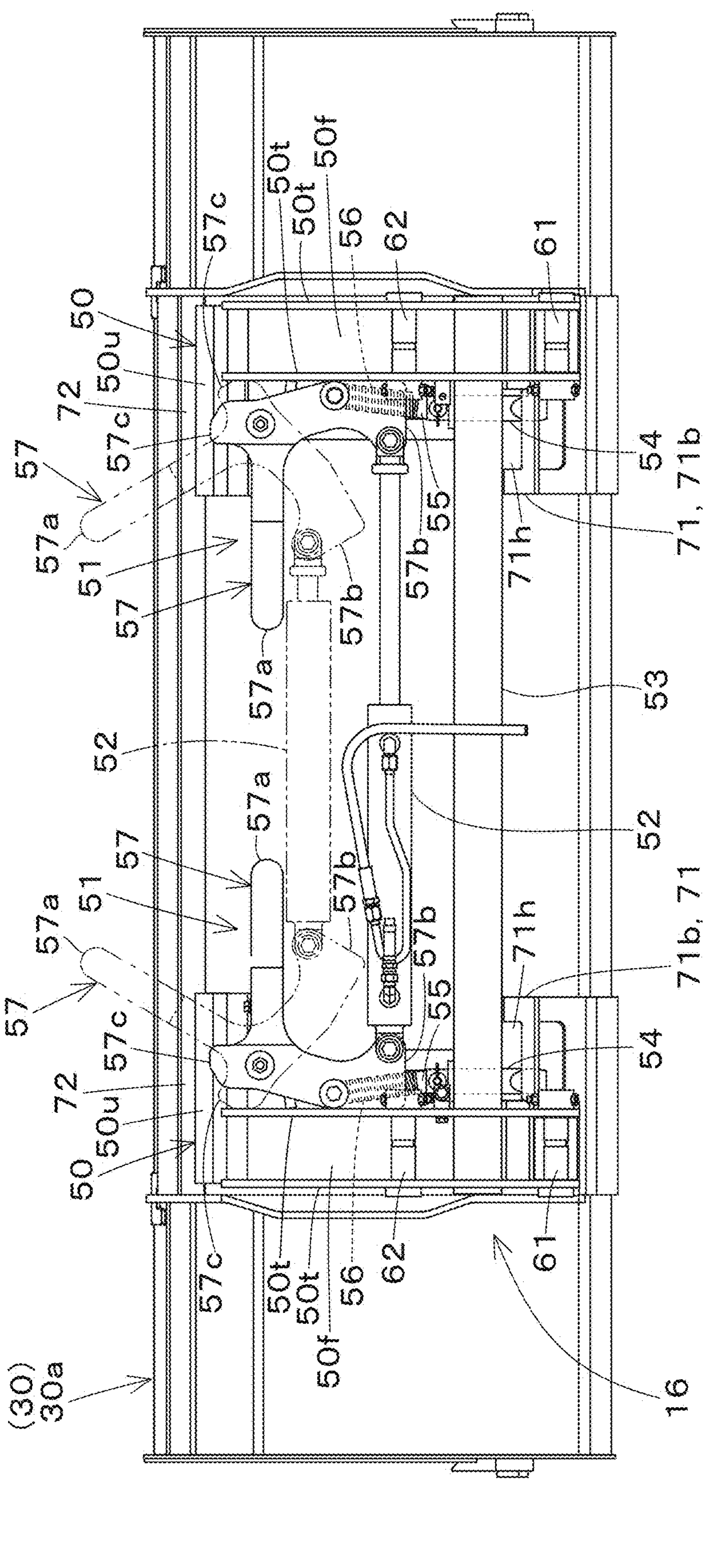
FIG. 20 is an elevational view of a quick hitch.
Figure 21A:
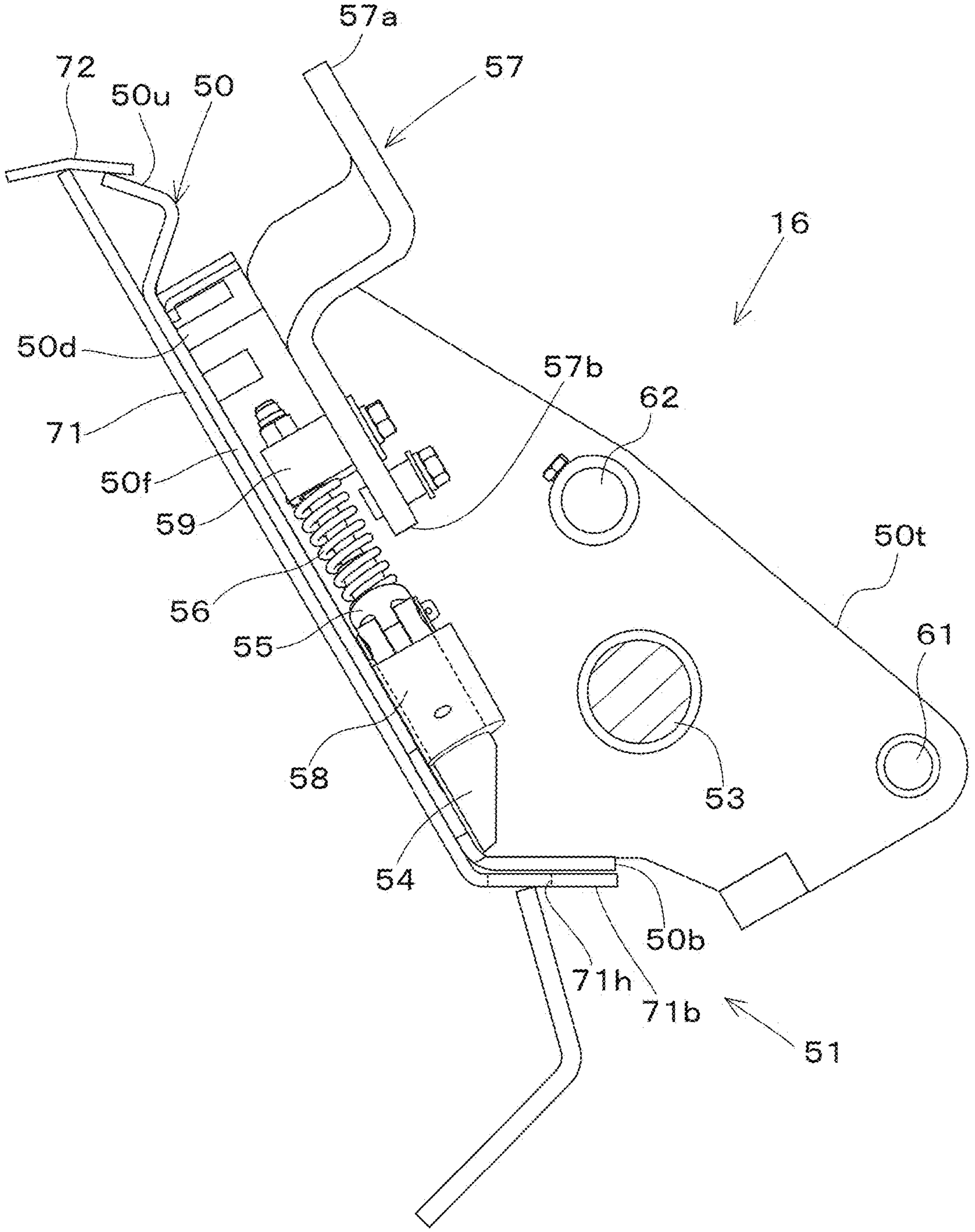
FIG. 21A is a side view of an attachment unlatched by a quick hitch.
Figure 21B:
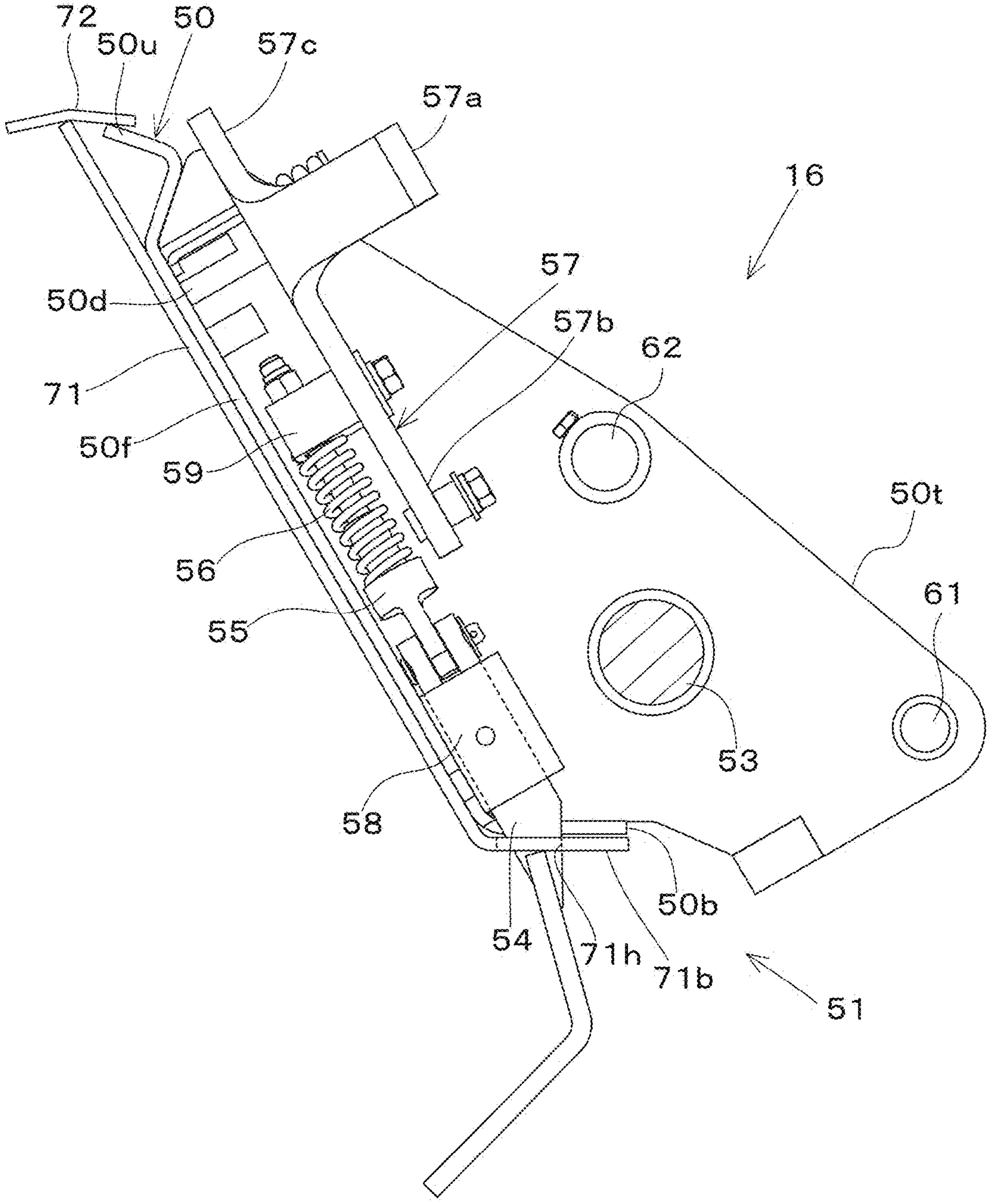
FIG. 21B is a side view of an attachment latched by a quick hitch.

FIG. 20 is an elevational view of the quick hitch 16. Specifically, FIG. 20 illustrates the quick hitch 16 in FIG. 19 as viewed from the machine body 2 of the working vehicle 1. FIG. 21A is a side view illustrating the quick hitch 16 in an unlatching state. FIG. 21B is a side view illustrating the quick hitch 16 in a latching state.

The quick hitch 16 includes a pair of left and right brackets 50, a pair of left and right latching mechanisms 51, a latch cylinder 52, and the like. The brackets 50 hold the attachment 30. The latching mechanisms 51 are selectively operable in a latching state in which the attachment 30 is secured to the brackets 50 (quick hitch 16) or an unlatching state in which the attachment 30 is allowed to be detached from the brackets 50. The latch cylinder 52 is a latch actuator to place the latching mechanisms 51 selectively in the latching state or the unlatching state.

As illustrated in FIG. 21A, each of the brackets 50 includes a front plate 50*f* and a pair of connector plates 50*t* projecting rearward from the front plate 50*f*. The connector plates 50*t* have pivotally connected thereto the distal ends of the left and right booms 11 (FIG. 19) via shafts 61, and have pivotally connected thereto ends of the left and right front cylinders 15 (FIG. 19) via shafts 62. The connector plates 50*t* are connected to a beam 53, so that the pair of brackets 50 are combined.

The front plate 50*f* of each of the brackets 50 includes an upper portion 50*u* bent in the form of the letter V as illustrated in FIG. 21A. The front plate 50*f* includes a lower portion 50*b* bent such that the lower portion 50*b* projects diagonally rearward. A top plate 72 bent downward is provided above a base plate 71 of the attachment 30. The base plate 71 includes a lower portion 71*b* bent such that the lower portion 71*b* projects diagonally rearward. The lower portion 71*b* of the base plate 71 has a through-hole 71*h*.

The upper portions 50*u* of the front plates 50*f* of the brackets 50 are inserted into the gap between the base plate 71 and the top plate 72 of the attachment 30 and engage with the back surface of the top plate 72, the front surfaces of the front plates 50*f* engage with the base plate 71, and the lower portions 50*b* of the front plates 50*f* engage with the lower portion 71*b* of the base plate 71. With this, the attachment 30 is held by the brackets 50.

The latching mechanisms 51 are located inward of the connector plates 50*t* of the brackets 50 in FIG. 20. Each of the latching mechanisms 51 includes, as illustrated in FIG. 21A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 20. The latch lever 57 includes a bent intermediate portion which is rotatably connected to a mount 50*d* on a corresponding bracket 50 via pin(s) as illustrated in FIG. 21A. The latch lever 57 includes a first projecting portion 57*a* which projects inward from corresponding connector plates 50*t* as illustrated in FIG. 20. The latch lever 57 includes a second projecting portion 57*b* projecting downward. The second projecting portion 57*b* has, connected to a back surface of a central portion thereof, the holder 59 via pin(s) as illustrated in FIG. 21A. The latch lever 57 includes a third projecting portion 57*c* which projects upward as illustrated in FIG. 20.

The latch cylinder 52 is a hydraulic cylinder which is positioned laterally and located above the beam 53. The latch cylinder 52 has a first end (distal end of the rod) pivotally connected to the distal end portion of the second projecting portion 57*b* of one of the latch levers 57 (right latch lever 57 in FIG. 20) via pin(s). The latch cylinder 52 has a second end (bottom of the cylinder case) pivotally connected to the distal end portion of the second projecting portion 57*b* of the other of the latch levers 57 (the left latch lever 57 in FIG. 20) via pin(s).

The retraction of the latch cylinder 52, as indicated by dot-dot-dash lines in FIG. 20, causes the second projecting portions 57*b* of the left and right latch levers 57 to approach each other, causing the latch levers 57 to pivot upward. Then, as illustrated in FIG. 21A, the links 55 and the latch pins 54 move upward and the latch pins 54 detach from the through-holes 71*h* in the base plate 71 of the attachment 30.

With this, the latching mechanisms 51 are placed in their unlatching state (also referred to as "unlock state") in which the latching mechanisms 51 do not hold the attachment 30, allowing the attachment 30 to be detached from the quick hitch 16. The third projecting portions 57*c* of the latch levers 57 contact corresponding connector plates 50*t* of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 20 from the state as illustrated in FIG. 21A, the second projecting portions 57*b* of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 21B, the latch pins 54 are inserted in the through-holes 71*h* in the base plate 71 of the attachment 30, so that the inclined surfaces of the latch pins 54 contact the side walls of the through-holes 71*h*.

With this, the latching mechanisms 51 are placed in their latching state (also referred to as "lock state") in which the latching mechanisms 51 hold the attachment 30, and the attachment 30 is attached to the quick hitch 16. The second projecting portions 57*b* of the latch levers 57 contact corresponding connector plates 50*t* of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57*a* of the latch levers 57 are positioned horizontally, the user seated on the seat 8 of the working vehicle 1 confirms that the attachment 30 is attached to the quick hitch 16 (working vehicle 1) by looking at the horizontally positioned first projecting portions 57*a*.

Starting from the state as illustrated in FIG. 19 in which the bucket 30*a* is attached to the quick hitch 16, the bucket 30*a* is detached and another attachment 30 is attached to the quick hitch 16. This makes it possible to perform work other than excavation (or some other excavation work) using the other attachment 30.

FIG. 1 is a block diagram of a management system 100 and the working vehicle 1 according to the present example embodiment. The management system 100 includes the working vehicle(s) 1 and attachment(s) 30. The example in FIG. 1 includes one working vehicle 1 and two attachments 30, but the number of working vehicles 1 and the number of attachments 30 included in the management system 100 may be selected appropriately.

The working vehicle 1 includes a controller 21, storing device(s) 22 (one or more memories and/or one or more storage(s)), a receiver 23, a communicator 24, a user interface (indicated as "UI" in FIG. 1) 25, a battery 20, switches (each indicated as "SW" in FIGS. 1) 26 to 29, and/or the like.

The controller 21 may include a processing circuit that includes one or more processors. The controller 21 is configured or programmed to control the working vehicle 1 and perform various controls relating to the working vehicle 1. The controller 21 is communicably connected to devices in or on the working vehicle 1 via in-vehicle network(s) such as CAN, ISOBUS, LIN, and/or FlexRay.

The controller 21 includes one or more memories, analog circuits, digital circuits, and/or the like. The one or more memories contain (store) software program(s) to be executed by one or more processors, and various data. Specifically, among the one or more memories included in the controller 21, the memory 21*a* (internal memory) is a volatile or nonvolatile memory. The controller 21 uses, for example, a predetermined storage area of the memory 21*a* which is a volatile memory as a buffer for temporary storage of information and data.

The controller 21 is communicably connected to the storing device 22 (nonvolatile memory), and the storing device 22 is provided externally to the controller 21. The memory 21*a* and the storing device 22 store software program(s) and control data for the controller 21 to control the operation of each element. The storing device 22 stores pieces of control data corresponding to various types of attachments 30.

The controller 21 is configured or programmed to read software program(s) and control data from the storing device 22, and perform various processes based on the software program(s) and the control data, via one or more processors. Note that the controller 21 may be configured or programmed to also perform various processes based on predetermined logic circuit(s) via one or more processors.

Examples of the processors include central processing unit (CPU), graphics processing unit (GPU), digital signal processor (DSP), field programmable gate array (FPGA), and application specific integrated circuit (ASIC).

Note that the controller 21 may include a plurality of physically separated processors cooperating to perform various processes, and the structure thereof is not limited to those described above. In such a case, the plurality of processors are provided in or on respective one or more computers physically separated from the working vehicle 1, and are communicably connected to each other via a network such as an in-vehicle network, LAN, WAN, or the Internet.

The software program(s) may be stored in recording medium (media) (nonvolatile memory (memories) such as HDD, SSD, CD-ROM, and/or DVD-ROM) communicably connected to the controller 21 and/or external server device(s) connected to the controller 21 via a network, and may be installed from the medium, the server device, and/or the like into the memory.

The receiver 23 is a device to receive wireless signals compliant with a near field communication standard. Specifically, the receiver 23 is a beacon scanner to receive wireless signals (beacon signals) compliant with Bluetooth (registered trademark) Low Energy which is a near field communication standard. The beacon scanner 23 measures the received signal strength indicator (RSSI, received signal strength) of the received wireless signals. Note that RSSI may be hereinafter simply referred to as received signal strength. The beacon scanner 23 is provided in or on the machine body 2.

The communicator 24 is a communication module to perform data communication with external information processor(s) external to the communicator 24 of the working vehicle 1 (such as the server 80) via the Internet and/or a wireless LAN, etc.

The external information processor is the server 80 here, but the external information processor may be, for example, a desktop (stationary) computer or a laptop (portable) computer.

The management system 100 may include a portable terminal 90. The portable terminal 90 is a smartphone or a tablet computer and/or the like. The communicator 24 can communicate data with the portable terminal 90.

The user interface 25 includes, for example, a touchscreen and/or the like. As another example, the user interface may include an input and an output independent of each other.

The working vehicle 1 includes a position detector 48 to acquire vehicle position information indicating the position of the working vehicle 1 (machine body 2). The position detector 48 includes, for example, a receiver 48*a* and an inertial measurement unit 48*b* (IMU). The receiver 48*a* receives satellite signal(s) (positions of positioning satellites, time of transmission, correction information, etc.) sent from satellite positioning system(s) (positioning satellites) such as D-GPS, GPS, GLONASS, BeiDou, Galileo, Michibiki, etc. The position detector 48 detects the current position (for example, latitude and longitude) based on the satellite signal(s) received by the receiver 48*a*. That is, the position detector 48 detects the position of the working vehicle 1 (machine body 2). The inertial measurement unit 48*b* includes acceleration sensor(s), gyroscope sensor(s), and/or the like. The inertial measurement unit 48*b* detects the roll angle, the pitch angle, the yaw angle and/or the like of the working vehicle 1 (machine body 2).

The working vehicle 1 includes a time counter 49 to acquire time information (time point information). The time counter 49 is, for example, a real time clock (RTC) and can measure the current time (for example, year, month, day, hour, minute, second). The time counter 49 may also include a calendar function with the day of the week and the like. The time counter 49 may include a timer other than an RTC.

The battery 20 supplies electricity to electric equipment in and/or on the working vehicle 1. The attaching switch 26, the detaching switch 27, the auxiliary mode switch 28, and the auxiliary output switch 29 are respective operation switches to be operated by the operator of the working vehicle 1. The attaching switch 26 and the detaching switch 27 are momentary operation switches. The user interface 25 and the switches 26 to 29 are provided operably in the vicinity of the seat 8 in the cabin 3.

The attaching switch (first operation switch) 26 is operated to attach the attachment 30 to the quick hitch 16. The detaching switch (second operation switch) 27 is operated to allow the attachment 30 to be detached from the quick hitch 16. The auxiliary mode switch 28 is operated to start an auxiliary mode in which predetermined attachment(s) 30 are usable. The auxiliary output switch (third operation switch) 29 is operated to supply (transmit) hydraulic fluid as power to the hydraulic fluid outlet port 18*a*.

Note that in the present example embodiment, the cases where the working vehicle 1 includes an attaching switch 26 to be operated to attach an attachment 30 to the quick hitch 16 and a detaching switch 27 to be operated to allow an attachment 30 to be detached from the quick hitch 16 are discussed. However, the working vehicle 1 may include a single operation switch (attaching/detaching switch) to selectively receive an operation to attach an attachment 30 to the quick hitch 16 or an operation to detach an attachment 30 (allow an attachment 30 to be detached) from the quick hitch 16.

The switches 26 to 29, the travel operator 6, the work operator 7 and the like are not limited to hardware operation switches, operating levers and the like, and, for example, may be software keys and the like on the display screen of the user interface 25.

The working vehicle 1 includes, as hydraulic-related features, a main pump P1, a pilot pump P2, a control valve unit (indicated as "CVU" in FIG. 1) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 is a variable displacement hydraulic pump. The regulator 42 changes the angle of the swash plate of the main pump P1. The controller 21 controls the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operator 6 and work operator 7, operating valves corresponding to the travel operator 6 and the work operator 7, switching valve(s), and the like.

The control valve unit 40 allows hydraulic fluid supplied from the main pump P1 through fluid passage(s) to flow to the boom cylinders 14 and the front cylinders 15 of the working device 4, the latch cylinder 52 of the quick hitch 16, and the hydraulic fluid outlet port 18*a*. The control valve unit 40 also allows hydraulic fluid that flows from the boom cylinders 14, the front cylinders 15, the latch cylinder 52, and the hydraulic fluid inlet port 18*b* (return fluid) to be discharged. The control valve unit 40 controls the direction and amount of supply of hydraulic fluid to the boom cylinders 14, the front cylinders 15, and the latch cylinder 52. The control valve unit 40 also controls the amount of supply of hydraulic fluid to the hydraulic fluid outlet port 18*a*.

Specifically, the control valve unit 40 includes control valves 40*a*, 40*b*, 40*c*, and 40*d* corresponding to the boom cylinders 14, the front cylinders 15, the latch cylinder 52, and the ports 18*a* and 18*b*. Each of the control valves 40*a*, 40*b*, 40*c*, and 40*d* is switchable between a neutral position, a first position, and a second position. At least the control valves 40*c* and 40*d* the control valves 40*a*, 40*b*, 40*c*, and 40*d* are electrically actuated. The control valves 40*a*, 40*b*, 40*c*, and 40*d* are normally held in the neutral position by the elastic force of a spring.

The operating valve(s) of the operating equipment 47 and/or the like that correspond to the work operator 7 are actuated according to the manner in which the work operator 7 is operated, thus allowing the pilot pressure of pilot fluid from the pilot pump P2 to act on pressure receiver(s) of the control valve(s) 40*a* and/or 40*b*. For example, the work operator 7 may be supported on the operating valves of the operating equipment 47 and the operating valves may be actuated physically by the operation of the work operator 7. Detection sensor(s) to detect the degree of operation (operation amount) and/or the direction of operation of the work operator 7 may be provided and the controller 21 may electrically actuate the operating valves based on the detection result(s) from the detection sensor(s). With this, the control valve(s) 40*a* and/or 40*b* is/are switched from the neutral position to the first position or the second position, so that hydraulic fluid from the main pump P1 is supplied through the control valve(s) 40*a* and/or 40*b* to the boom cylinders 14 and/or the front cylinders 15 to cause the boom cylinders 14 and/or the front cylinders 15 to extend or retract. It follows that the booms 11 and/or the attachment 30 such as the bucket 30*a* attached to the quick hitch 16 swing.

While the attaching switch 26 is being operated, the controller 21 places the control valve 40*c* in the first position to allow hydraulic fluid from the main pump P1 to be supplied to the latch cylinder 52 in the first direction to cause the latch cylinder 52 to extend. Accordingly, the operation of the attaching switch 26 that lasts for a first predetermined period of time T1 or more while the latching mechanisms 51 are in the unlatching state causes the latch cylinder 52 to extend to the predetermined degree or more, bringing the latching mechanisms 51 into the latching state. Even if the attaching switch 26 is operated, provided that the operation only lasts for a period less than the first predetermined period of time T1, the latch cylinder 52 does not extend to the predetermined degree or more and therefore the latching mechanisms 51 are not brought into the latching state. Therefore, the latching mechanisms 51 are moved back by the spring back force of the coil springs 56 to the original unlatching state.

On the contrary, while the detaching switch 27 is being operated, the controller 21 places the control valve 40*c* in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a second predetermined period of time T2 or more while the latching mechanisms 51 are in the latching state causes the latch cylinder 52 to retract to a predetermined degree or more, bringing the latching mechanisms 51 into the unlatching state. Even if the detaching switch 27 is operated, provided that the operation only lasts for a period less than the second predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state.

The first predetermined period of time T1 and the second predetermined period of time T2 are each, for example, about 2 to 3 seconds. The first predetermined period of time T1 and the second predetermined period of time T2 may be the same period or different periods. The specific values of the first predetermined period of time T1 and the second predetermined period of time T2 are examples, and not limited to the values above. The same applies to a third predetermined period of time T3 and a period of time T4 (described later).

When the auxiliary mode switch 28 is operated and the auxiliary mode is selected, a specific attachment 30 is attached to the quick hitch 16. The hydraulic fluid outlet port 18*a* and a hydraulic fluid inlet port 38*b* of the specific attachment 30*b* are connected together by a hose, and the hydraulic fluid inlet port 18*b* and a hydraulic fluid outlet port 38*a* of the specific attachment 30*b* are connected together by a hose.

Upon operation of the auxiliary output switch 29 under such circumstances, the controller 21 switches the control valve 40*d* from the neutral position to the first position or the second position. With this, hydraulic fluid from the main pump P1 is supplied (transmitted) through a fluid passage 45*a* to the hydraulic fluid outlet port 18*a*, and hydraulic fluid flowing into a fluid passage 45*b* from the hydraulic fluid inlet port 18*b* is drained through the control valve unit 40.

With this, hydraulic fluid discharged through the hydraulic fluid outlet port 18*a* is introduced into the specific attachment 30*b* through the hydraulic fluid inlet port 38*b* via a hose or the like. Furthermore, hydraulic fluid (return fluid) discharged through the hydraulic fluid outlet port 38*a* of the specific attachment 30*b* is introduced through the hydraulic fluid inlet port 18*b* via a hose or the like and is drained from the control valve unit 40. Since hydraulic fluid is introduced and discharged to and from the specific attachment 30*b* as such, hydraulic actuators 36 such as a hydraulic motor and/or hydraulic cylinder(s) of the attachment 30*b* are actuated, making it possible to perform work using the attachment 30*b*.

When allowing hydraulic fluid to be introduced and discharged to and from the specific attachment 30*b*, the controller 21 changes the opening of the control valve 40*d* depending on what specific attachment 30*b* is attached to the quick hitch 16, to adjust the flow rate or hydraulic pressure of hydraulic fluid supplied to the hydraulic fluid outlet port 18*a*. For example, the controller 21 may cause the flow rate sensor 43 to detect the flow rate of hydraulic fluid flowing through the fluid passage 45*a* and control the opening of the control valve 40*d*. Additionally or alternatively, the controller 21 may cause the pressure sensor 44 to detect the hydraulic pressure of hydraulic pressure flowing through the fluid passage 45*a* and control the opening of the control valve 40*d*.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating valve(s) of the operating equipment 47 and/or the like that correspond to the travel operator 6 are actuated according to the manner in which the travel operator 6 is operated, thus allowing the pilot pressure of pilot fluid from the pilot pump P2 to act on pressure receiver(s) of the swash plate(s) of the hydraulic pump(s) of the HST(s) 46L and/or 46R and changing the angle of inclination of the swash plate(s). For example, the travel operator 6 may be supported on the operating valves of the operating equipment 47 and the operating valves may be actuated physically by the operation of the travel operator 6. Detection sensor(s) to detect the degree of operation (operation amount) and/or the direction of operation of the travel operator 6 may be provided and the controller 21 may electrically actuate the operating valves based on the detection result(s) from the detection sensor(s). This controls the supply, the stopping of supply, and the direction of supply of hydraulic fluid from the hydraulic pump(s) of the HSTs 46L and/or 46R to the travel motor(s), the travel motor(s) rotate(s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

Furthermore, switching valve(s) for speed changes of the operating equipment 47 and/or like switch(es) positions according to control signal(s) from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The attachment 30 attachable to the working vehicle 1 is provided with a transmitter 33. The transmitter 33 is a beacon transmitter to periodically transmit a wireless signal compliant with a near field communication standard. Specifically, the beacon transmitter 33 is a device to periodically transmit an advertisement signal (also called "advertisement packet" or "beacon signal") which is a wireless signal compliant with Bluetooth (registered trademark) Low Energy. The beacon transmitter 33 looks like a small tag, and is therefore sometimes called a "BLE tag". The beacon transmitter 33 includes a microcomputer, a memory, a transmitter circuit, a battery, a vibration sensor 34, and/or the like. The elements of the beacon transmitter 33 are driven by electricity from the battery. The beacon transmitter 33 transmits the advertisement signal at interval(s) of, for example, about 1 second to about 3 seconds, but the intervals are not limited to about 1 second to about 3 seconds and may be selected as appropriate.

Figure 2:
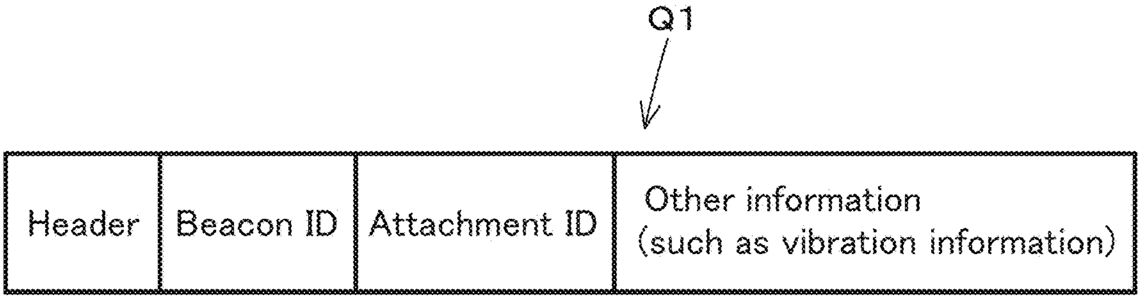
FIG. 2 is a diagram showing an example of information included in an advertisement signal.

FIG. 2 shows an example of information contained in an advertisement signal Q1 transmitted from the beacon transmitter 33. The advertisement signal Q1 includes a header, a beacon ID (tag serial number), an attachment ID, and other information.

The beacon ID is identification information of the beacon transmitter 33 which is the sender of the advertisement signal Q1. The attachment ID is identification information of the attachment 30 in or on which the beacon transmitter 33 which is the sender of the advertisement signal Q1 is provided.

The other information in the advertisement signal Q1 includes vibration information relating to the vibration state detected by the vibration sensor 34 of the beacon transmitter 33 which is the sender, i.e., vibration information relating to the vibration state of the attachment 30 in or on which the beacon transmitter 33 is provided. The vibration information may include information such as a message indicating whether or not the attachment 30 is vibrating (presence or absence of vibration). The vibration information may include, instead of or in addition to the information such as a message, a vibration indicator (numerical value) indicating the magnitude of vibration detected by the vibration sensor 34. The vibration indicator may be, for example, at least one of the displacement, velocity, or acceleration of vibrations of the attachment 30 detected by the vibration sensor 34. Inertial sensor(s) such as an acceleration sensor and/or a gyroscope sensor may be used as the vibration sensor 34.

Note that examples of the other information included in the advertisement signal Q1, other than the vibration information, include the supply amount and the supply pressure of hydraulic fluid to the attachment 30, the name of the attachment (official name), the remaining battery level of the battery of that beacon transmitter 33, and the acting time (hour meter) of the attachment 30 in or on which the beacon transmitter 33 is attached, and the like.

As illustrated in FIG. 19, the beacon transmitter 33 is located on, for example, the back surface of the attachment 30 that faces the machine body 2 of the working vehicle 1. The beacon scanner 23 is located at, for example, the front portion of the machine body 2 that faces the attachment 30. The controller 21 is provided in or on the machine body 2. Since the beacon scanner 23 is provided in or on the machine body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4.

The advertisement signal Q1 transmitted from the beacon transmitter 33 is received by the beacon scanner 23 of the working vehicle 1. The controller 21 identifies (recognizes) the attachment 30 based on the attachment ID included in the advertisement signal Q1 received by the beacon scanner 23.

In the case where one or more attachments 30 are present in the vicinity of the working vehicle 1, one or more advertisement signals Q1 from one or more beacon transmitters 33 of the one or more attachments 30 are received by the beacon scanner 23. Upon receipt of each advertisement signal Q1, the beacon scanner 23 measures the RSSI of the advertisement signal Q1.

The controller 21 reads the one or more attachment IDs from the one or more advertisement signals Q1 received by the beacon scanner 23. The controller 21 then causes the internal memory (first memory) 21*a* to store the one or more attachment IDs read from the one or more advertisement signals Q1 for a period of time T4, so that attachment IDs are collected in the internal memory 21*a*.

Upon attachment of an attachment 30 to the quick hitch 16, the controller 21 selects the attachment ID of the attachment 30 attached to the quick hitch 16 from the attachment IDs stored in the internal memory 21*a*, based on the RSSI(s). Specifically, the controller 21 selects one of the attachment ID(s) stored in the memory 21*a* that corresponds to the highest RSSI. The controller 21 then identifies the specifications and/or the like of the attachment 30 attached to the quick hitch 16 based on the selected attachment ID, and starts a predetermined process according to the attachment ID.

An example of the predetermined process is a process in which the controller 21 causes the user interface 25 to output (display) information indicating that the attachment 30 corresponding to the selected attachment ID is attached to the quick hitch 16 (working vehicle 1). Another example of the predetermined process is a process in which the controller 21 controls output of hydraulic fluid (power) to the attachment 30 attached to the quick hitch 16 (controls start and stop of the supply of hydraulic fluid to the attachment 30) according to the selected attachment ID. It is noted here that the controller 21 may also control at least one of the introduction of hydraulic fluid from the attachment 30, the amount of hydraulic fluid supplied to the attachment 30, or the pressure of hydraulic fluid supplied to the attachment 30.

With the management system 100, an automatic selection mode or a manual selection mode can be selected by, for example, an administrator performing a predetermined operation on the user interface 25. The automatic selection mode is a mode in which the controller 21 selects the attachment ID of the attachment 30 attached to the quick hitch 16 from the attachment ID(s) stored in the internal memory 21*a* and starts a predetermined process according to the selected attachment ID. In the automatic selection mode, the controller 21 identifies the attachment 30 attached to the quick hitch 16 based on the attachment ID selected based on a predetermined condition from the attachment ID(s) stored in the internal memory 21*a*.

The manual selection mode is a mode in which the controller 21 starts a predetermined process according to information relating to the attachment 30 received via the user interface 25. That is, in the manual selection mode, for example, the user, etc., of the working vehicle 1 inputs information relating to the attachment 30 attached to the quick hitch 16 via the user interface 25. In the manual selection mode, the controller 21 identifies the attachment 30 attached to the quick hitch 16 based on the information relating to the attachment 30 inputted via the user interface 25. The administrator uses the user interface 25 to place the working vehicle 1 in the automatic selection mode or the manual selection mode according to the demand of the user of the working vehicle 1 or the like.

Display data and control data are pre-set for each of the attachment IDs of attachments 30 attachable to the quick hitch 16, i.e., attachments 30 which can be used with the working vehicle 1.

FIG. 3 is a table showing an example of the relationship between the attachment IDs of the attachments 30 attachable to the quick hitch 16 and pieces of display data corresponding to the attachments 30. A piece of display data is data based on which the user interface 25 displays information about a corresponding attachment 30. The display data includes, for example, an icon, name, and specifications of the corresponding attachment 30. Such an attachment ID and display data of the attachment 30 are stored in a predetermined storage area of the nonvolatile memory 22 such that the attachment ID and the display data of the attachment 30 are associated with each other. Note that display data other than that described above may be stored in the storing device 22 such that the display data is associated with the attachment ID.

FIG. 4 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the nonvolatile memory 22 such that the attachment ID and the control data of the attachment 30 are associated with each other. Note that other control data, such as the level of hydraulic pressure outputted to the attachment 30 and/or the output value of power other than hydraulic fluid, may be stored in the storing device 22 such that the control data is associated with the attachment ID.

Figure 5:
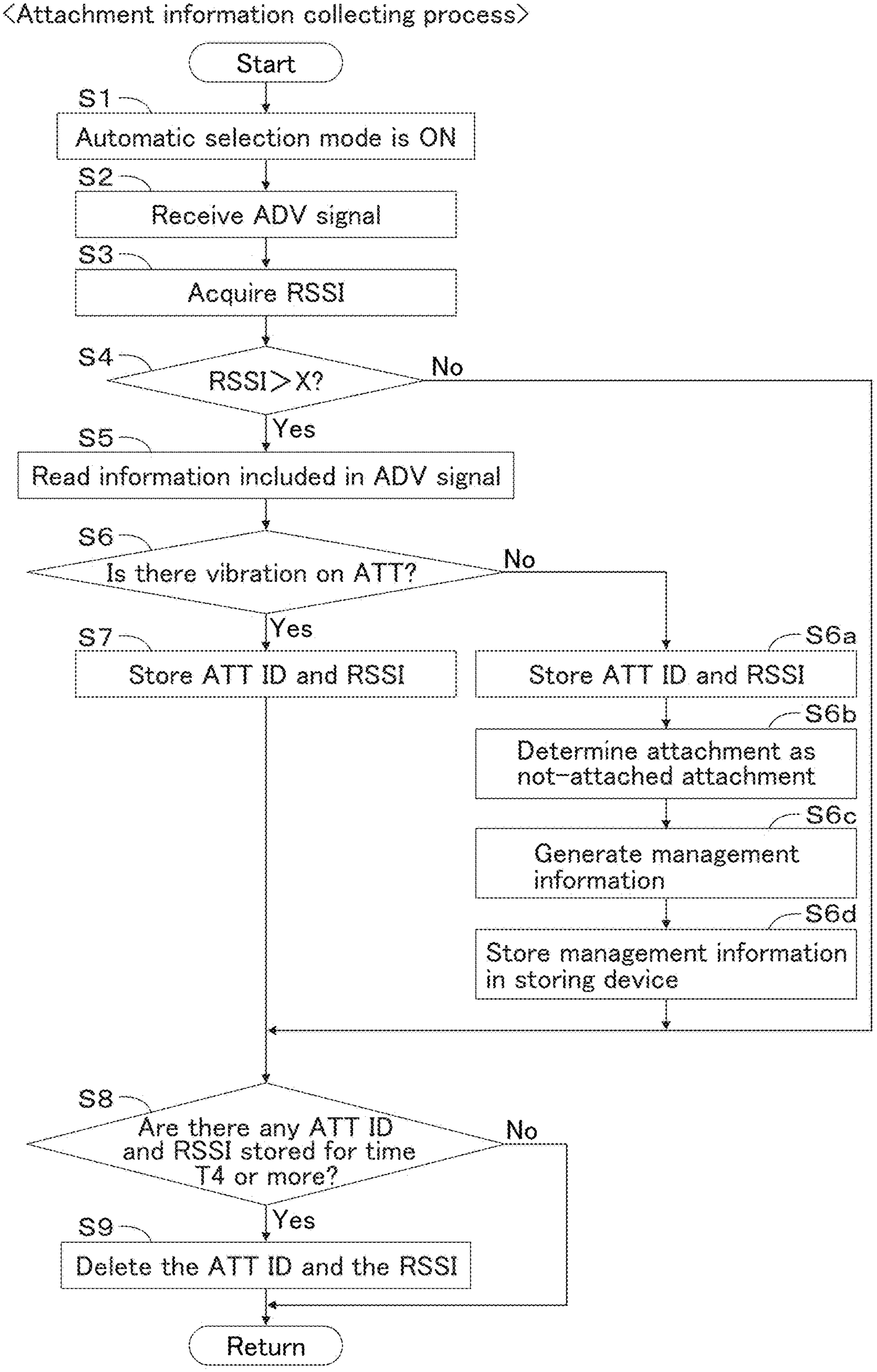
FIG. 5 is a flowchart showing an example of an attachment information collecting process.

FIG. 5 is a flowchart showing an example of an attachment information collecting process. The attachment information collecting process is performed by the controller 21 of the working vehicle 1 based on software program(s) stored in the internal memory 21*a* or the storing device 22. The same applies to a securing-of-attachment recognizing process and a release-of-attachment recognizing process (described later). In FIG. 5, the advertisement signal Q1 is referred to as "ADV signal" and the attachment is referred to as "ATT" for convenience of description. The same applies to FIGS. 7, 10, 12 to 14, and 16 to 18 (described later).

In the case where the controller 21 is in the automatic selection mode (S1 in FIG. 5), upon receipt of an advertisement signal Q1 from the beacon transmitter 33 by the beacon scanner 23 (S2), the controller 21 acquires the attachment ID and the RSSI of the advertisement signal Q1 from the beacon scanner 23 (S3).

Next, if the acquired RSSI is greater than a predetermined value (first predetermined value) X (YES in S4), the controller 21 reads information from the received advertisement signal Q1 (S5).

Next, if the information read from the advertisement signal Q1 includes vibration information indicating that the attachment 30 is vibrating, the controller 21 determines that there is vibration on the attachment 30 (YES in S6). Alternatively, if the information read from the advertisement signal Q1 includes a vibration indicator and the vibration indicator is greater than a predetermined value (second predetermined value) Y, the controller 21 determines that there is vibration on the attachment 30 (YES in S6).

Figure 6A:
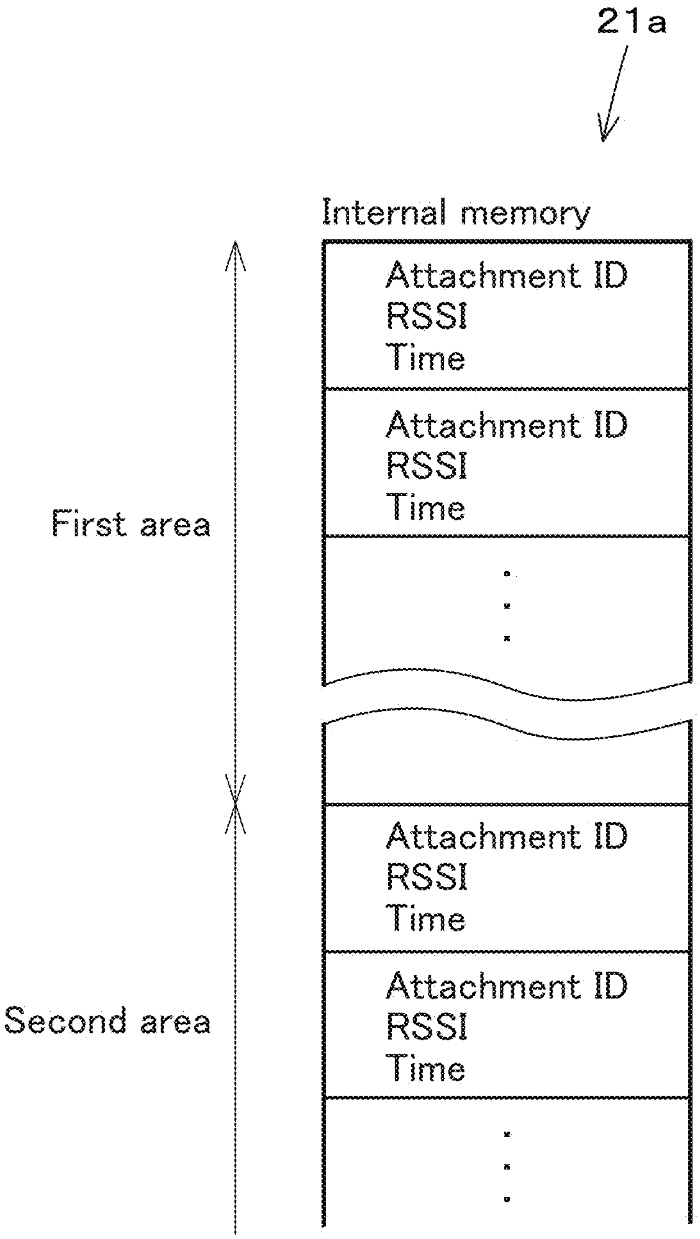
FIG. 6A is a diagram showing an example of information stored in an internal memory of a controller.

If the controller 21 determines that there is vibration on the attachment 30 (YES at S6), the controller 21 causes the internal memory 21*a* to store, in the first area thereof, the attachment ID included in the received advertisement signal Q1 and the RSSI of the advertisement signal Q1 such that the attachment ID and the RSISI are associated with each other (S7). FIG. 6A is a diagram showing an example of information stored in the internal memory 21*a* of the controller 21. As shown in FIG. 6A, the controller 21 causes the internal memory 21*a* to store attachment ID(s) and RSSI(s) in the first area. In so doing, the controller 21 causes the internal memory 21*a* to store, in the first area, for example, information indicating the time when the attachment ID and the RSSI were stored (the time information, the timestamp measured by the time counter 49, etc.) such that the information is associated with the attachment ID and the RSSI. The controller 21 may also cause the internal memory 21*a* to store, in the first area, the beacon ID, other information and/or the like included in the received advertisement signal Q1 such that the beacon ID and the other information, etc., are associated with the attachment ID and the RSSI. As described above, the controller 21 causes the internal memory 21*a* to store information with vibration in the first area thereof. The first area is, for example, a storage area where information with vibration is stored. The "information with vibration" as used herein refers to information included in an advertisement signal Q1 which includes the vibration information indicating that there is vibration. The "information with vibration" includes at least the attachment ID, the RSSI and the time information among the information included in such an advertisement signal Q1 "with vibration".

On the other hand, when the RSSI of the received advertisement signal Q1 is equal to or lower than the predetermined value X (NO at S4), the controller 21 does not store the attachment ID included in the received advertisement signal Q1 or the RSSI of the advertisement signal Q1 in the internal memory 21*a*. In the case where the acquired RSSI is higher than a predetermined value (first predetermined value) X (YES at S4), and where the controller 21 determines that there is no vibration on the attachment 30 because the received advertisement signal Q1 does not include vibration information indicating that the attachment 30 is vibrating (or a vibration indicator higher than a predetermined value Y) (NO at S6), the controller 21 causes the internal memory 21*a* to store, in a second area thereof (see FIG. 6A), the attachment ID included in the received advertisement signal Q1 and the RSSI of the advertisement signal Q1 such that the attachment ID and the RSSI are associated with each other (S6*a*). In so doing, the controller 21 causes the internal memory 21*a* to store, in the second area, for example, information indicating the time when the attachment ID and the RSSI were stored (the time information, the timestamp measured by the time counter 49, etc.) such that the information is associated with the attachment ID and the RSSI. The controller 21 may also cause the internal memory 21*a* to store, in the second area, the beacon ID, other information and/or the like included in the received advertisement signal Q1 such that the beacon ID and the other information, etc., are associated with the attachment ID and the RSSI. The second area is, for example, a storage area where information without vibration is stored. The "information without vibration" as used herein refers to information included in an advertisement signal Q1 which includes the vibration information indicating that there is no vibration. The "information without vibration" includes at least the attachment ID, the RSSI and the time information among the information included in such an advertisement signal Q1 "without vibration".

Note that, although the controller 21 causes the internal memory 21*a* to store the information in the advertisement signal Q1 with vibration in the first area (S7) and causes the internal memory 21*a* to store the information in the advertisement signal Q1 without vibration in the second area (S6*a*), this does not imply any limitation. For example, the controller 21 may cause the internal memory 21*a*, with no first area or second area set therein, to store the information in the advertisement signal Q1 together with identification information (header, flag, etc.) indicating the presence or absence of vibration.

When the controller 21 determines that there is no vibration on the attachment 30 (NO at S6) and causes the information in the advertisement signal Q1 without vibration to be stored in the second area (S6*a*), the controller 21 determines that the attachment 30 indicated by the attachment ID stored in the second area is a not-attached attachment not attached to the quick hitch 16 (S6*b*). The not-attached attachment refers to an attachment 30 not attached to the working vehicle 1, and may also be regarded as an attachment in storage.

Figure 6B:
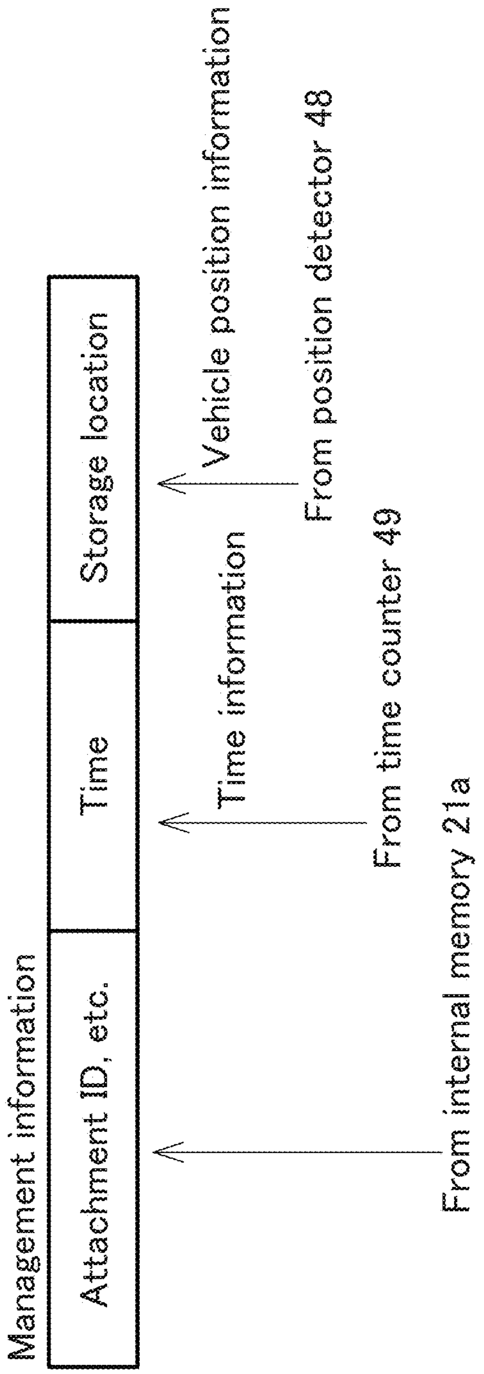
FIG. 6B is a diagram showing an example of generation of management information.

The controller 21 generates management information in which the attachment ID of the attachment 30 determined as being a not-attached attachment is associated with the vehicle position information as the storage location information indicating the storage location of the not-attached attachment (S6*c*). FIG. 6B is a diagram showing an example of the generation of management information. As shown in FIG. 6B, the controller 21 generates management information in which the attachment ID (identification information)

of the attachment 30 determined as being a not-attached attachment is associated with the vehicle position information (as the storage location information indicating the storage location of the not-attached attachment) acquired by the position detector 48 when the beacon scanner 23 received the advertisement signal Q1 with no vibration. Note that the vehicle position information acquired by the position detector 48 is not limited to the vehicle position information acquired at the point in time at which the wireless signal (for example, an advertisement signal Q1 with no vibration, etc.) was received by the beacon scanner 23 (receiver), but may be the vehicle position information acquired by the position detector 48 at the point in time before or after the receipt of the wireless signal. That is, the vehicle position information acquired by the position detector 48 need only be the one acquired during a period including the point in time of receipt of the wireless signal by the receiver and points in time around the point in time of receipt (the same applies to the following description).

The controller 21 stores the generated management information in the storing device 22 (S6*d*). As shown in FIG. 6B, the controller 21 may cause the storing device 22 to store the storage location information such that the storage location information is associated with the time information measured by the time counter 49 when an advertisement signal Q1 with no vibration was received by the beacon scanner 23. Note that the time information measured by the time counter 49 is not limited to the time information obtained when a wireless signal (for example, an advertisement signal Q1) was received, and may be the time information obtained before or after the point in time of receipt of the wireless signal (the same applies to the following description).

After S7, after S6*d*, or in the case of No in S4, if any of the attachment ID(s) or RSSI(s) in the internal memory 21*a* has been stored for the period of time T4 or more (YES in S8), the controller 21 deletes that attachment ID(s) and RSSI(s) from the internal memory 21*a* (S9). It is noted here that the controller 21 also deletes, from the internal memory 21*a*, other information (such as time point information) corresponding to the attachment ID(s) having been stored for the period of time T4 or more. The period of time T4 is, for example, about 30 seconds which corresponds to at least one of the time for an attachment 30 to be attached to the working vehicle 1 or the time for the attachment 30 to be replaced with another one. After step S9, the controller 21 repeats step S1 and subsequent steps if the automatic selection mode is ON.

The controller 21 repeats the attachment information collecting process shown in FIG. 5, so that at least attachment IDs and their corresponding RSSIs are collected in the internal memory 21*a* as shown in FIG. 6A.

Specifically, the controller 21 categorizes the advertisement signal(s) Q1 received by the beacon scanner 23 into (i) an advertisement signal Q1 from a beacon transmitter 33 in or on an attachment 30 which is located close to the quick hitch 16 (working vehicle 1) to some degree and which vibrated when attached to the quick hitch 16, and (ii) advertisement signal(s) Q1 from beacon transmitter(s) 33 in or on attachment(s) 30 which is/are located in the vicinity of the working vehicle 1 but not attached to the quick hitch 16. That is, one or more attachments 30 in the vicinity of the working vehicle 1 are categorized into "attached attachment(s)" and "not-attached attachment(s)". Then, the attachment ID(s) included in the categorized advertisement signal(s) Q1, and the RSSI(s) of the advertisement signal(s) Q1, are stored (collected) in the internal memory 21*a* of the controller 21 for a predetermined time T4. As another example, the controller 21 may cause the storing device 22 to store the attachment ID and the RSSI of the advertisement signal Q1 for a predetermined time T4.

The following discusses cases where an attachment 30 is attached to the working vehicle 1. When an attachment 30 placed on the ground or the like is to be attached to the working vehicle 1, the user of the working vehicle 1 operates the traveling device 5 and/or the working device 4 using the operation member(s) 6 and/or 7 to allow the front plates 50*f* of the brackets 50 of the quick hitch 16 to engage with the base plate 71 of the attachment 30, thus holding the attachment 30 with the brackets 50 (see FIG. 21A). In so doing, in some cases, the user allows the front plates 50*f* to engage with the base plate 71 and then allow the booms 11 and/or the quick hitch 16 to swing upward by a predetermined angle using the work operator 7 to raise the attachment 30 with the working device 4 to some extent to check whether the attachment 30 is held by the brackets 50.

Then, if the user operates the attaching switch 26 for the first predetermined period of time T1 or more, the controller 21 causes the latch cylinder 52 to extend. With this, the latch levers 57 pivot downward, so that the latch pins 54 are inserted into the through-holes 71*h* of the base plate 71 of the attachment 30 to allow the attachment 30 to be latched by the latching mechanisms 51 (see FIG. 21B). That is, the attachment 30 is brought into a state in which it is attached to the quick hitch 16 and the working vehicle 1.

During the steps of attaching the attachment 30 described above, the attachment 30 vibrates, for example, when the front plates 50*f* of the brackets 50 are brought into engagement with the base plate 71 of the attachment 30, when the attachment 30 is raised by the working device 4, and/or when the attachment 30 is latched by the latching mechanisms 51. The advertisement signal Q1 transmitted by the beacon transmitter 33 includes vibration information relating to the vibration state of the attachment 30 that has been detected by the vibration sensor 34 at any of the above-listed points in time.

Figure 7:
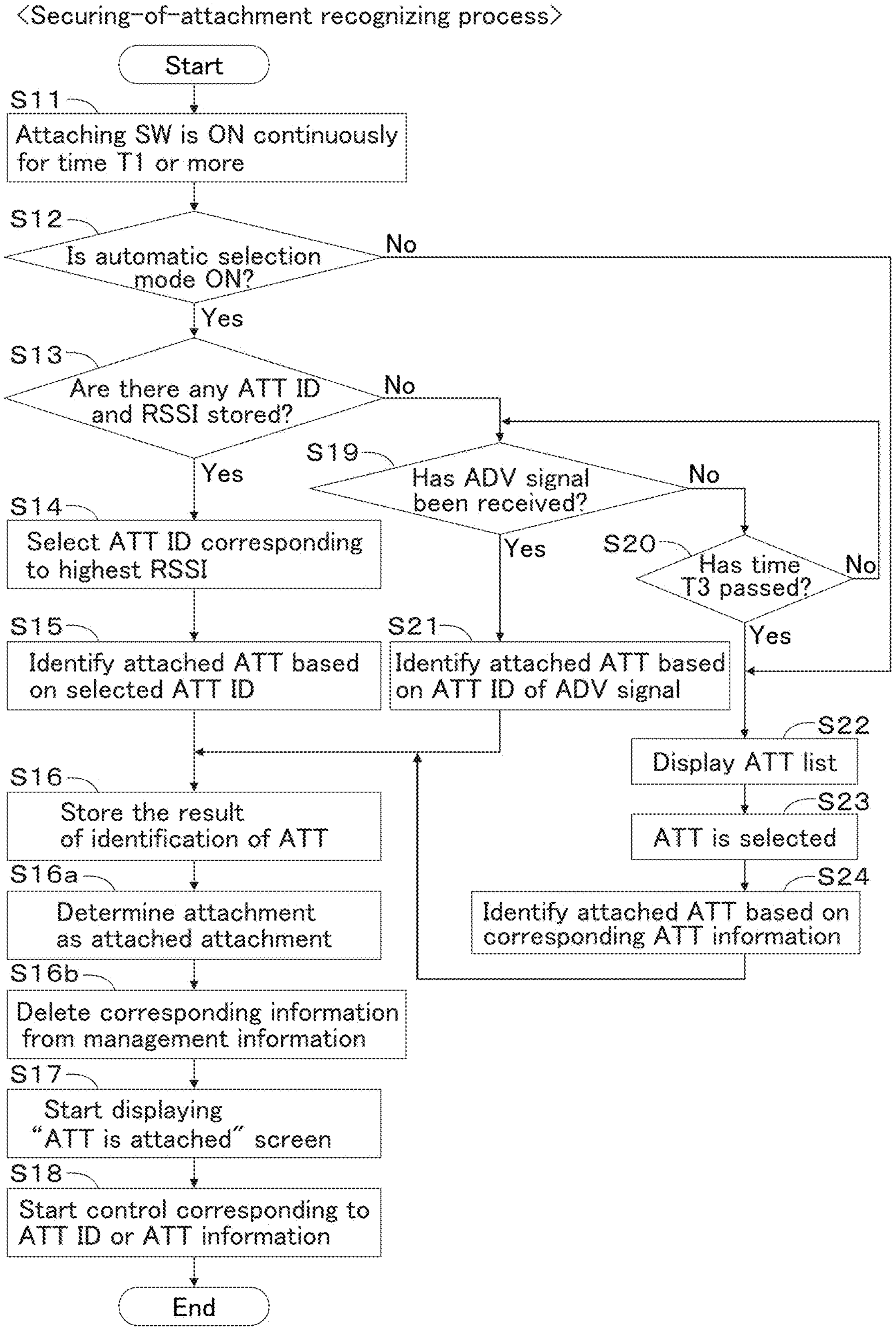
FIG. 7 is a flowchart showing an example of a securing-of-attachment recognizing process.

FIG. 7 is a flowchart showing an example of the securing-of-attachment recognizing process. If the attaching switch 26 is operated continuously (continues to be in ON state) for a first predetermined period of time T1 or more (S11 in FIG. 7) as described earlier, the controller 21 determines that the attachment 30 is attached to (secured to) the quick hitch 16. Next, in the case where the automatic selection mode is selected (YES in S12), the controller 21 determines whether or not any attachment IDs are stored in the internal memory 21*a*.

If the internal memory 21*a* stores one or more attachment IDs and corresponding one or more RSSIs therein (YES in S13), the controller 21 reads the one or more RSSIs and the one or more attachment IDs stored in the internal memory 21*a*, and selects one of the one or more attachment IDs that corresponds to the highest one of the RSSIs (S14). Next, the controller 21 identifies (recognizes) the attachment 30 attached to the quick hitch 16 based on the selected attachment ID (S15).

The one of the one or more advertisement signals Q1 received by the beacon scanner 23 that has the highest RSSI is a signal transmitted from the beacon transmitter 33 located closest to the beacon scanner 23. Therefore, the controller 21 regards, as the attachment ID of the attachment 30 attached to the quick hitch 16, the attachment ID included in an advertisement signal Q1 having the highest RSSI of advertisement signals Q1 received by the beacon scanner 23 during the period of time T4 which ended when the attachment 30 was attached to the quick hitch 16, and selects that attachment ID. Next, the controller 21 identifies the type, other specifications, and/or the like of the attachment 30 attached to the quick hitch 16 based on the selected attachment ID.

The attachment ID corresponding to the highest RSSI as described above is a predetermined condition based on which one of attachment ID(s) collected in the internal memory 21*a* is to be selected. Note that the RSSIs stored in the internal memory 21*a* may include one or more highest RSSIs. If a plurality of the highest RSSIs are stored in the internal memory 21*a*, such RSSIs have the same value and correspond to the same attachment ID. Therefore, the controller 21 may select one of the same attachment IDs (for example, the attachment ID corresponding to the latest receipt time) and identify the attachment 30 attached to the quick hitch 16 based on the selected attachment ID.

Next, the controller 21 causes the storing device 22 to store the result of identification of the attachment 30 (S16). It is noted here that the controller 21 causes the storing device 22 to store, as attached attachment information, information indicating that the identified attachment 30 is attached to the quick hitch 16, i.e., to the working vehicle 1, and the attachment ID of the attached attachment 30.

The controller 21 determines that the attachment 30 indicated by the attachment ID stored in the storing device 22 is an attached attachment (S16*a*). An attached attachment is an attachment 30 attached to the quick hitch 16. In the case where the attachment ID determined by the controller 21 to be an attached attachment is included in the piece(s) of management information already stored in the storing device 22, the controller 21 deletes the piece of management information that relates to the attachment ID from the storing device 22. That is, the management information only includes those of not-attached attachment(s) (attachment(s) 30 that are not attached).

The controller 21 starts a display process (predetermined process) in which the controller 21 causes the user interface 25 to display (output) an "attachment is attached" screen G1 which indicates that the attachment 30 corresponding to the selected attachment ID is attached and which displays attachment information relating to the attached attachment 30 (S17).

Figure 8:
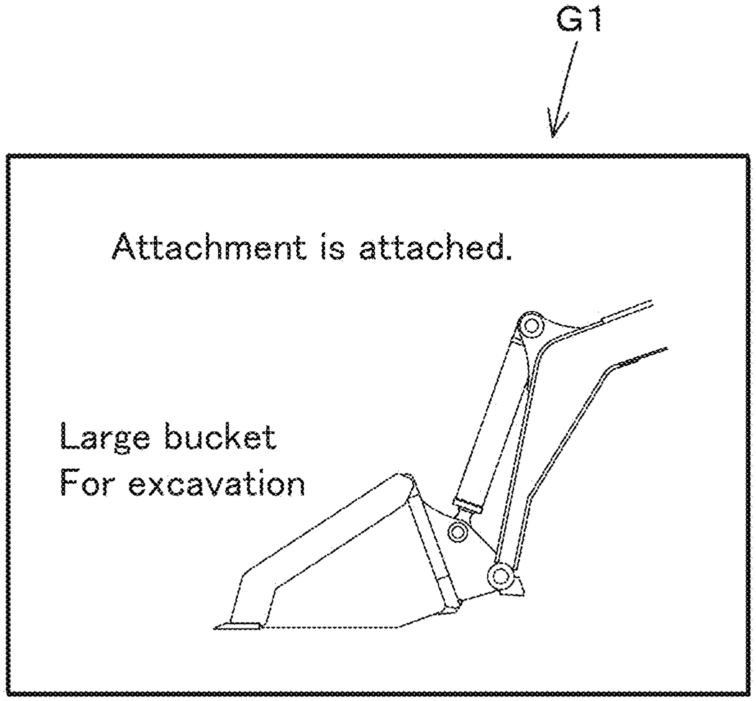
FIG. 8 illustrates an example of an "attachment is attached" screen.

FIG. 8 illustrates an example of the "attachment is attached" screen G1. The "attachment is attached" screen G1 displays a message indicating that the attachment 30 is attached, the attachment information relating to the attached attachment 30, and an icon of the attachment 30. In the example in FIG. 8, the attachment information "Large bucket" "for excavation" is displayed. Additionally or alternatively, other attachment information such as the attachment ID, size, and/or manufacturer of the attachment 30 may be displayed (the same applies to FIG. 11 described later). The display data for the "attachment is attached" screen G1 and the attachment information are prestored in the storing device 22.

For another example, the controller 21 may cause the communicator 24 (FIG. 1) to transmit, to the portable terminal 90, the display data for the "attachment is attached" screen G1 and the attachment information of the attachment 30 which has been determined as being attached so that the "attachment is attached" screen G1 is displayed on a display of the portable terminal 90.

The controller 21 starts predetermined control (predetermined process) according to the attachment ID selected in step S14 (S18). In so doing, the controller 21 reads control data corresponding to the selected attachment ID form the storing device 22 and starts control corresponding to the attachment 30 attached to the quick hitch 16 based on the control data.

Specifically, in the case where the attachment 30 attached to the quick hitch 16 is an attachment 30*b* including a hydraulic actuator such as a skid cutter, the controller 21 starts causing the control valve 40*d* to control the output of hydraulic fluid from the hydraulic fluid outlet port 18*a* to the attachment 30*b*, based on the control data read from the storing device 22. With this, draining of return fluid to be introduced from the attachment 30*b* into the hydraulic fluid inlet port 18*b* is also started. The controller 21 may, for example, cause the "attachment is attached" screen G1 to display a message indicating that the control of the output of hydraulic fluid to the attachment 30*b* has been started.

Note that, in the case where the attachment 30 attached to the quick hitch 16 is an attachment 30 including no hydraulic actuators such as a bucket 30*a*, the controller 21 does not cause the control valve 40*d* to output hydraulic fluid from the hydraulic fluid outlet port 18*a* to the attachment 30 based on the control data read from the storing device 22. The controller 21 may start control such as adjusting and/or limiting the travel speed and/or speed stage of the working vehicle 1 and/or the height of the raised/lowered booms 11 according to the selected attachment ID in step S18.

On the contrary, returning to S13 in FIG. 7, if the internal memory 21*a* stores no attachment IDs or RSSIs (NO in S13), the controller 21 determines whether or not the beacon scanner 23 has received any advertisement signals Q1 from beacon transmitter(s) 33. For example, assume that the beacon scanner 23 receives an advertisement signal Q1 within a third predetermined period of time T3 (NO in S20) from when the attaching switch 26 has been operated continuously for the first predetermined period of time T1 or more (S11) (YES in S19). In such a case, the controller 21 identifies the attachment 30 attached to the quick hitch 16 based on the attachment ID included in this advertisement signal Q1 (S21). Next, the controller 21 causes the storing device 22 to store the result of identification of the attachment 30 as described earlier (S16), and starts a predetermined process according to the attachment ID included in the received advertisement signal Q1 (S17, S18).

For another example, in the case where the beacon scanner 23 receives a plurality of advertisement signals Q1 within the third predetermined period of time T3 (YES in S19), the controller 21 may determine at least one of whether the advertisement signals Q1 have an RSSI higher than a predetermined value X or whether the advertisement signals Q1 include vibration information indicating that the corresponding attachment 30 is vibrating. The controller 21 may, if the RSSI of any of the advertisement signals Q1 is higher than a predetermined value X and/or any of the advertisement signals Q1 includes vibration information indicating that the attachment 30 is vibrating, identify the attachment 30 attached to the quick hitch 16 based on the attachment ID included in that advertisement signal Q1 (S21). The controller 21 may cause the storing device 22 to store the result of identification of the attachment 30 (S16) and start a predetermined process according to the attachment ID included in the advertisement signal Q1 (S17, S18).

If the beacon scanner 23 does not receive any advertisement signals Q1 within the third predetermined period of time T3 (NO in S19, YES in S20), the controller 21 causes the user interface 25 to display an attachment list L1 indicating attachment(s) 30 attachable to the quick hitch 16 (S22). Note that the third predetermined period of time T3 is, for example, about 10 seconds.

FIG. 9 shows an example of the attachment list L1. The data of the attachment list L1 is stored in the storing device 22. The attachment list L1 displayed by the user interface 25 includes, for example, pieces of attachment information such as the names, the attachment IDs, and/or the specifications of the attachments 30 attachable to the quick hitch 16.

The user selects a piece of attachment information relating to the attachment 30 attached to the quick hitch 16 from the attachment list using the user interface 25 (S23). Upon the selection, the controller 21 identifies the attachment 30 attached to the quick hitch 16 based on the selected piece of attachment information (S24). Then, the controller 21 causes the result of identification of the attachment 30 to be stored as described above (S16), and starts a predetermined process according to the selected piece of attachment information (S17, S18).

Also in the case where the manual selection mode is selected instead of the automatic selection mode (NO in S12) when the attaching switch 26 has been operated continuously for the first predetermined period of time T1 or more (S11), the controller 21 causes the user interface 25 to display the attachment list (S22). Next, upon selection of a piece of attachment information by the user from the attachment list (S23), the controller 21 identifies the attachment 30 attached to the quick hitch 16 based on the selected piece of attachment information (S24). Next, the controller 21 causes the result of identification of the attachment 30 to be stored as describe earlier (S16), and starts a predetermined process according to the selected piece of attachment information (S17, S18).

The controller 21 may cause the user interface 25 to display icon(s) (symbol(s)) of the attachment(s) 30 attachable to the quick hitch 16 instead of the attachment list L1 of step S22, for example. In such a case, upon selection (designation) of any of the icons using the user interface 25 by the user, the controller 21 reads the piece of attachment information of the attachment 30 corresponding to the selected icon from the storing device 22, identifies the attachment 30 attached to the quick hitch 16 based on the piece of attachment information, and starts a predetermined process corresponding to the piece of attachment information (S17, S18).

Alternatively, the controller 21 may cause the user interface 25 to display an input screen for attachment information such as an attachment ID instead of the attachment list L1 of step S22. In such a case, upon input of a piece of attachment information of the attachment 30 attached to the quick hitch 16 by the user via the input screen on the user interface 25, the controller 21 identifies the attachment 30 attached to the quick hitch 16 based on the inputted piece of attachment information and starts a predetermined process corresponding to the piece of attachment information (S17, S18).

The controller 21 may cause the user interface 25 to also display prompt information (such as a message) asking for selection or input of a piece of attachment information or an icon corresponding to the attachment 30 attached to the quick hitch 16, when causing the user interface 25 to display the foregoing attachment list L1, icons of the attachments 30, or the input screen for the attachment information.

When detaching the attachment 30 from the quick hitch 16, the user operates the traveling device 5 and/or the working device 4 using the operation member(s) 6 and/or 7 to place the attachment 30 on the ground at a predetermined location. Next, if the user operates the detaching switch 27 for the second predetermined period of time T2 or more, the controller 21 causes the latch cylinder 52 to retract. With this, the latch levers 57 pivot upward, the latch pins 54 are withdrawn from the through-holes 71*h* of the base plate 71 of the attachment 30 as illustrated in FIG. 21A, and the attachment 30 is unlatched from the latching mechanisms 51. That is, the attachment 30 is allowed to be detached from the quick hitch 16 and the working vehicle 1.

Figure 10:
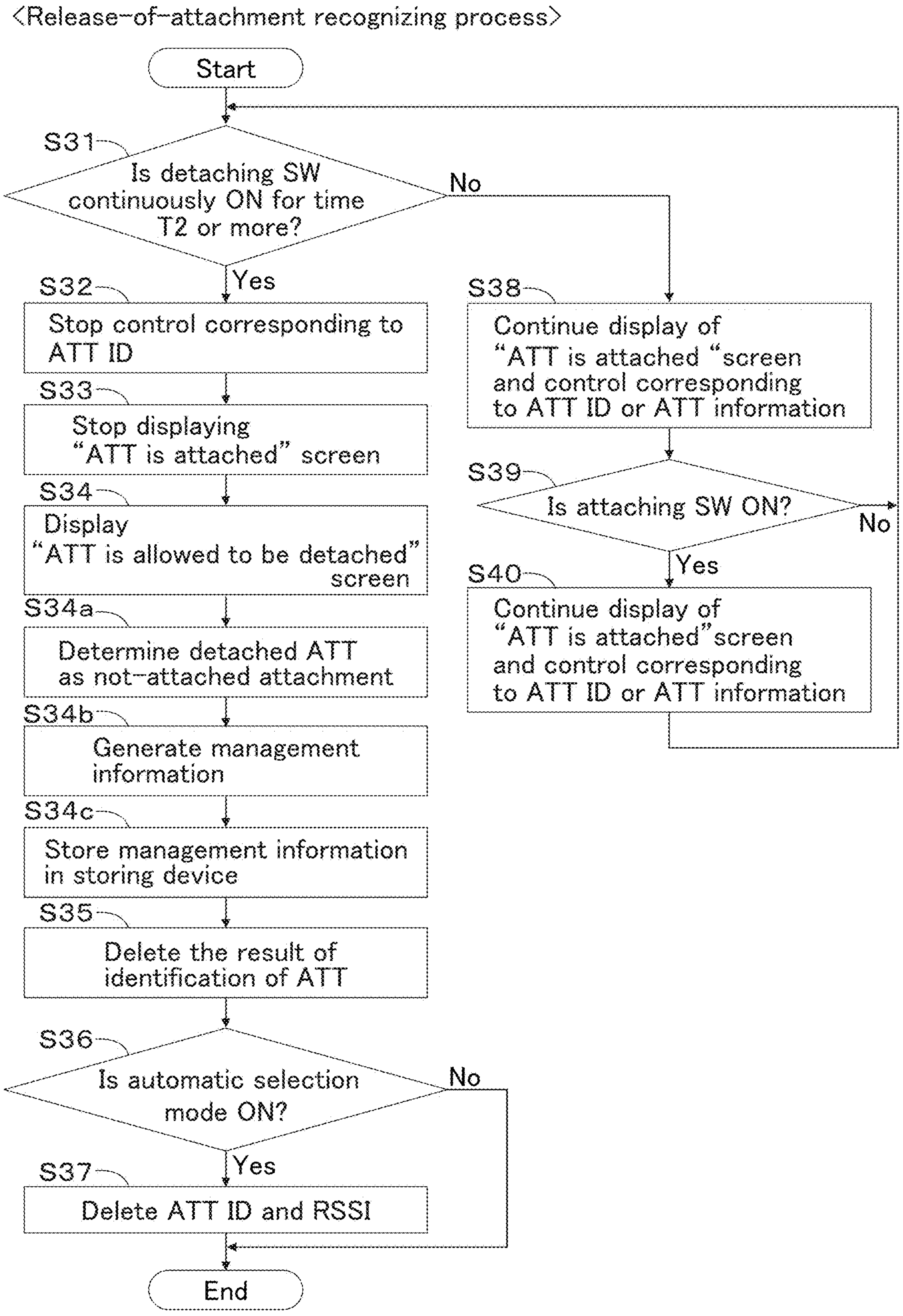
FIG. 10 is a flowchart showing an example of a release-of-attachment recognizing process.

FIG. 10 is a flowchart showing an example of the release-of-attachment recognizing process. If the detaching switch 27 is operated continuously (continues to be in ON state) for the second predetermined period of time T2 or more (S31) as described earlier, the controller 21 determines that the attachment 30 is allowed to be detached from the quick hitch 16. Next, the controller 21 stops the currently performed control corresponding to the attachment ID (S32). It is noted here that, if, for example, the control of the output of hydraulic fluid to the attachment 30 is currently being performed (the control was started in step S18 in FIG. 7), the controller 21 stops the control of the output. With this, the hydraulic fluid stops from being outputted from the working vehicle 1 to the attachment 30.

The controller 21 stops the display of the "attachment is attached" screen G1 shown in FIG. 8 (the display was started in step S17 in FIG. 7) (S33). That is, the controller 21 causes the user interface 25 to stop displaying the "attachment is attached" screen G1. Next, the controller 21 causes the user interface 25 to display (output) an "attachment is allowed to be detached" screen G2 including information indicating that the attachment 30 is allowed to be detached from the quick hitch 16 and the working vehicle 1 (S34).

Figure 11:
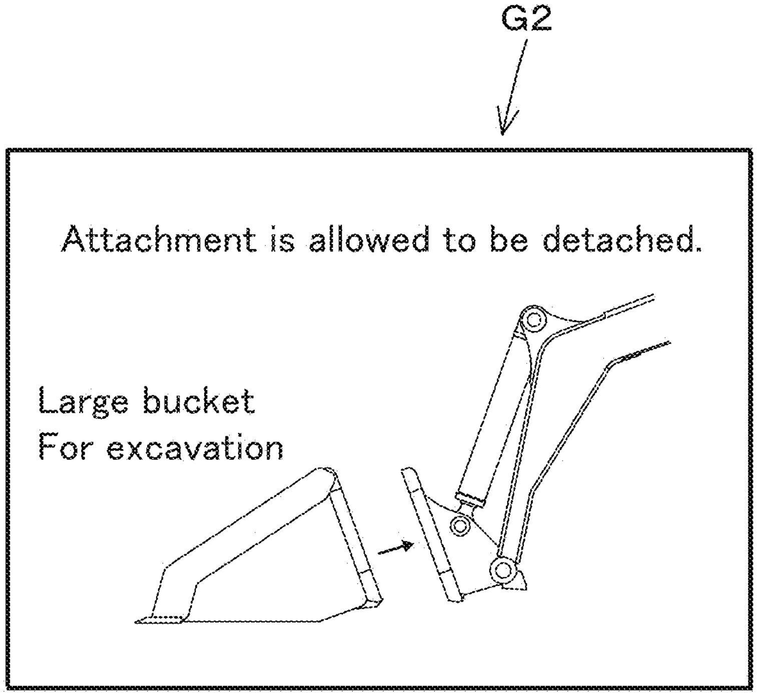
FIG. 11 illustrates an example of an "attachment is allowed to be detached" screen.

FIG. 11 illustrates an example of the "attachment is allowed to be detached" screen G2. The "attachment is allowed to be detached" screen G2 displays a message indicating that the attachment 30 is allowed to be detached, attachment information relating to the attachment 30 allowed to be detached (bucket 30*a* in the example in FIG. 11), and an icon of the attachment 30. The controller 21 may cause, for example, the "attachment is allowed to be detached" screen G2 to display a message indicating that the control (such as control of output of hydraulic fluid) corresponding to the attachment 30 has stopped. The controller 21 may cause the "attachment is allowed to be detached" screen G2 to be displayed for a period of time and then disappear.

For another example, the controller 21 may cause the communicator 24 to transmit, to a portable terminal 90, the display data for the "attachment is allowed to be detached" screen G2 and the attachment information relating to the detached attachment 30. The portable terminal 90 may receive the display data and the attachment information and cause a display to display the "attachment is allowed to be detached" screen G2.

The controller 21 determines the attachment 30 having been detached as a not-attached attachment (S34*a*). Specifically, among the advertisement signals Q1 received by the beacon scanner 23, the internal memory 21*a* stores, in its first area, the information in the advertisement signal Q1 from the beacon transmitter 33 in or on the attachment 30 relatively close to the quick hitch 16 (working vehicle 1) and vibrated when detached from the quick hitch 16. Thus, the controller 21 determines, as a not-attached attachment, the attachment 30 indicated by the attachment ID with the highest RSSI among the stored information stored in the first area of the internal memory 21*a*.

The controller 21 generates management information in which the attachment ID of the attachment 30 determined as being a not-attached attachment is associated with the vehicle position information as the storage location information indicating the storage location of the not-attached attachment (S34*b*). The controller 21 generates management information in which the attachment ID (identification information) of the attachment 30 determined as being a not-attached attachment is associated with the vehicle position information (as the storage location information indicating the storage location of the not-attached attachment) acquired by the position detector 48 when the beacon scanner 23 received the advertisement signal Q1 with no vibration.

The controller 21 stores the generated management information in the storing device 22 (S34*c*). The controller 21 may cause the storing device 22 to store the storage location information associated with the time information measured by the time counter 49 when the beacon scanner 23 received the advertisement signal Q1 with no vibration.

The controller 21 deletes, from the storing device 22, the result of identification of the attachment 30 allowed to be detached, after, for example, a fifth predetermined period of time T5 from when the "attachment is allowed to be detached" screen G2 started to be displayed (S35). The controller 21 also deletes attached attachment information from the storing device 22. That is, in a case that the attachment ID in the attached attachment information and the attachment ID of the attachment 30 allowed to be detached are the same, the controller 21 deletes the attached attachment information. This is because the attachment 30, which has been a attached attachment, is changed to a not-attached attachment. Note that, for another example, the controller 21 may cause the storing device 22 to store the result of identification of the detached attachment 30, as a history of use of the attachment 30 on the working vehicle 1. The controller 21 deletes the attachment ID and the RSSI stored in the internal memory 21*a* (S37) in the case where the automatic selection mode is selected (YES in S36).

On the contrary, if the detaching switch 27 is not operated continuously for the second predetermined period of time T2 or more with the attachment 30 attached to the quick hitch 16 (NO in S31), the controller 21 continues to cause the "attachment is attached" screen G1 to be displayed and continues to perform the control corresponding to the attachment ID selected in step S14 of the securing-of-attachment recognizing process (that is, the attachment ID of the attachment 30 attached to the quick hitch 16 (S38 in FIG. 10).

The controller 21 continues to cause the "attachment is attached" screen G1 to be displayed and continues to perform the control corresponding to the attachment ID selected in step S14 of the securing-of-attachment recognizing process, also when the attaching switch 26 is operated (YES in S39) (S40 in FIG. 10).

As has been described, the controller 21 selects the attachment ID of the attachment 30 attached to the quick hitch 16 and starts a predetermined process corresponding to the attachment ID (such as displaying the "attachment is attached" screen G1, controlling power output to the attachment 30, and/or the like). Even if the beacon scanner 23 receives advertisement signal(s) Q1 from beacon transmitter(s) 33 before the attachment 30 is allowed to be detached from the quick hitch 16, the controller 21 does not use the attachment(s) ID included in the advertisement signal(s) Q1 to identify the attachment 30 or start a predetermined process. In other words, the controller 21 does not perform the selection of an attachment ID or identification of an attachment 30 again, and continues to perform the process to display the attached attachment 30 and attachment information and/or perform the control corresponding to the selected attachment ID, until the identified attachment 30 is allowed to be detached from the quick hitch 16.

Figure 12:
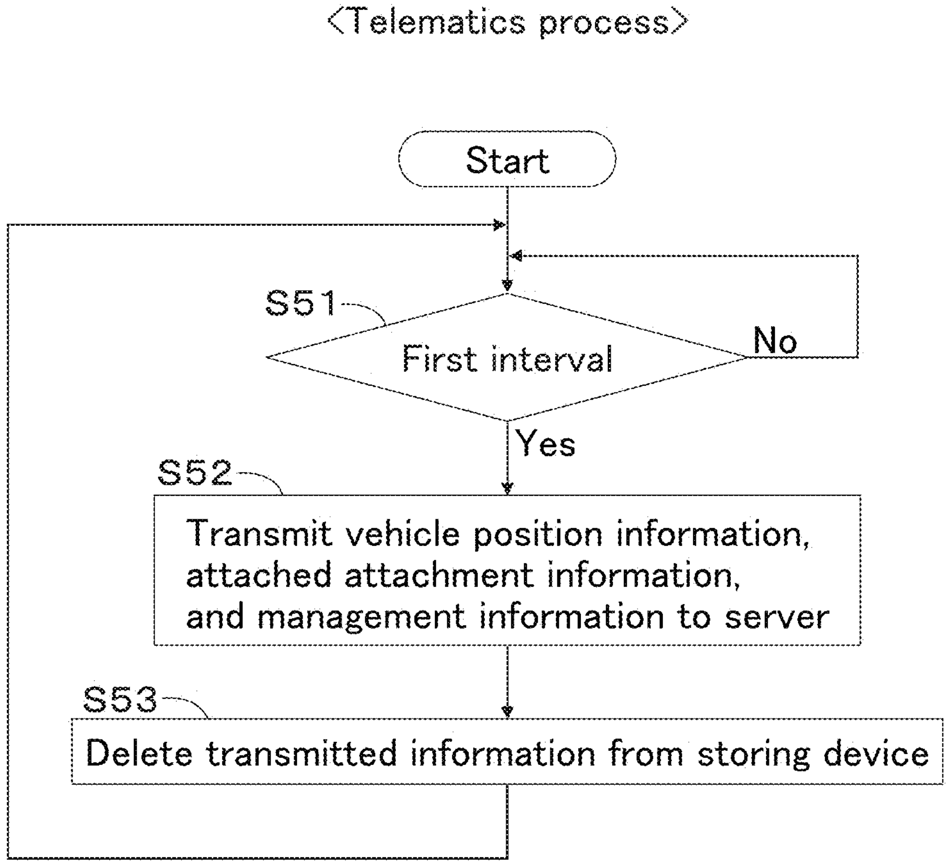
FIG. 12 is a flowchart showing an example of a telematics process.

As shown in FIG. 12, the controller 21 performs a telematics process. With this, the communicator 24 of the working vehicle 1 performs a telematics communication with the server 80. FIG. 12 is a flowchart showing an example of the telematics process.

For example, the communicator 24 performs a telematics communication in which the communicator 24 transmits predetermined data stored in the storing device 22 (for example, various information about the working vehicle 1 and the working device 4, attached attachment information, and management information about not-attached attachment (s)) at first interval(s) to the server 80. It is noted here that at least the vehicle position information, the attached attachment information, and the management information are transmitted at first interval(s). Note that the various information about the working vehicle 1 and the working device 4 includes the vehicle position information (position information of the machine body 2) measured by the position detector 48, the traveling speed of the machine body 2 detected by sensor(s), the speed stage of the traveling devices 5, the rotation speed of the prime mover 9, the rotation speed of travel motor(s), the temperature of hydraulic fluid, the state of the working device 4 and/or the like. These pieces of information are pieces of information detected at intervals shorter than the first intervals (for example, a few seconds), and are stored in the storing device 22. The attached attachment information includes the type, specifications, operating status, etc., of the attachment 30 attached to the working vehicle 1, and is stored in the storing device 22. The management information is information about not-attached attachment(s) (information about attachment(s) not attached to the working vehicle 1 and present in the vicinity of the working vehicle 1) and is stored in the storing device 22.

The controller 21 determines whether a first interval (for example, 10 minutes) has passed or not (S51). If a first interval has not passed (NO at S51), the controller 21 returns to S51. On the other hand, if a first interval has passed (YES at S51), the controller 21 transmits predetermined data (the predetermined data here includes vehicle position information, attached attachment information, and management information) to the server 80 via the communicator 24 (S52). Specifically, the controller 21 transmits the vehicle position information, the attached attachment information and the management information at first interval(s) to the server 80. The controller 21 deletes the predetermined data (the vehicle position information, the attached attachment information and the management information) transmitted to the server 80 from the storing device 22 (S53). After S53, the controller 21 returns to S51.

Figure 14:
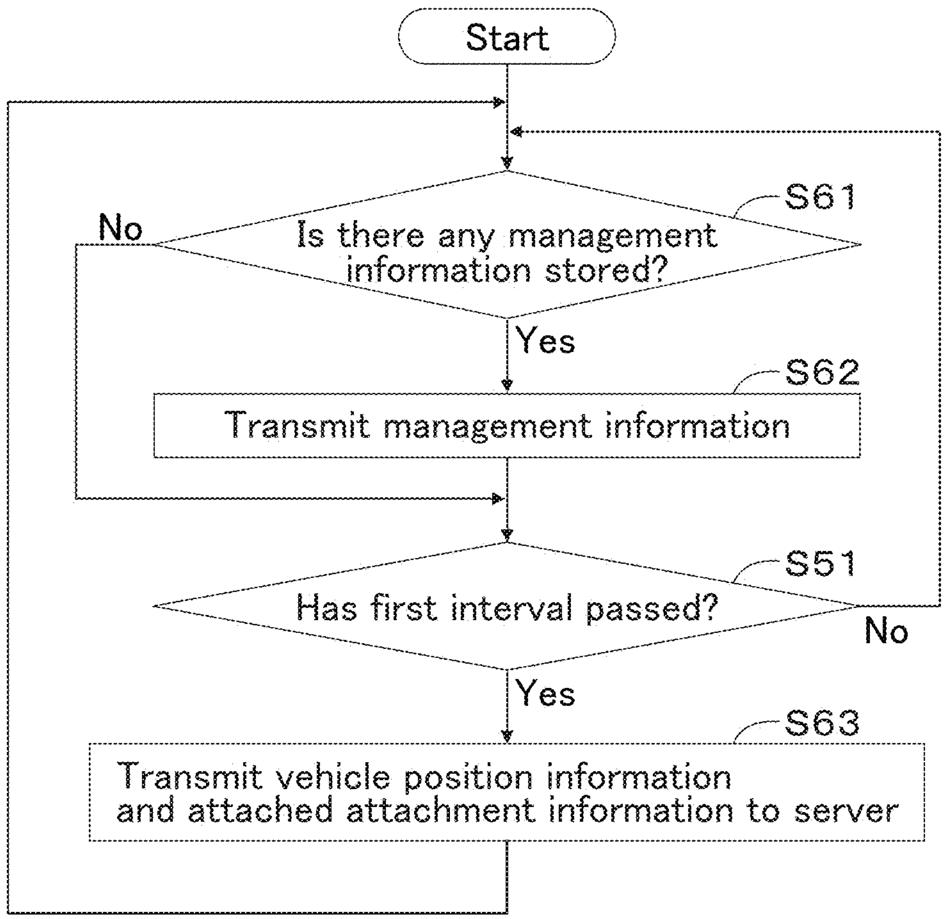
FIG. 14 is a flowchart showing another example of a telematics process.

In FIG. 12, the points in time at which predetermined data is transmitted are fixed to first intervals, but this does not imply any limitation. FIG. 14 is a flowchart showing another example of a telematics process. As shown in FIG. 14, the management information included in the predetermined data may be transmitted upon generation, and the others (the vehicle position information and the attached attachment information) may be transmitted at the first intervals.

The controller 21 determines whether management information is stored or not (S61). In the case where the management information is stored (YES at S61), the controller 21 transmits the management information to the server 80 (S62). The controller 21 deletes, from the storing device 22, the management information transmitted to the server 80. On the other hand, in the case where the management information is not stored (NO at S61), the controller 21 proceeds to S51.

After S62, or in the case of NO at S61, the controller 21 determines whether a first interval (for example, 10 minutes) has passed or not (S51). If a first interval has not passed (NO at S51), the controller returns to S61. On the other hand, if a first interval has passed (YES at S51), the controller 21 transmits the vehicle position information and the attached attachment information to the server 80 via the communicator 24 (S63). The controller 21 deletes, from the storing device 22, the vehicle position information and the attached attachment information transmitted to the server 80. After S63, the controller 21 returns to S61.

Figure 13:
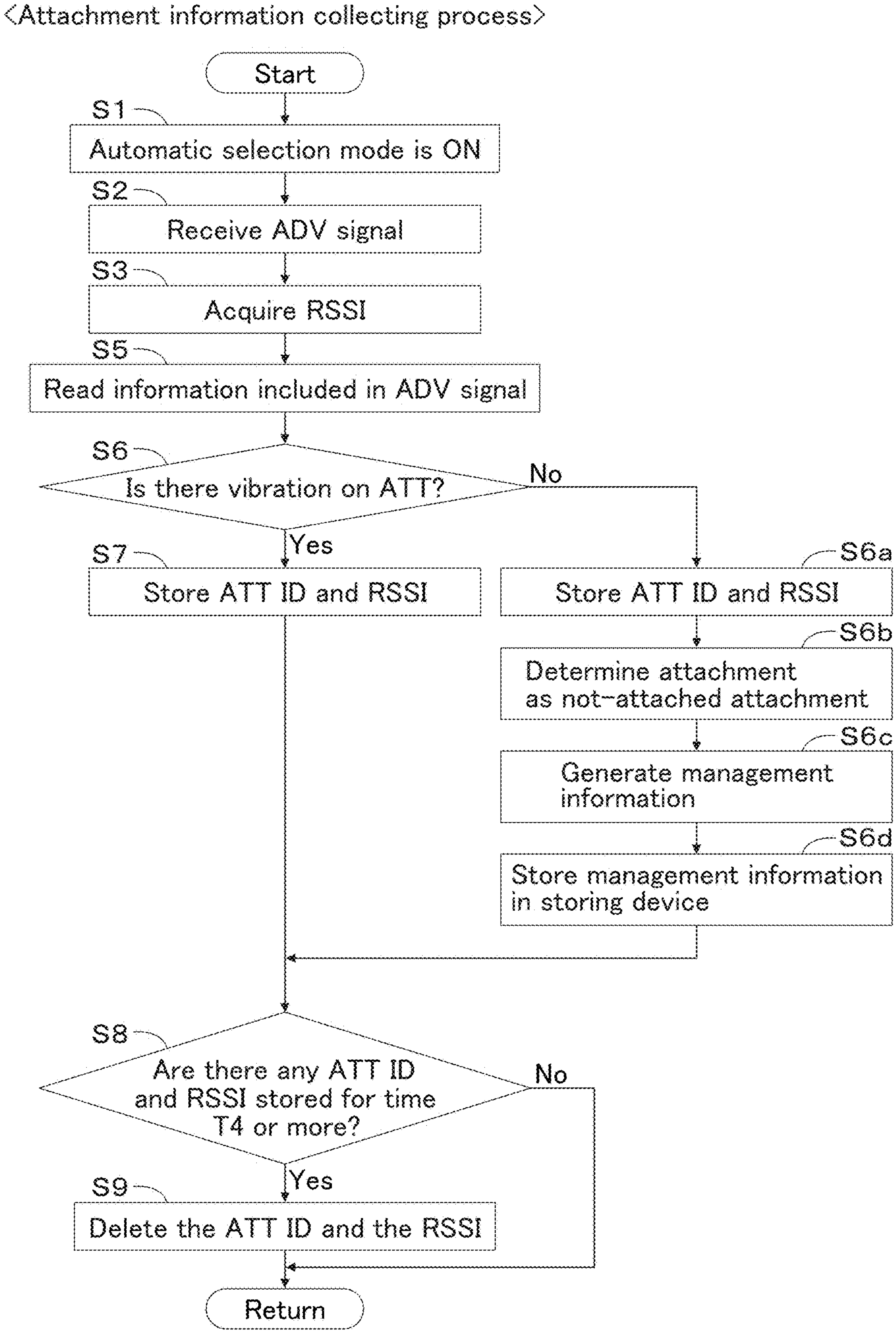
FIG. 13 is a flowchart showing another example of the attachment information collecting process.

As shown in FIG. 13, the controller 21 may select one or more of the advertisement signal(s) Q1 received by the beacon scanner 23 that include vibration information indicating that the attachment 30 is vibrating (YES in S6) and cause the internal memory 21*a* to store, in a first area thereof, only the attachment ID(s) included in the one or more advertisement signals Q1 (S7). In the case where the attachment information collecting process is performed as shown in FIG. 13, the controller 21 may perform the securing-of-attachment recognizing process as discussed with reference to FIG. 7.

For another example, the controller 21 may cause the internal memory 21*a* to store the attachment ID(s) included in all the advertisement signal(s) Q1 received by the beacon scanner 23 from the beacon transmitter(s) 33.

Figure 15:
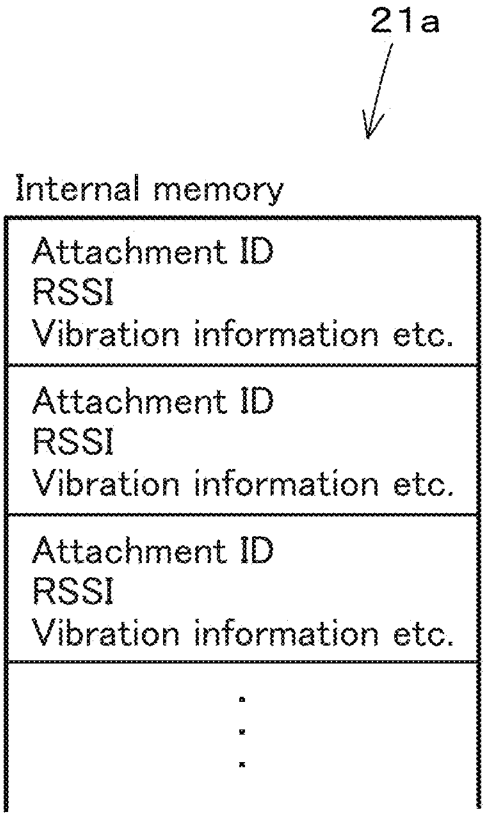
FIG. 15 is a diagram showing another example of information stored in the internal memory of the controller.

With this, as shown in FIG. 15, the attachment IDs and pieces of vibration information included in all the advertisement signals Q1 received by the beacon scanner 23 are collected in the internal memory 21*a*. In such a case, the controller 21 may perform the securing-of-attachment recognizing process as shown in FIGS. 16 to 18, for example.

Figure 16:
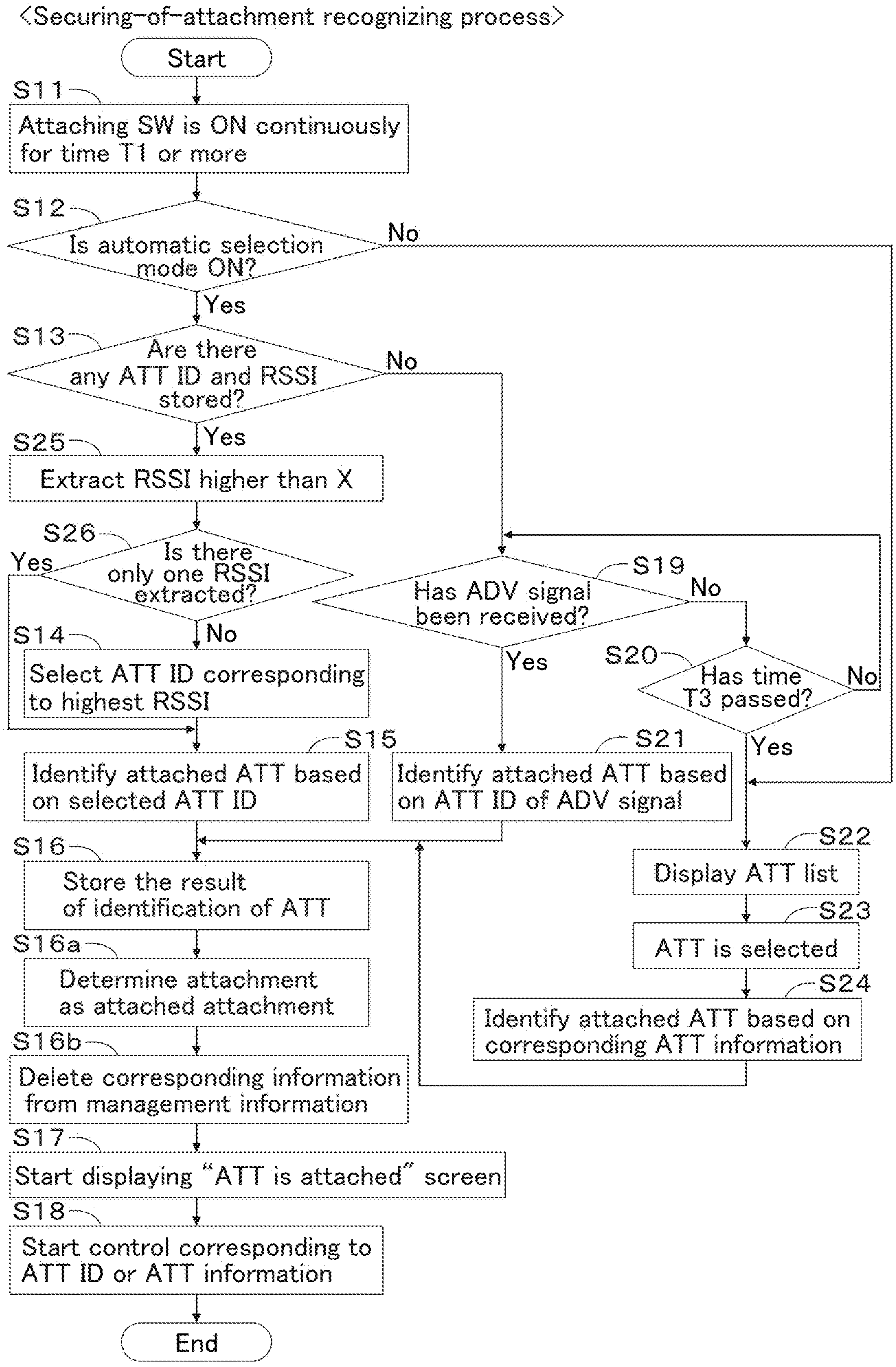
FIG. 16 is a flowchart showing another example of the securing-of-attachment recognizing process.

In FIG. 16, in the case where the internal memory 21*a* stores attachment ID(s) and RSSI(s) (YES in S13), the controller 21 extracts one or more of the RSSI(s) stored in the internal memory 21*a* that are higher than the first predetermined value X (S25). If a single RSSI is extracted (YES in S26), the controller 21 selects the attachment ID corresponding to that RSSI from the internal memory 21*a* and identifies the attachment 30 attached to the quick hitch 16 based on the attachment ID (S15).

In contrast, if two or more RSSIs are extracted (NO in S26), the controller 21 selects the attachment ID corresponding to the highest one of the extracted RSSIs (S14). The controller 21 then identifies the attachment 30 attached to the quick hitch 16 based on the selected attachment ID (S15).

Figure 17:
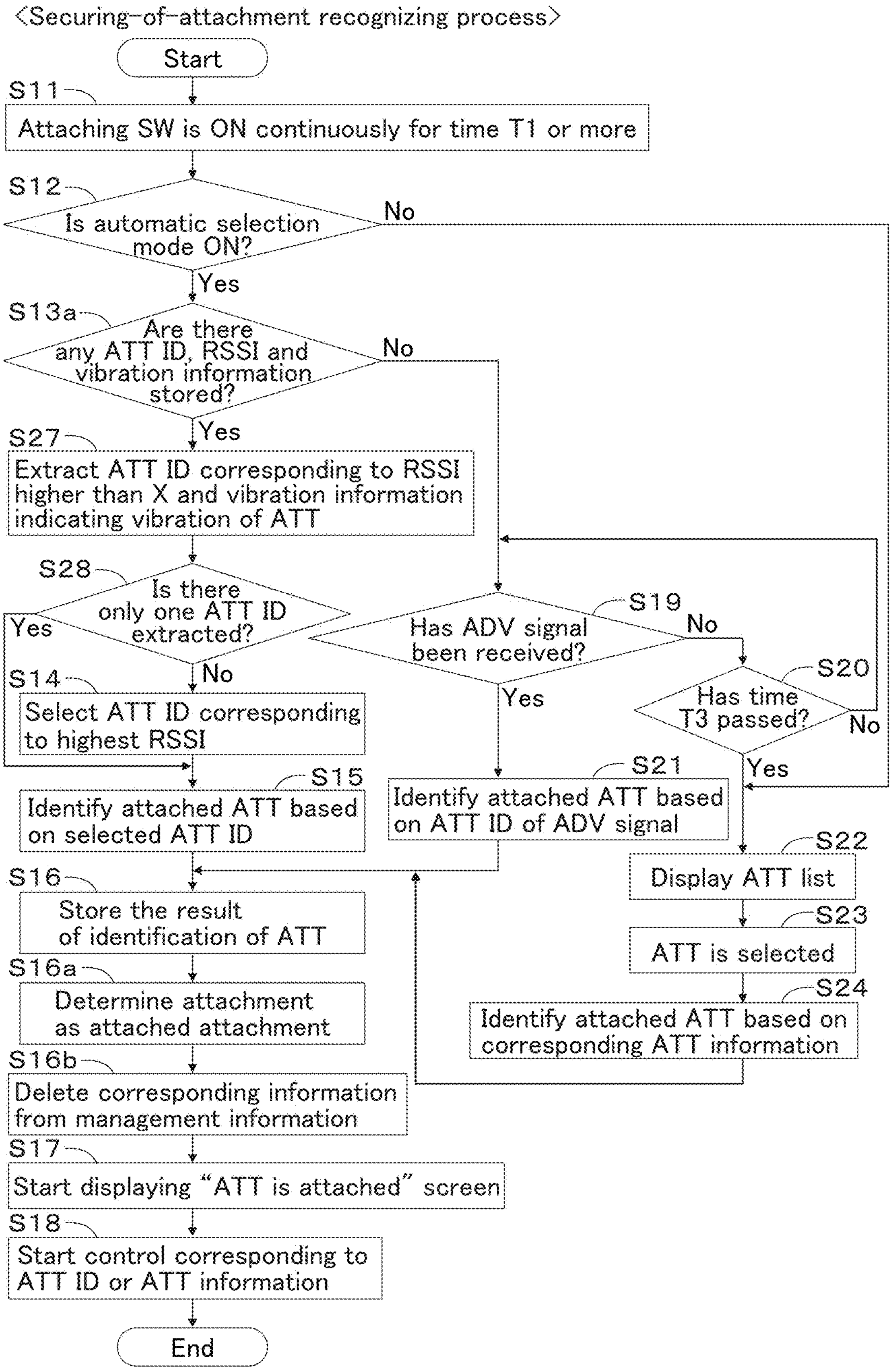
FIG. 17 is a flowchart showing a further example of the securing-of-attachment recognizing process.
Figure 18:
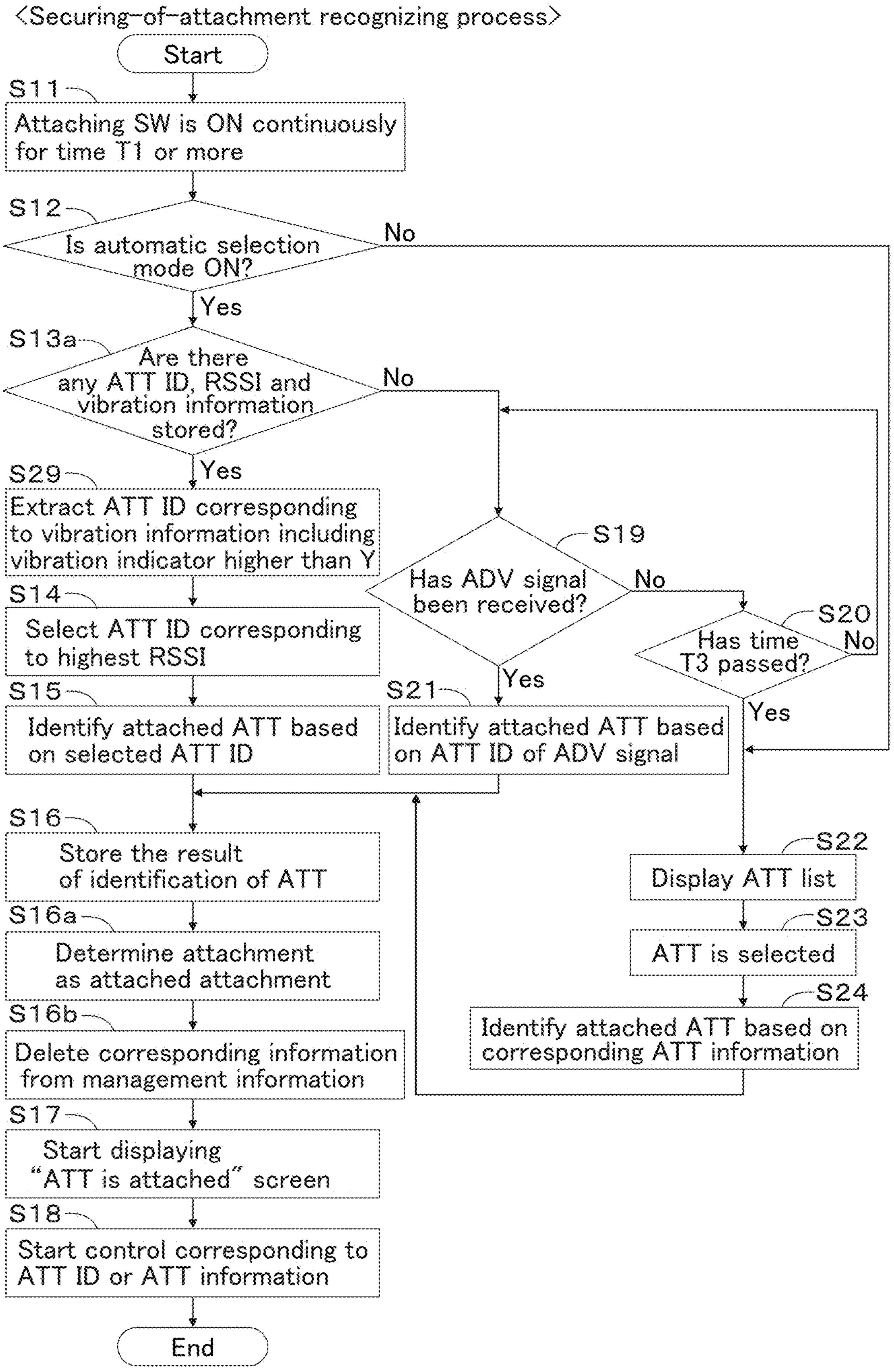
FIG. 18 is a flowchart showing still a further example of the securing-of-attachment recognizing process.

In FIG. 17, in the case where the internal memory 21*a* stores attachment ID(s), RSSI(s), and piece(s) of vibration information (YES in S13*a*), the controller 21 extracts one or more of the attachment ID(s) that correspond to RSSI(s) higher than the first predetermined value X and correspond to piece(s) of vibration information indicating that the corresponding attachment 30 is vibrating (S27). If a single attachment ID is extracted (YES in S28), the controller 21 identifies the attachment 30 attached to the quick hitch 16 based on that attachment ID (S15). That is, the controller 21 selects the extracted attachment ID as the attachment ID of the attachment 30 attached to the quick hitch 16.

On the contrary, if two or more attachment IDs are extracted (NO in S28), the controller 21 selects the attachment ID that corresponds to the highest one of the RSSIs higher than the first predetermined value X (S14). The controller 21 then identifies the attachment 30 attached to the quick hitch 16 based on the selected attachment ID (S15).

In FIG. 18, in the case where the internal memory 21*a* stores attachment ID(s), RSSI(s), and piece(s) of vibration information (YES in S13*a*), the controller 21 extracts one or more of the attachment ID(s) corresponding to piece(s) of vibration information that include a vibration indicator greater than the second predetermined value Y (S29). Next, the controller 21 selects the attachment ID that corresponds to the highest one of the RSSI(s) corresponding to the extracted attachment ID(s) (S14). The controller 21 then identifies the attachment 30 attached to the quick hitch 16 based on the selected attachment ID (S15).

In the securing-of-attachment recognizing process in FIGS. 16 to 18, after the controller 21 performs step S15, the controller 21 causes the storing device 22 to store the result of identification (attached attachment information) of the attachment 30 to be stored as described earlier (S16) and determines that the attachment 30 is a attached attachment (S16*a*). If the attachment ID of the determined attached attachment is included in the management information stored in the storing device 22, the controller 21 deletes the management information relating to this attachment ID from the storing device 22 (S16*b*). After S16*b*, the controller 21 starts a predetermined process corresponding to the selected attachment ID (S17, S18). In the case where the internal memory 21*a* stores no attachment IDs (NO in S13) or in the case where the manual selection mode is selected (NO in S12), the controller 21 performs steps S19 to S24 as described earlier.

Note that, in FIGS. 7 and 16 to 18, if the controller 21 determines that the attachment 30 is an attached attachment (S16*a*), the controller 21 may cause the storing device 22 to store attached attachment information including information in which the identification information of the attachment 30 determined as being an attached attachment is associated with the acting time information relating to the attachment 30 that is determined by the time information measured by the time counter 49 and that relates to the time period during which the attachment 30 has been in action. For example, the acting time information about the attachment 30 is the total time information indicating the total time for which hydraulic fluid has been delivered from the hydraulic fluid outlet port 18*a* to the attachment 30. For example, the controller 21 calculates the total time during which hydraulic fluid has been delivered to the attachment 30 from the hydraulic fluid outlet port 18*a* (AUX), in the period from when the attachment 30 was determined as being attached to when the attachment 30 was determined as being detached. The controller 21 stores the total time information indicating the total time in the storing device 22, and transmits the total time information to the server 80 via the communicator 24.

In an example embodiment as shown in FIG. 7 and the like, the controller 21 selects the attachment ID that corresponds to the highest RSSI from pieces of information (such as attachment IDs and RSSIs) collected in the internal memory 21*a*. However, additionally or alternatively, for example, the controller 21 may select attachment ID(s) satisfying a predetermined condition relating to RSSI from pieces of information collected in the internal memory 21*a*, such as the attachment ID that corresponds to the RSSI closest to a predetermined strength threshold higher than the predetermined value X or the attachment ID that corresponds to the RSSI which has been determined as being equal to or higher than a predetermined strength threshold the predetermined number of times.

Alternatively, the controller 21 may select attachment ID(s) satisfying a predetermined condition relating to vibration information of the attachment 30 from pieces of information collected in the internal memory 21*a*, such as the attachment ID that corresponds to the vibration indicator closest to a predetermined vibration threshold or the attachment ID that corresponds to a vibration indicator which has been determined as being equal to or greater than the vibration threshold the predetermined number of times. Additionally or alternatively, the controller 21 may detect time series variations in RSSI or vibration information collected in the internal memory 21*a* and select attachment ID(s) which match a predetermined variation. That is, the controller 21 may select one or more of the attachment ID(s) collected in the internal memory 21*a* based on a predetermined condition relating to at least one of RSSI or vibration information.

In the above-described example embodiments, each attachment 30 is provided with a beacon transmitter 33 to transmit a wireless signal (advertisement signal Q1) compliant with Bluetooth (registered trademark) Low Energy, and the working vehicle 1 is provided with a beacon scanner 23 to receive the wireless signals. However, additionally or alternatively, for example, the attachment 30 may be provided with a transmitter such as a radio frequency identification (RFID) tag, and the working vehicle 1 may be provided with a receiver to receive wireless signals transmitted from the RFID. Additionally or alternatively, the attachment 30 may be provided with a transmitter to transmit radio waves for some other near field communication, and the working vehicle 1 may be provided with a receiver to receive the radio waves.

In the above-described example embodiments, the working vehicle 1 is provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the user manually attaches the attachment 30 to the hitch or manually detaches the attachment 30 from the hitch, the user may input information indicating that the attachment 30 is attached or detached using the user interface 25.

In the above-described example embodiments, the user inputs attachment information relating to the attachment 30 attached to the quick hitch 16 using the user interface 25 provided in or on the working vehicle 1. However, for example, the user may input attachment information relating to the attachment 30 attached to the quick hitch 16 using a portable terminal 90. That is, the portable terminal 90 may be used as a user interface instead of the user interface 25.

In such a case, upon input of attachment information into the portable terminal 90, the portable terminal 90 transmits the attachment information to the communicator 24 of the working vehicle 1 via the Internet and/or the like. Upon receipt of the attachment information by the communicator 24, the controller 21 of the working vehicle 1 recognizes the attachment 30 attached to the quick hitch 16 based on the attachment ID included in the attachment information.

In the above-described example embodiments, the working device 4, the quick hitch 16, and the specific attachment 30*b* are provided with hydraulic actuators (such as the boom cylinders 14, the front cylinders 15, and the latch cylinder 52). Additionally or alternatively, the working device 4, the quick hitch 16, and the specific attachment may be provided with electric actuators. In the case where an attachment including an electric actuator is attached to the quick hitch 16, the controller 21 may output, as power for the electric actuator, electricity (power) from the battery 20 (FIG. 1) to the attachment via an external electric wire based on control data corresponding to the attachment.

An attachment including a work member to be actuated by power from the prime mover 9 of the working vehicle 1 may be attached to the quick hitch 16. In the case where such an attachment including a work member is attached to the quick hitch 16, the controller 21 may output power from the prime mover 9 to the attachment via a power transmission mechanism including gear(s), shaft(s), and/or the like based on control data corresponding to the attachment.

The working vehicle 1 includes the attaching switch 26 and the detaching switch 27, but this does not imply any limitation. The working vehicle 1 may include a single operation switch to be operated to attach and detach an attachment 30 (allow an attachment 30 to be detached) to and from the quick hitch 16, and the controller 21 may be configured or programmed to, if the operation switch is operated to attach an attachment and the vibration information included in a wireless signal indicates vibration of the attachment 30, determine that the attachment 30 from which the wireless signal is transmitted is an attached attachment attached to the quick hitch 16 (hitch) and delete the piece of management information relating to the attachment 30 determined as an attached attachment.

The controller 21 may be configured or programmed to, if the single operation switch is operated to detach an attachment (allow an attachment to be detached) and the vibration information included in a wireless signal from the attachment 30 determined as being an attached attachment does not indicate vibration of the attachment 30, determine that the attachment 30 from which the wireless signal is transmitted is a not-attached attachment detached from the hitch (quick hitch 16) and cause the storing device 22 to store management information in which the attachment information of the not-attached attachment (for example, at least the identification information of the attachment 30 determined as being a not-attached attachment) is associated with the vehicle position information (as storage location information indicating the storage location of the non-attached attachment) acquired by the position detector 48 when the receiver 23 received the wireless signal.

Figure 22:
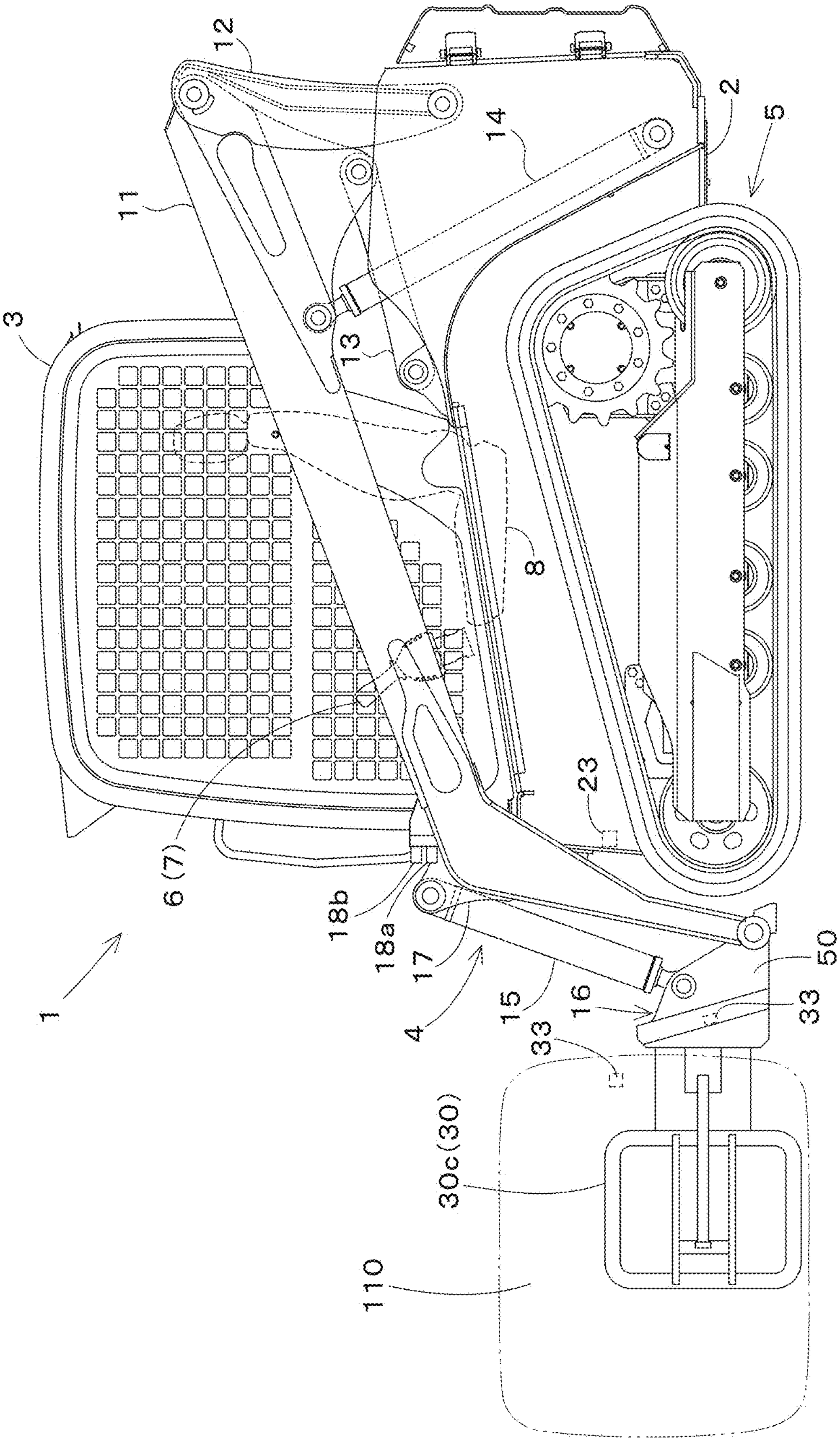
FIG. 22 is a side view of another example of a working vehicle.

The working vehicle 1 can also manage object(s) 110 (for example, a roll bale or the like) which can be carried by the attachment 30. FIG. 22 is a side view of another example of a working vehicle. The working vehicle 1 shown in FIG. 22 has a specific attachment 30*c* that can transport an object 110 attached thereto. The specific attachment 30*c* is an attachment that can hold and move the object 110 up and down, and includes, for example, a bale grab or a bale handler, etc., but may be another attachment 30.

The object 110 is, for example, a roll bale, a roll bale wrap silo, or the like. A roll bale is crops such as dried grass or straw collected, compressed and packed into a cylindrical form. A roll bale wrap silo is a wrapped and ensiled roll bale. Assume here that the object 110 is a roll bale. The object 110 may be a transportable object other than a roll bale and a roll bale wrap silo. As shown in FIG. 22, a transmitter 33 is provided in or on the object 110. For example, the transmitter 33 is attached at a certain position on the outer peripheral surface of the cylindrical object 110, but may also be attached to any position on the top surface or the bottom surface other than the outer peripheral surface.

Figure 23A:
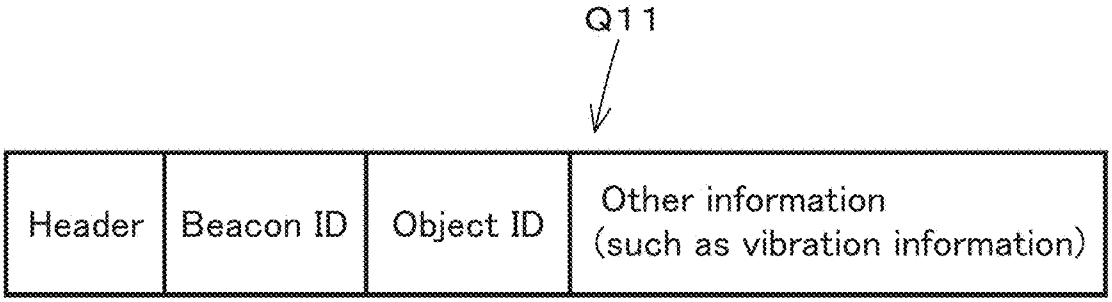
FIG. 23A is a diagram showing an example of information included in an advertisement signal transmitted from a beacon transmitter of an object.

The receiver 23 is configured or programmed to receive an advertisement signal Q11 that is an object wireless signal transmitted from the transmitter 33 in or on the object 110 to be transportable by the attachment 30. FIG. 23A is a diagram showing an example of information included in the advertisement signal Q11 transmitted from the beacon transmitter 33 of the object 110. The object wireless signal (that is, the advertisement signal Q11) includes object information relating to the object 110. The object information includes, for example, (i) at least one of the shape, size, weight, moisture content, the type of grass or straw, or the date of formation (the day the object was formed and discharged by the roll baler) of the object 110, and (ii) the ID of the object 110.

When the identification information of the attachment 30 indicates a specific attachment 30*c* or when the user selects the specific attachment 30*c*, the controller 21 switches from the attachment management mode in which attachments 30 are managed to a transported-object management mode, and make a determination regarding the object 110 using an object wireless signal (that is, the advertisement signal Q11) from the object 110 instead of a wireless signal (advertisement signal Q1) from the specific attachment 30*c*.

Specifically, pressure sensor(s) is provided in a fluid passage connected to at least one of the boom cylinders 14 or the front cylinders 15. The controller 21 is configured or programmed to determine whether or not there is a load on the attachment 30, i.e., whether the attachment 30 is holding the object 110 (or whether the object 110 is placed on the attachment 30), based on the pressure in the cylinder(s) detected by the pressure sensor. In the case where the controller 21 is in the transported-object management mode, after a transition occurs from a state in which the controller 21 determines that the object 110 is not being held (or not placed on the attachment 30) to the state in which the controller 21 determines that the object 110 is being held (or placed on the attachment 30), if the working vehicle 1 is caused to travel and the RSSI of the advertisement signal Q11 received from the beacon transmitter 33 of the object 110 continues to be higher (greater) than a predetermined value (first predetermined value) X, the controller 21 acquires information included in the advertisement signal Q11 (the ID of the object 110 and the like). In other words, the controller 21 determines that the object 110 indicated by the ID is being transported.

When the controller 21 is in the transported-object management mode, the controller 21 determines that the position indicated by the vehicle position information, acquired by the position detector 48 when the load on the attachment 30 (the attachment here is the specific attachment 30*c*) reached a predetermined value or below, is the drop-off position of the object 110 indicated by the object information included in the object wireless signal (position at which the object 110 was unloaded from the attachment 30).

For example, in the case where the controller 21 is in the transported-object management mode, if a transition occurs from a state in which the controller 21 determines that the object 110 is being held (or the object 110 is placed on the attachment) to a state in which the controller 21 determines the object 110 is not being held (or not placed on the attachment), the controller 21 determines that the object 110 indicated by the ID of the object 110 in the advertisement signal Q11 that was stored so far in the storing device 22 was unloaded.

Figure 23B:
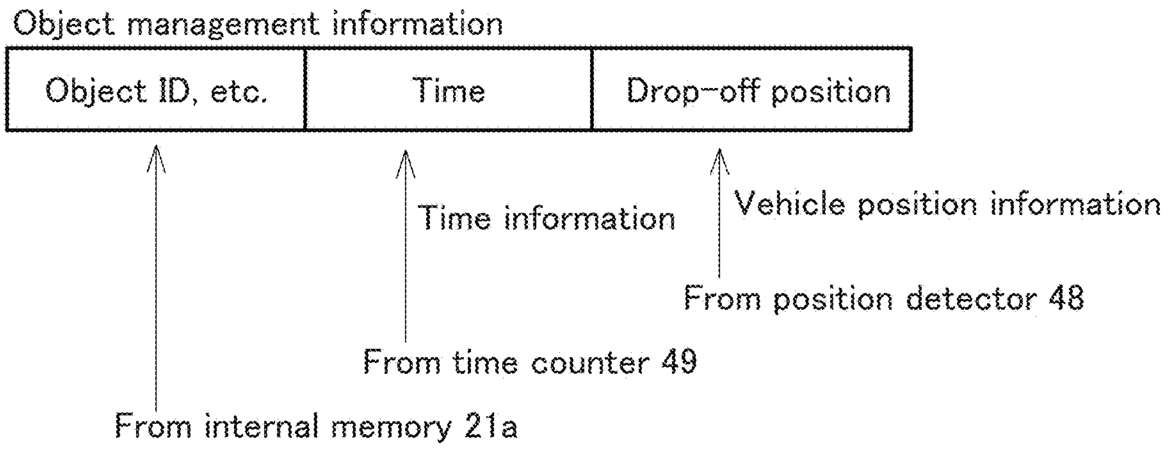
FIG. 23B is a diagram showing an example of generation of object management information.

The controller 21 generates object management information in which object information and placement information indicating the drop-off position are associated with each other. FIG. 23B is a diagram showing an example of the generation of object management information. As shown in FIG. 23B, the controller 21 generates object management information in which the object information (for example, at least the identification information of the object 110 transported and unloaded using the specific attachment 30*c*) is associated with the position indicated by the vehicle position information (as placement information indicating the drop-off position) acquired by the position detector 48 when the load on the specific attachment 30*c* reached a predetermined value or below. The controller 21 stores the generated object management information in the storing device 22. The controller 21 may cause the storing device 22 to store the placement information associated with the time information measured by the time counter 49 when the receiver 23 received the object wireless signal. The object management information includes information about the object 110 (information such as the ID of the object 110, moisture content, the working day), the placement information indicating the drop-off position, and time information, and is stored in the storing device 22. The controller 21 transmits the object management information to the external information processor 80 via the communicator 24.

Figure 23C:
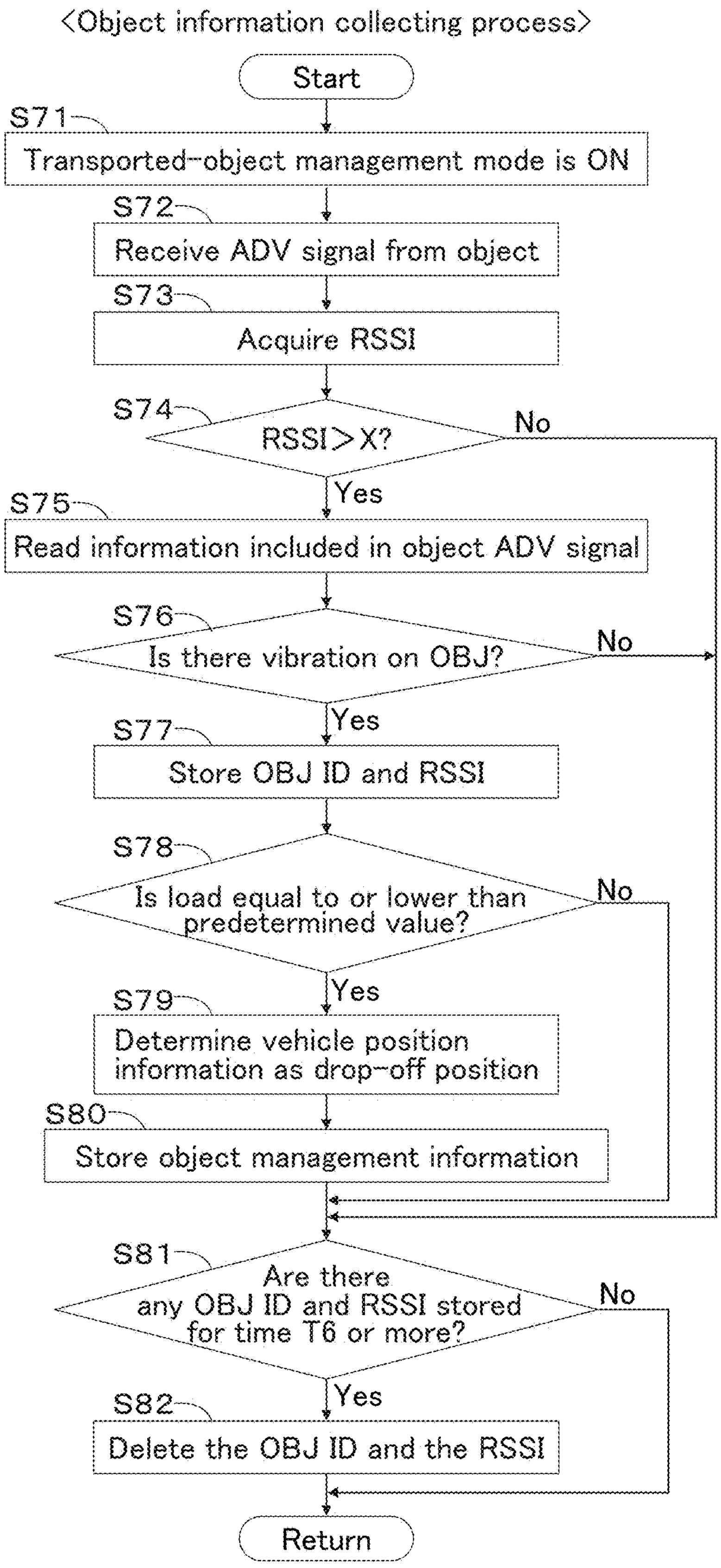
FIG. 23C is a flowchart showing an example of an object information collecting process.

FIG. 23C is a flowchart showing an example of an object information collecting process. In FIG. 23C, for convenience of description, the advertisement signal Q11 from the object 110 is referred to as "ADV signal" and the object 110 as "OBJ".

The advertisement signal Q11 includes a header, a beacon ID (tag serial number), the ID of the object 110, and other information. The other information includes the object information except for the ID of the object 110. For example, the other information may include at least one of the shape, size, weight, moisture content, the type of grass or straw, or the date of formation (the day the object was formed and discharged by the roll baler) of the object 110.

Returning to FIG. 23C, in the case where the controller 21 is in the transported-object management mode (S71), when the beacon scanner 23 receives the advertisement signal Q11 from the object 110 (S72), the controller 21 acquires the ID of the object 110 and the RSSI of the advertisement signal Q11 from the beacon scanner 23 (S73).

Next, if the acquired RSSI is higher than a predetermined value (first predetermined value) X (YES at S74), the controller 21 reads the information included in the received advertisement signal Q11 (S75).

Next, if the information read from the advertisement signal Q11 includes vibration information indicating that the attachment 30 is vibrating, the controller 21 determines that there is vibration on the object 110 (YES at S76). Alternatively, if the information read from the advertisement signal Q11 includes a vibration indicator and the vibration indicator is greater than a predetermined value (second predetermined value) Y, the controller 21 determines that there is vibration on the object 110 (YES at S76).

Then, in the case where the controller 21 determines that there is vibration on the object 110 (YES at S76), the controller 21 causes the internal memory 21*a* to store the ID of the object 110 included in the received advertisement signal Q11 and the RSSI of the advertisement signal Q11 such that the ID and the RSSI are associated with each other (S77). In so doing, the controller 21 causes the internal memory 21*a* to also store, for example, information indicating the time the ID of the object 110 and the RSSI were stored (time information, timestamp or the like measured by the time counter 49, etc.) such that the information is associated with the ID of the object 110 and the RSSI. The controller 21 may cause the internal memory 21*a* to also store the beacon ID and/or other information, etc., included in the received advertisement signal Q11 such that the beacon ID and/or other information, etc., are associated with the ID of the object 110 and the RSSI.

When the load on the attachment 30 (that is, the specific attachment 30*c*) has reached a predetermined value or below (YES at S78), the controller 21 determines that the position indicated by the vehicle position information acquired by the position detector 48 when the load reached the predetermined value or below is the drop-off position of the object 110 indicated by the object information included in the object wireless signal (S79).

After S79, the controller 21 causes the storing device 22 to store the object management information in which the object information and the placement information indicating the drop-off position are associated with each other (S80).

After S80, or in the case of No at S74, No at S76, or No at S78, if any of the ID(s) of object(s) 110 and RSSI(s) in the internal memory 21*a* has been stored for a period of time T6 or more (YES in S81), the controller 21 deletes that ID(s) of object(s) 110 and RSSI(s) from the internal memory 21*a* (S82). It is noted here that the controller 21 also deletes, from the internal memory 21*a*, other information (such as time point information) corresponding to the ID(s) of object(s) 110 having been stored for the period of time T6 or more. The period of time T6 is, for example, about 2 to about 3 seconds, but is not limited to such durations. After step S82, the controller 21 repeats step S71 and subsequent steps if the transported-object management mode is ON.

Figure 24:
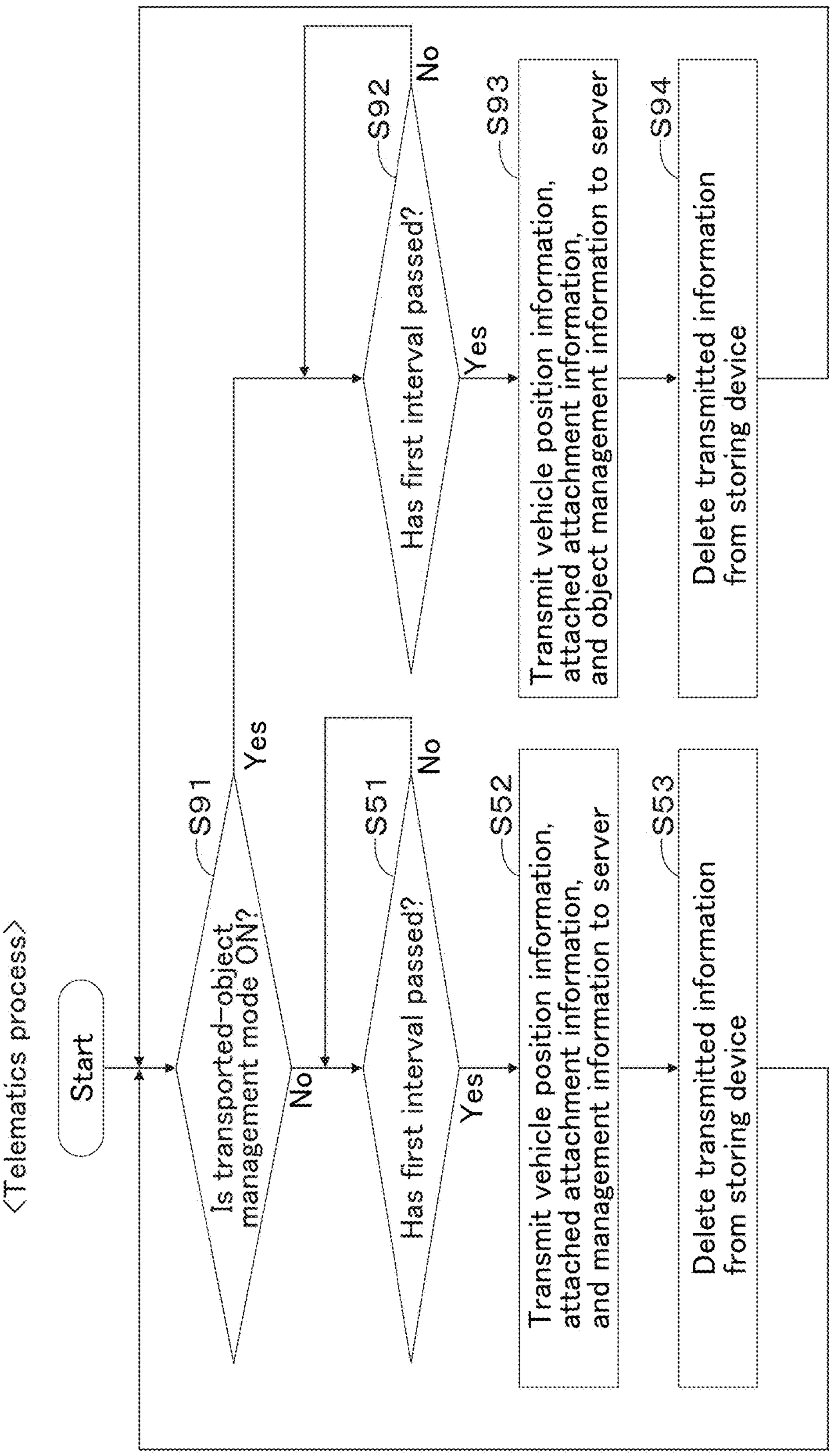
FIG. 24 is a flowchart showing another example of a telematics process.

The controller 21 performs a telematics process as shown in FIG. 24. With this, the communicator 24 of the working vehicle 1 performs telematics communication with the server 80. FIG. 24 is a flowchart showing another example of a telematics process.

The controller 21 performs telematics communication in which (i) in the case where the controller 21 is in the attachment management mode, the controller 21 transmits first data (for example, various information about the working vehicle 1 and the working device 4, attached attachment information, and management information about not-attached attachment(s)) stored in the storing device 22 to the server 80, and (ii) in the case where the controller 21 is in the transported-object management mode, the controller 21 transmits second data (for example, various information about the working vehicle 1 and the working device 4, attached attachment information, and object management information) stored in the storing device 22 to the server 80.

For example, in the case where the controller 21 is not in the transported-object management mode (No at S91), that is, if the controller 21 is in the attachment management mode, the controller 21 proceeds to S51. Steps S51 to S53 are the same as those in FIG. 12, and therefore the description therefor is omitted here.

On the other hand, in the case where the controller 21 is in the transported-object management mode (YES at S91), the controller 21 causes the communicator 24 to transmit second data (at least vehicle position information, attached attachment information, and object management information) at first interval(s).

The controller 21 determines whether a first interval (for example, about 10 minutes) has passed or not (S92). If a first interval has not passed (NO at S92), the controller 21 returns to S92. On the other hand, if a first interval has passed (YES at S92), the controller 21 causes the communicator 24 to transmit second data (the second data here includes vehicle position information, attached attachment information, and object management information) to the server 80 (S93). That is, the controller 21 transmits the vehicle position information, the attached attachment information, and the object management information at first interval(s) to the server 80. The controller 21 deletes, from the storing device 22, the second data (vehicle position information, attached attachment information, and object management information) transmitted to the server 80 (S94). After S94, the controller 21 returns to S91.

Figure 25:
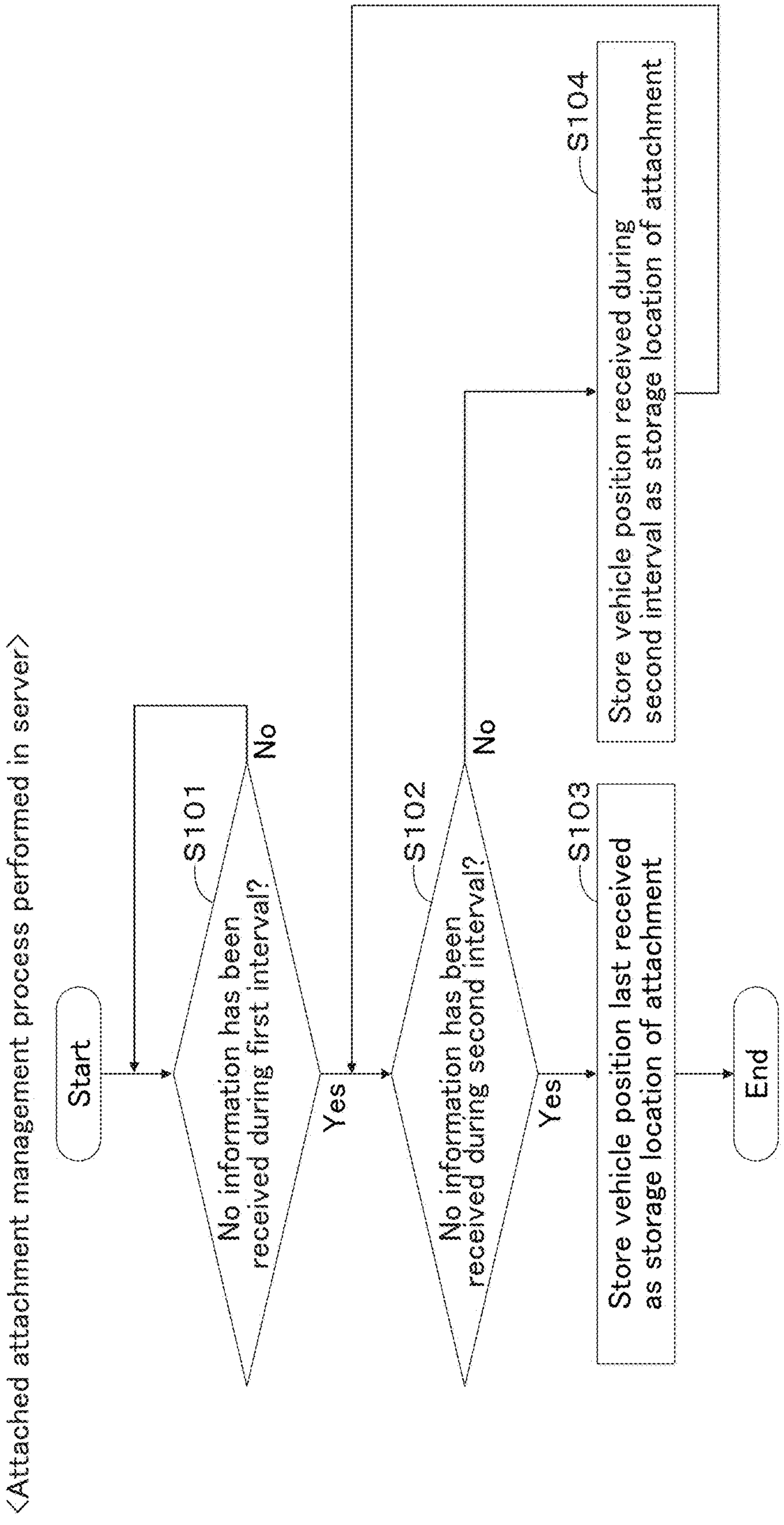
FIG. 25 is a flowchart showing an example of attached attachment management performed in a server.

The following discusses an attached attachment management processes performed by the server 80 in a case that the information sent from the working vehicle 1 is not received anymore or where the information is now received at second intervals longer than the first intervals. FIG. 25 is a flowchart showing an example of attached attachment management performed by a server.

For example, when the prime mover 9 stops, the working vehicle 1 is turned off and the working vehicle 1 ends the telematics communication with the server 80. Specifically, the vehicle position information about the working vehicle 1 and the information relating to the attachment 30 attached to the working vehicle 1 (attached attachment information) are not transmitted to the server 80 anymore. Alternatively, some working vehicles 1 are such that, even though the working vehicle 1 is turned off when the prime mover 9 stops, the working vehicle 1 continues the telematics communication in a limited manner based on the power from the battery 20. That is, the vehicle position information and the attached attachment information continue to be transmitted to the server 80 at second interval(s) longer than the first interval(s).

In the case where the server 80 does not fall under "no information has been received from the working vehicle 1 within a first interval" (NO at S101), i.e., if the server 80 receives information transmitted from the working vehicle 1 within a first interval, the telematics communication is performed normally, and therefore the process returns to S101.

On the other hand, in the case where the server 80 does not receive information transmitted from the working vehicle 1 within a first interval (YES at S101), the server 80 determines whether or not the server 80 does not receive information transmitted from the working vehicle 1 within a second interval longer than the first interval (S102).

In the case where the server 80 does not receive information transmitted from the working vehicle 1 within a second interval (YES at S102), the server 80 determines that the communication (for example, telematics communication) with the server 80 has ended, and stores the vehicle position last received as the storage location of the attachment 30 (S103). Specifically, the server 80 manages, as the storage location of the attachment 30 attached to the working vehicle 1, the vehicle position indicated by the vehicle position information transmitted last from the working vehicle 1 and stored.

On the other hand, in the case where the server 80 receives information transmitted from the working vehicle 1 within a second interval, communication different from a normal telematics communication is being performed. Therefore, the server 80 stores, as the storage location of the attachment, the vehicle position received within a second interval (S104), and returns to S102.

Even in the case where the prime mover 9 of the working vehicle 1 stops and the information relating to the attachment 30 attached to the working vehicle 1 (attached attachment information) is not transmitted anymore to the server 80, the server 80 can determine the storage location of the attachment 30 attached to the working vehicle 1 via the process shown in FIG. 25.

As has been described, the working vehicle 1 can manage not-attached attachment(s) (attachment(s) 30 not attached to the working vehicle 1), but this does not imply any limitation. For example, the portable terminal 90 can be used to manage not-attached attachment(s).

Figure 26:
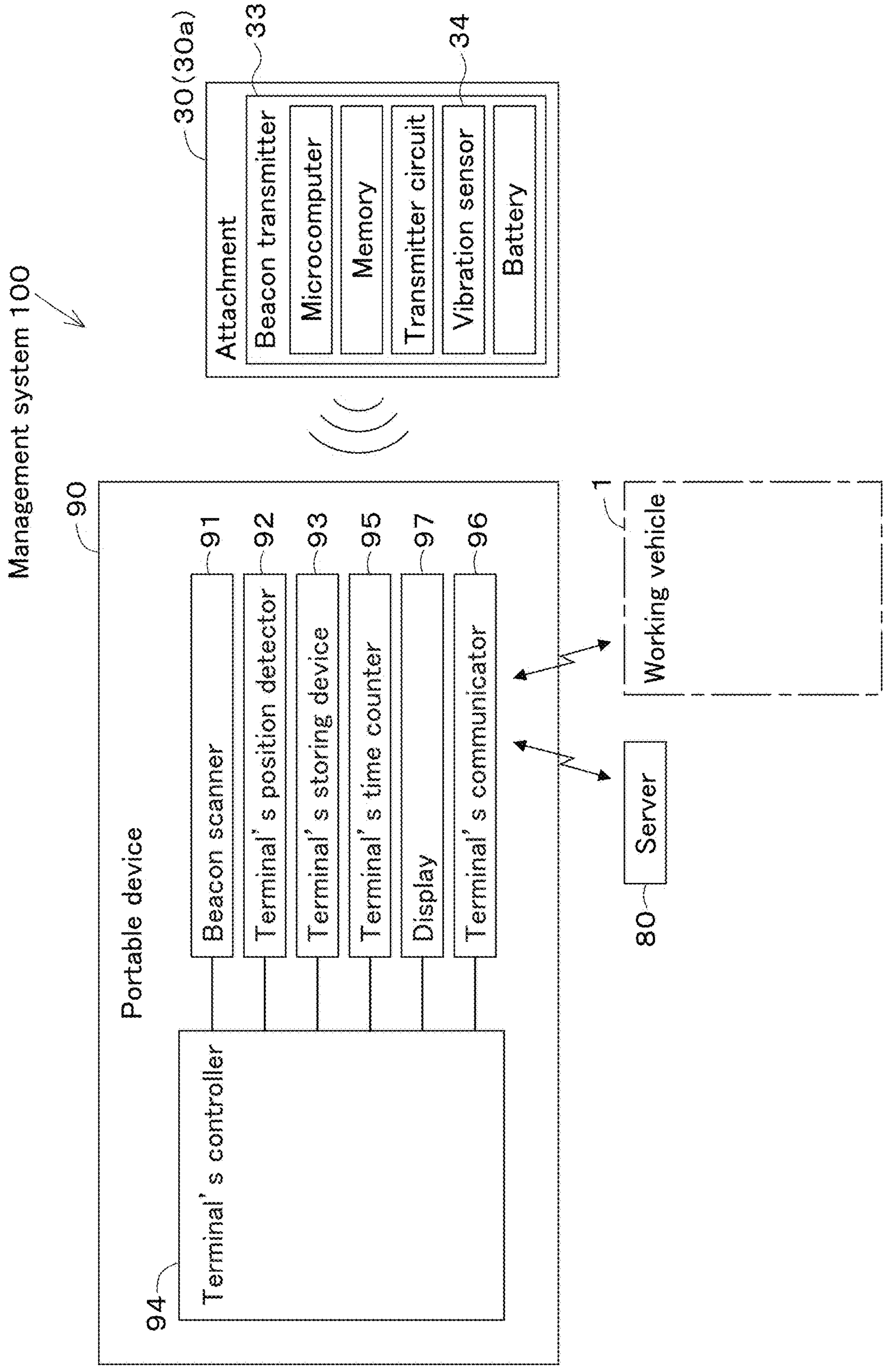
FIG. 26 is a block diagram of a management system and a portable terminal.

FIG. 26 is a block diagram of a management system and a portable terminal. The portable terminal 90 includes a terminal receiver 91, a terminal position detector 92, a terminal storing device (terminal memory and/or a storage) 93, and a terminal controller 94.

The terminal receiver 91 is, for example, a beacon scanner, and receives an advertisement signal Q1 that is a wireless signal transmitted from a transmitter 33 in or on an attachment 30. The portable terminal 90 causes an internal memory of the terminal controller 94 to store the advertisement signal Q1 received by the terminal receiver 91.

The terminal position detector 92 acquires terminal position information indicating the position of the portable terminal 90. For example, the terminal position detector 92 includes a receiver to receive satellite signal(s) (position(s) of positioning satellite(s), time of transmission, correction information, and/or the like) from satellite positioning system(s) (positioning satellite(s)), and detects the current position (for example, latitude and longitude) based on the received satellite signal(s).

The terminal storing device 93 includes, for example, a nonvolatile memory. The terminal controller 94 is configured or programmed to read software program(s) and control data from the terminal storing device 93 and perform various processes based on the software program(s) and the control data, via one or more processors.

In the case where the vibration information included in the wireless signal (that is, advertisement signal Q1) does not indicate vibration of the attachment 30, the terminal controller 94 determines that the attachment 30 from which the wireless signal is transmitted a not-attached attachment.

Figure 27A:
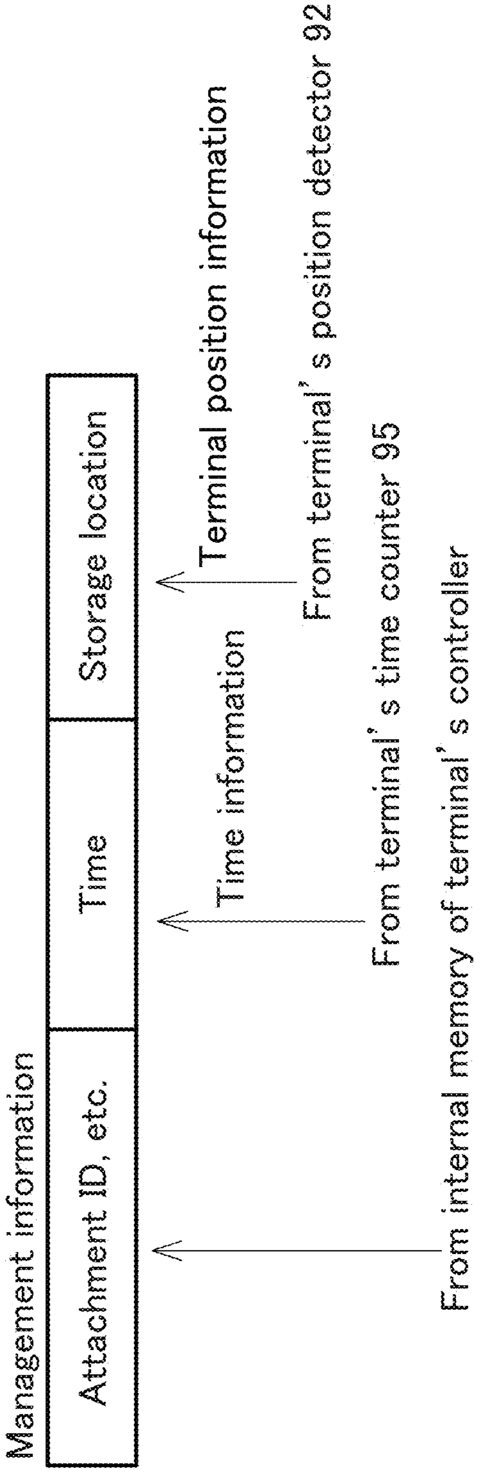
FIG. 27A is a diagram showing an example of generation of management information.

FIG. 27A is a diagram showing an example of the generation of management information. As shown in FIG. 27A, the terminal controller 94 generates management information in which the attachment information about the not-attached attachment (for example, at least the identification information of the attachment 30 determined as being a not-attached attachment) is associated with the terminal position information acquired by the terminal position detector 92 when the terminal receiver 91 received the wireless signal (the terminal position information here is used as the storage location information indicating the storage location of the not-attached attachment), and causes the terminal storing device 93 to store the management information. The measured position of the portable terminal 90 is allocated as the storage location of the not-attached attachment. The storage location of the not-attached attachment here is the point represented by the latitude, longitude and/or address, but this does not imply any limitation.

The terminal controller 94 creates a storing list including the management information and stores the storing list in the terminal storing device 93. FIG. 27B is a diagram showing an example of a storing list displayed on a display. As shown in FIG. 27B, the terminal controller 94 causes the display 97 to display the storing list. On the other hand, the terminal controller 94 does not include (exclude) the identification information of the attachment 30 determined as being an attached attachment into (from) the storing list.

The portable terminal 90 includes a terminal time counter 95. The terminal controller 94 associates, with the identification information of the attachment 30 determined as being a not-attached attachment, the time information measured by the terminal time counter 95 when the terminal position detector 92 acquired the terminal position information. Specifically, as shown in FIG. 27A, the terminal controller 94 generates management information in which the time information is associated with the identification information of the not-attached attachment (the ID of the attachment 30) and the storage location information.

The storing list shown in FIG. 27B includes three not-attached attachments. FIG. 27B shows the storing list in which the attachment IDs (for example, "ATT0011", "ATT0032" and "ATT0008") of three not-attached attachments, the names and icons of these three attachments, their storage locations, the times when they were determined as being not-attached attachments, are associated with each other.

The portable terminal 90 includes a terminal communicator 96 which can perform data communication with an external information processor 80. The terminal controller 94 causes the terminal communicator 96 to transmit the storing list to the external information processor 80.

The terminal controller 94 determines that the attachment 30 is an attached attachment if the vibration information included in the wireless signal indicates vibration of the attachment 30 and the identification information of the attachment 30 indicated by the attached attachment information received by the terminal communicator 96 from the external information processor 80 matches the identification information included in the wireless signal.

The terminal controller 94 determines that the attachment 30 is a moved attachment moved by a carrier if the vibration information included in the wireless signal indicates vibration of the attachment 30 and the identification information of the attachment 30 indicated by the attached attachment information received by the terminal communicator 96 from the external information processor 80 does not match the identification information included in the wireless signal.

The portable terminal 90 includes a display 97. The terminal controller 94 approves the storing list upon receipt of an instruction to approve the storing list displayed on the display 97 from the user, and corrects the storing list upon receipt of an instruction to correct the storing list displayed on the display 97 from the user. For example, in the case where the storing list as shown in FIG. 27B is displayed, when the user touches an OK button 97*a*, that is, when the terminal controller 94 receives an instruction to approve the storing list from the user, the terminal controller 94 approves the storing list shown in FIG. 27B. On the other hand, when a correction button 97*b* is touched by the user and one of the three pieces of management information is touched to be selected, this makes it possible to edit (correct) the selected piece of management information such as correcting the content of the selected piece of management information or deleting the selected piece of management information.

When the user performs a predetermined operation on the portable terminal 90, the terminal controller 94 determines that an instruction to start preparing a list is provided, and determines, based on the vibration information included in advertisement signal(s) received by the terminal receiver 91 during a predetermined period of time from the starting instruction, whether the attachment 30 from which the advertisement signal is transmitted is a not-attached attachment or not. The predetermined period is, for example, an interval which starts when the starting instruction is provided and at which the advertisement signal is transmitted, but this does not imply any limitation. Note that the instruction to start preparing a list is not limited to a predetermined operation by the user on the portable terminal 90. The terminal controller 94 may determine that an instruction to start preparing a list is provided when an advertisement signal is received.

Working vehicles 1 and management systems 100 according to example embodiments described so far may include the following characteristic feature(s) and may achieve the following effect(s).

(Item A1) A working vehicle 1 including a hitch (quick hitch 16) to attach and detach an attachment 30 thereto and therefrom, a receiver (beacon scanner) 23 to receive a wireless signal which is transmitted from a transmitter 33 (beacon transmitter) in or on the attachment 30 and which is compliant with a near field communication standard, a position detector 48 to acquire vehicle position information indicating a position of the working vehicle 1, a memory and/or a storage 22 (nonvolatile memory), and a controller 21, wherein the wireless signal includes identification information and vibration information relating to the attachment 30, and the controller 21 is configured or programmed to, if the vibration information included in the wireless signal does not indicate vibration of the attachment 30, determine that the attachment 30 from which the wireless signal is transmitted is a not-attached attachment not attached to the hitch (quick hitch 16), and generate management information and cause the memory and/or the storage 22 to store the management information, the management information being information in which the identification information of the attachment 30 determined as being the not-attached attachment is associated with storage location information indicating a storage location of the not-attached attachment, the storage location information being the vehicle position information acquired by the position detector 48 when the receiver 23 received the wireless signal.

With the above configuration, the controller 21 is capable of determining that an attachments 30 that is present in the vicinity of the working vehicle 1 but is not attached is a not-attached attachment, and storing the acquired vehicle position as the storage location of the not-attached attachment (the attachment 30 not attached to the working vehicle 1). That is, the controller 21 makes it possible to provide management information indicating the location of the not-attached attachment for which position information cannot be acquired, without having to provide a position detector 48 to each not-attached attachment. This makes it possible for a manager to appropriately manage attachments 30 using the management information.

(Item A2) The working vehicle 1 according to item A1, further including a first operation switch (attaching switch) 26 to be operated to attach the attachment 30 to the hitch (quick hitch 16), wherein the controller 21 is configured or programmed to, if the first operation switch 26 is operated and the vibration information included in the wireless signal indicates vibration of the attachment 30, determine that the attachment 30 from which the wireless signal is transmitted is an attached attachment attached to the hitch (quick hitch 16), and delete the management information relating to the attachment 30 determined as being the attached attachment.

With the above configuration, if a not-attached attachment is changed to an attached attachment, the management information relating to the not-attached attachment is deleted. Thus, only management information relating to not-attached attachment(s) is left, so that the not-attached attachments can be managed appropriately.

(Item A3) The working vehicle 1 according to item A1 or A2, further including a second operation switch (detaching switch) 27 to be operated to allow the attachment 30 to be detached from the hitch (quick hitch 16), wherein the controller 21 is configured or programmed to, if the second operation switch 27 is operated and the vibration information included in the wireless signal from the attachment 30 determined as being the attached attachment does not indicate vibration of the attachment 30, determine that the attachment 30 from which the wireless signal is transmitted is the not-attached attachment detached from the hitch (quick hitch 16), and cause the memory and/or the storage 22 to store the management information in which the identification information of the attachment 30 determined as being the not-attached attachment is associated with the storage location information indicating the storage location of the not-attached attachment, the storage location information being the vehicle position information acquired by the position detector 48 when the receiver 23 received the wireless signal.

With the above configuration, the controller 21 is capable of, when an attachment 30 is detached from the hitch (quick hitch 16), determining that the detached attachment 30 is a not-attached attachment, and managing, as the storage location of the not-attached attachment, the vehicle position obtained when the attachment 30 was detached.

(Item A4) The working vehicle 1 according to any one of items A1 to A3, wherein the controller 21 is configured or programmed to, if a received signal strength of the wireless signal is greater than a first predetermined value (predetermined value X) and the vibration information included in the wireless signal does not indicate vibration of the attachment 30, determine that the attachment 30 is the not-attached attachment.

With the above configuration, the controller 21 is capable of appropriately determining that an attachments 30 that is present in the vicinity of the working vehicle 1 but is not attached is a not-attached attachment, and storing the acquired vehicle position as the storage location of the not-attached attachment (the attachment 30 not attached to the working vehicle 1).

(Item A5) The working vehicle 1 according to any one of items A1 to A4, further including a time counter 49, wherein the controller 21 is configured or programmed to cause the memory and/or the storage 22 to store the storage location information associated with time information measured by the time counter 49 when the receiver 23 received the wireless signal.

With the above configuration, it is possible to further associate the time information with the storage location information indicating the storage location of the not-attached attachment. Thus, the controller 21 is able to manage the not-attached attachment, the storage location of the not-attached attachment, and the time which are associated with each other, as management information. That is, the manager can know the storage location and the management time about the not-attached attachment. The management time is the time at which the management information was generated or the time at which the attachment was determined as being a not-attached attachment.

(Item A6) The working vehicle 1 according to any one of items A1 to A5, further including an operation switch to be operated to attach the attachment 30 to the hitch (quick hitch 16) and allow the attachment 30 to be detached from the hitch (quick hitch 16), wherein the controller 21 is configured or programmed to, if the operation switch is operated to attach the attachment 30 and the vibration information included in the wireless signal indicates vibration of the attachment 30, determine that the attachment 30 from which the wireless signal is transmitted is an attached attachment attached to the hitch, and delete the management information relating to the attachment 30 determined as being the attached attachment.

With the above configuration, if a not-attached attachment is changed to an attached attachment, the management information relating to the not-attached attachment is deleted. Thus, only management information relating to not-attached attachment(s) is left, so that the not-attached attachments can be managed appropriately.

(Item A7) The working vehicle 1 according to item A6, wherein the controller 21 is configured or programmed to, if the operation switch is operated to allow the attachment 30 to be detached and the vibration information included in the wireless signal from the attachment 30 determined as being the attached attachment does not indicate vibration of the attachment 30, determine that the attachment 30 from which the wireless signal is transmitted is the not-attached attachment detached from the hitch (quick hitch 16), and cause the memory and/or the storage 22 to store the management information in which the identification information of the attachment 30 determined as being the not-attached attachment is associated with the storage location information indicating the storage location of the not-attached attachment, the storage location information being the vehicle position information acquired by the position detector 48 when the receiver 23 received the wireless signal.

With the above configuration, the controller 21 is capable of, when an attachment 30 is detached from the hitch (quick hitch 16), determining that the detached attachment 30 is a not-attached attachment, and managing, as the storage location of the not-attached attachment, the vehicle position obtained when the attachment 30 was detached.

(Item A8) The working vehicle 1 according to any one of items A1 to A7, further including a time counter 49, wherein the controller 21 is configured or programmed to cause the memory and/or the storage 22 to store the storage location information associated with time information measured by the time counter 49 when the receiver 23 received the wireless signal.

With the above configuration, it is possible to further associate the time information with the storage location information of the not-attached attachment. This makes it possible to manage the not-attached attachment (attachment 30 not attached to the working vehicle 1), the storage location of the not-attached attachment, and the detached time (the time at which the attachment 30 was detached from the working vehicle 2) which are associated with each other, as management information.

(Item A9) The working vehicle 1 according to any one of items A1 to A5, further including a communicator 24 to perform data communication with an external information processor (server) 80, wherein the controller 21 is configured or programmed to cause the communicator 24 to transmit the management information stored in the memory and/or the storage 22 to the external information processor 80.

With the above configuration, since the management information relating to attachment(s) 30 is transmitted to the external information processor 80, it is possible to manage not-attached attachment(s) in the external information processor 80.

(Item A10) The working vehicle 1 according to item A9, wherein the controller 21 is configured or programmed to cause the communicator 24 to transmit, to the external information processor 80 at one or more first intervals, the vehicle position information, attached attachment information relating to the attachment 30 which is attached, and the management information.

With the above configuration, it is possible to transmit management information at the same time as the vehicle position information and the attached attachment information (information relating to the attachment 30 which is attached) which are transmitted at first intervals to the external information processor 80, making it possible to maintain intermitted communication at first intervals and possible to reduce the communication processing load as compared to continuous communication.

(Item A11) The working vehicle 1 according to item A9 or A10, wherein the controller 21 is configured or programmed to delete, from the memory and/or the storage 22, the vehicle position information, the attached attachment information, and the management information transmitted from the communicator 24 to the external information processor 80.

With the above configuration, the vehicle position information, attached attachment information, and management information are deleted from the storing device 22 after being transmitted, making it possible to keep the storage capacity of the storing device 22.

(Item A12) The working vehicle 1 according to item A10, further including a time counter 49, wherein the controller 21 is configured or programmed to, if determining that the attachment 30 is an attached attachment, cause the memory and/or the storage 22 to store the attached attachment information including information in which the identification information of the attachment 30 determined as being the attached attachment is associated with acting time information relating to the attachment 30, the acting time information being determined by time information measured by the time counter 49 and relating to a time period during which the attachment 30 has been in action.

With the above configuration, the acting time information is associated with the identification information of the attached attachment 30, making it possible to manage the attached attachment 30 and its acting time associated with each other.

(Item A13) The working vehicle 1 according to item A12, further including a hydraulic fluid outlet port **18*a* to supply hydraulic fluid to the attachment 30, wherein the acting time information relating to the attachment 30 is total time information indicating a total time for which hydraulic fluid has been delivered from the hydraulic fluid outlet port 18*a* to the attachment 30**.

With the above configuration, the total time information is associated with the identification information of the attached attachment 30, making it possible to manage the attached attachment 30 and its total time associated with each other.

(Item A14) The working vehicle 1 according to any one of items A1 to A13, wherein the receiver 23 is operable to receive an object wireless signal transmitted from a transmitter 33 in or on an object 110 to be transported by the attachment 30, the object wireless signal includes object information relating to the object 110, and the controller 21 is configured or programmed to, when in a transported-object management mode, determine that a position indicated by the vehicle position information acquired by the position detector 48 when a load on the attachment 30 reached a predetermined value or below is a drop-off position at which the object 110 indicated by the object information included in the object wireless signal was unloaded (dropped off) from the attachment 30.

The above configuration makes it possible for the working vehicle 1 to easily determine the drop-off position of the object 110.

(Item A15) The working vehicle 1 according to item A14, wherein the controller 21 is configured or programmed to switch from an attachment management mode in which the attachment 30 is managed to the transported-object management mode when the identification information of the attachment 30 indicates a specific attachment 30*c* or when a user selects the specific attachment 30*c*, and make a determination regarding the object 110 using the object wireless signal from the object 110 instead of the wireless signal from the attachment 30.

With the above configuration, it is possible to appropriately change the attachment management mode to the transported-object management mode, making it possible to appropriately make a determination regarding the object 110.

(Item A16) The working vehicle 1 according to item A14 or A15, wherein the controller 21 is configured or programmed to cause the memory and/or the storage 22 to store object management information in which the object information and placement information indicating the drop-off position are associated with each other.

With the above configuration, it is possible to store object management information in which the object information is associated with the placement information indicating the drop-off position of the object 110, making it possible to manage the locations of objects 110.

(Item A17) The working vehicle 1 according to item A16, further including a time counter 49, wherein the controller 21 is configured or programmed to cause the memory and/or the storage 22 to store the placement information associated with time information measured by the time counter 49 when the receiver 23 received the object wireless signal.

With the above configuration, it is possible to further associate the time information with the placement information indicating the drop-off position of the object 110. Therefore, the controller 21 is able to manage the object management information in which the object 110, the drop-off position of the object 110, and the time which are associated with each other. That is, the manager is able to know the storage location and the management time of the object 110.

(Item A18) The working vehicle 1 according to item A16, further including a communicator 24 to perform data communication with an external information processor 80, wherein the controller 21 is configured or programmed to cause the communicator 24 to transmit the object management information to the external information processor 80.

With the above configuration, since the object management information is transmitted to the external information processor 80, it is possible to manage object(s) 110 in the external information processor 80.

(Item A19) The working vehicle 1 according to any one of items A1 to A18, further including a communicator 24 to perform data communication with an external information processor 80, wherein the controller 21 is configured or programmed to cause the communicator 24 to transmit, to the external information processor 80 at one or more first intervals, the vehicle position information and attached attachment information relating to the attachment 30 which is attached.

With the above configuration, the vehicle position information and the attached attachment information (information relating to the attachment 39 which is attached) are transmitted at first intervals to the external information processor 80, making it possible to manage the attached attachment in the external information processor 80.

(Item A20) A management system 100 including a working vehicle 1, and an information processor 80 external to the working vehicle 1, wherein the working vehicle 1 includes a prime mover 9, a hitch (quick hitch 16) to attach and detach an attachment 30 thereto and therefrom using power from the prime mover 9, a receiver 23 to receive a wireless signal which is transmitted from a transmitter 33 in or on the attachment 30 and which is compliant with a near field communication standard, a controller 21, a position detector 48 to acquire vehicle position information indicating a position of the working vehicle 1, and a communicator 24 to perform data communication with the external information processor 80, wherein the wireless signal includes identification information and vibration information relating to the attachment 30, the controller 21 is configured or programmed to cause the communicator 24 to transmit, to the external information processor 80 at one or more first intervals, the vehicle position information and attached attachment information relating to the attachment 30 which is attached, and the external information processor 80 is configured or programmed to, when the external information processor 80 stops receiving the vehicle position information and the attached attachment information because of stoppage of the prime mover 9 of the working vehicle 1, store, as storage location information indicating a storage location of the attachment 30 attached to the working vehicle 1, the vehicle position information last received.

With the above configuration, even if the prime mover 9 of the working vehicle 1 stops and the information relating to the attachment 30 attached to the working vehicle 1 (attached attachment information) is not transmitted anymore to the external information processor 80, it is possible to know the storage location of the attachment 30 attached to the working vehicle 1.

(Item A21) The management system 100 according to item A20, further including a portable terminal 90, wherein the external information processor 80 is configured or programmed to cause the communicator 24 to transmit, to the portable terminal 90, the storage location information indicating the storage location of the attachment 30.

With the above configuration, the storage location information indicating the storage location of the attachment 30 stored in the external information processor 80 is transmitted to the portable terminal 90, making it possible to check the storage location of the attachment 30 on the portable terminal 90.

(Item A22) The management system 100 according to item A20 or A21, wherein the external information processor 80 is configured or programmed to, if the external information processor 80 receives the vehicle position information and the attached attachment information at one or more second intervals longer than the one or more first intervals because of stoppage of the prime mover 9 of the working vehicle 1, store, as the storage location information indicating the storage location of the attachment 30 attached to the working vehicle 1, the vehicle position information received at the one or more second intervals.

With the above configuration, even if the working vehicle 1 is configured such that vehicle position information and attached attachment information are transmitted to the external information processor 80 at second intervals longer than the first intervals after the prime mover 9 of the working vehicle 1 stops, it is possible to know the storage location of the attachment 30 attached to the working vehicle 1.

(Item A23) A management system 100 including the working vehicle 1 according to any one of items A1 to A19, and a portable terminal 90, wherein the portable terminal 90 includes a terminal receiver 91 to receive the wireless signal transmitted from the transmitter 33 in or on the attachment 30, a terminal position detector 92 to acquire terminal position information indicating a position of the portable terminal 90, a terminal memory and/or a storage 93, and a terminal controller 94, wherein the terminal controller 94 is configured or programmed to, if the vibration information included in the wireless signal does not indicate vibration of the attachment 30, determine that the attachment 30 from which the wireless signal is transmitted is the not-attached attachment, and generate management information and cause the terminal memory and/or the storage 93 to store the management information, the management information being information in which the identification information of the attachment 30 determined as being the not-attached attachment is associated with storage location information indicating a storage location of the not-attached attachment, the storage location information being the terminal position information acquired by the terminal position detector 92 when the terminal receiver 91 received the wireless signal.

With the above configuration, the terminal controller 94 is able to determine, as a not-attached attachment, the attachment 30 that is present in the vicinity of the working vehicle 1 but is not attached, and store the acquired position of the terminal as the storage location of the not-attached attachment (attachment 30 not attached to the working vehicle 1). This allows the manager to appropriately manage attachment(s) 30 using the management information generated by the portable terminal 90.

(Item A24) The management system 100 according to item A23, wherein the terminal controller 94 is configured or programmed to prepare a storing list including the management information and cause the terminal memory and/or a storage 93 to store the storing list.

With the above configuration, it is possible to manage not-attached attachments using the list of stored attachments 30.

(Item A25) The management system 100 according to item A24, wherein the terminal controller 94 is configured or programmed to exclude, from the storing list, the identification information of the attachment 30 determined as being an attached attachment.

With the above configuration, it is possible to exclude, from the storing list, the attached attachment attached to the working vehicle 1 in operation, making it possible to appropriately manage only not-attached attachment(s).

(Item A26) The management system 100 according to any one of items A23 to A25, wherein the portable terminal 90 includes a terminal time counter 95, and the terminal controller 94 is configured or programmed to associate the identification information of the attachment 30 determined as being the not-attached attachment with time information measured by the terminal time counter 95 when the terminal position detector 92 acquired the terminal position information.

With the above configuration, it is possible to further associate the time information in addition to the position information about the not-attached attachment 30. This makes it possible to manage the not-attached attachment 30, the storage location of the not-attached attachment 30, and the time of determination which are associated with each other.

(Item A27) The management system 100 according to any one of items A24 to A26, wherein the portable terminal 90 includes a terminal communicator 96 to perform data communication with an external information processor 80, and the terminal controller 94 is configured or programmed to cause the terminal communicator 96 to transmit the storing list to the external information processor 80.

With the above configuration, the storing list of the attachment(s) 30 (list of stored attachment(s) 30) is transmitted to the external information processor 80, allowing the external information processor 80 to manage not-attached attachment(s).

(Item A28) The management system 100 according to any one of items A23 to A27, wherein the terminal controller 94 is configured or programmed to determine that the attachment 30 is an attached attachment if the vibration information included in the wireless signal indicates vibration of the attachment 30 and the identification information of the attachment 30 indicated by attached attachment information received by the terminal communicator 96 from the external information processor 80 matches the identification information included in the wireless signal.

With the above configuration, it is possible to determine whether the information indicated by the wireless signal from the attachment 30 (identification information and vibration information) matches the attached attachment information owned by the external information processor 80 (i.e., attached attachment information indicating the attachment 30 attached to the working vehicle 1), making it possible to enhance the determination that the attachment 30 is an attached attachment.

(Item A29) The management system 100 according to item A28, wherein the terminal controller 94 is configured or programmed to determine that the attachment 30 is a moved attachment moved by a carrier if the vibration information included in the wireless signal indicates vibration of the attachment 30 and the identification information of the attachment 30 indicated by the attached attachment information received by the terminal communicator 96 from the external information processor 80 does not match the identification information included in the wireless signal.

With the above configuration, it is possible to determine that the attachment 30 is a moved attachment moved by a carrier if a match with the attached attachment information owned by the external information processor 80 is not confirmed.

(Item A30) The management system 100 according to any one of items A24 to A29, wherein the portable terminal 90 includes a display 97, and the terminal controller 94 is configured or programmed to approve the storing list upon receipt of an instruction to approve the storing list displayed on the display 97 from a user, and correct the storing list upon receipt of an instruction to correct the storing list displayed on the display from the user.

With the above configuration, it is possible to have the storing list approved by the user and manage the approved storing list. It is also possible to reflect user's corrections to the storing list.

(Item A31) The management system 100 according to any one of items A23 to A30, wherein the transmitter 33 includes a beacon transmitter to periodically transmit an advertisement signal including the identification information and the vibration information relating to the attachment 30 in or on which the transmitter 33 is provided, and the terminal receiver 91 includes a beacon scanner to receive the advertisement signal.

With the above configuration, one-way communication from highly versatile beacon transmitter(s) to a highly versatile beacon scanner is performed periodically, making it possible to easily receive identification information and vibration information relating to attachment(s) 30 and possible to appropriately determine whether each attachment is a not-attached attachment using advertisement signal(s) including the identification information and the vibration information.

(Item A32) The management system 100 according to item A31, wherein the terminal controller 94 is configured or programmed to determine whether the attachment 30 from which the advertisement signal is transmitted is the not-attached attachment based on the vibration information included in the advertisement signal received by the terminal receiver 91 in a predetermined period of time from when an instruction to start preparing a storing list was provided.

With the above configuration, it is possible to appropriately determine whether each attachment is a not-attached attachment, using the vibration information included in advertisement signal(s) received in a predetermined period of time from when an instruction to start preparing a list was provided.

(Item A33) The management system 100 according to item A32, wherein the predetermined period of time is an interval at which the advertisement signal is transmitted, the interval starting when the instruction to start preparing the storing list is provided.

With the above configuration, since the predetermined period of time is an interval at which the advertisement signal is transmitted and the interval starts when the instruction to start preparing the list is provided, it is possible to receive advertisement signals from a plurality of attachments 30 reliably at the earliest time and possible to quickly and reliably determine whether each attachment is a not-attached attachment using the advertisement signals including the identification information and the vibration information.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:

a machine body;

a hitch to attach and detach one of one or more attachments selectively thereto and therefrom;

a receiver to receive one or more wireless signals which is/are transmitted from one or more transmitters in or on the one or more attachments and which is/are compliant with a near field communication standard, and measure a received signal strength of each of the received one or more wireless signals;

a position detector to acquire vehicle position information indicating a position of the machine body;

a memory and/or a storage; and a controller; wherein the one or more wireless signals each includes identification information and vibration information relating to the corresponding attachment;

the controller is configured or programmed to, among the one or more wireless signals received by the receiver from the one or more attachments in a vicinity of the machine body, acquire the vibration information included in one or more wireless signals with a received signal strength greater than a first predetermined value, and not acquire the vibration information included in one or more wireless signals with a received signal strength equal to or lower than the first predetermined value;

the controller is configured or programmed to, based on the vibration information, categorize the one or more wireless signals with a received signal strength greater than the first predetermined value into a wireless signal from a transmitter in or on an attachment which vibrated when attached to the hitch and one or more wireless signals from one or more transmitters in or on one or more attachments not attached to the hitch; and the controller is configured or programmed to:

if the vibration information included in any of the one or more wireless signals with a received signal strength greater than the first predetermined value does not indicate vibration of the corresponding attachment, determine that the corresponding attachment from which the wireless signal is transmitted is a not-attached attachment not attached to the hitch; and generate management information and cause the memory and/or the storage to store the management information, the management information being information in which the identification information relating to the corresponding attachment determined as being the not-attached attachment is associated with storage location information indicating a storage location of the not-attached attachment, the storage location information being the vehicle position information acquired by the position detector when the receiver received the wireless signal.

2. The working vehicle according to claim 1, further comprising a first operation switch to be operated to attach one of the one or more attachments to the hitch; wherein the controller is configured or programmed to:

if the first operation switch is operated and the vibration information included in any of the wireless signals with a received signal strength greater than the first predetermined value indicates vibration of the corresponding attachment, determine that the corresponding attachment from which the wireless signal is transmitted is an attached attachment attached to the hitch; and delete the management information relating to the corresponding attachment determined as being the attached attachment.

3. The working vehicle according to claim 2, further comprising a second operation switch to be operated to allow the attached one of the one or more attachments to be detached from the hitch; wherein the controller is configured or programmed to:

if the second operation switch is operated and the vibration information included in the wireless signal from the corresponding attachment determined as being the attached attachment does not indicate vibration of the corresponding attachment, determine that the corresponding attachment from which the wireless signal is transmitted is the not-attached attachment detached from the hitch; and cause the memory and/or the storage to store the management information in which the identification information relating to the corresponding attachment determined as being the not-attached attachment is associated with the storage location information indicating the storage location of the not-attached attachment, the storage location information being the vehicle position information acquired by the position detector when the receiver received the wireless signal.

4. The working vehicle according to claim 1, further comprising a time counter; wherein the controller is configured or programmed to cause the memory and/or the storage to store the storage location information associated with time information measured by the time counter when the receiver received the wireless signal.

5. The working vehicle according to claim 1, further comprising an operation switch to be operated to attach one of the one or more attachments to the hitch and allow the attached one of the one or more attachments to be detached from the hitch; wherein the controller is configured or programmed to:

if the operation switch is operated to attach one of the one or more attachments and the vibration information included in any of the wireless signals with a received signal strength greater than the first predetermined value indicates vibration of the corresponding attachment, determine that the corresponding attachment from which the wireless signal is transmitted is an attached attachment attached to the hitch; and delete the management information relating to the corresponding attachment determined as being the attached attachment.

6. The working vehicle according to claim 5, wherein the controller is configured or programmed to:

if the operation switch is operated to allow the one of the one or more attachments to be detached and the vibration information included in the wireless signal from the corresponding attachment determined as being the attached attachment does not indicate vibration of the corresponding attachment, determine that the corresponding attachment from which the wireless signal is transmitted is the not-attached attachment detached from the hitch; and cause the memory and/or the storage to store the management information in which the identification information relating to the corresponding attachment determined as being the not-attached attachment is associated with the storage location information indicating the storage location of the not-attached attachment, the storage location information being the vehicle position information acquired by the position detector when the receiver received the wireless signal.

7. The working vehicle according to claim 3, further comprising a time counter; wherein the controller is configured or programmed to cause the memory and/or the storage to store the storage location information associated with time information measured by the time counter when the receiver received the wireless signal.

8. The working vehicle according to claim 1, further comprising a communicator to perform data communication with an external information processor; wherein the controller is configured or programmed to cause the communicator to transmit the management information stored in the memory and/or the storage to the external information processor.

9. The working vehicle according to claim 8, wherein the controller is configured or programmed to cause the communicator to transmit, to the external information processor at one or more first intervals, the vehicle position information, attached attachment information relating to the attachment which is attached, and the management information.

10. The working vehicle according to claim 9, wherein the controller is configured or programmed to delete, from the memory and/or the storage, the vehicle position information, the attached attachment information, and the management information transmitted from the communicator to the external information processor.

11. The working vehicle according to claim 9, further comprising a time counter; wherein the controller is configured or programmed to, if determining that one of the one or more attachments is an attached attachment, cause the memory and/or the storage to store the attached attachment information including information in which the identification information relating to the one of the one or more attachments determined as being the attached attachment is associated with acting time information relating to the one of the one or more attachments, the acting time information being determined by time information measured by the time counter and relating to a time period during which the one of the one or more attachments has been in action.

12. The working vehicle according to claim 11, further comprising a hydraulic fluid outlet port to supply hydraulic fluid to the one of the one or more attachments; wherein the acting time information relating to the one of the one or more attachments is total time information indicating a total time for which hydraulic fluid has been delivered from the hydraulic fluid outlet port to the one of the one or more attachments.

13. The working vehicle according to claim 1, wherein the receiver is operable to receive an object wireless signal transmitted from a transmitter in or on an object to be transported by the one of the one or more attachments;

the object wireless signal includes object information relating to the object; and the controller is configured or programmed to, when in a transported-object management mode, determine that a position indicated by the vehicle position information acquired by the position detector when a load on the one of the one or more attachments reached a predetermined value or below is a drop-off position at which the object indicated by the object information included in the object wireless signal was unloaded from the one of the one or more attachments.

14. The working vehicle according to claim 13, wherein the controller is configured or programmed to switch from an attachment management mode in which the one or more attachments are managed to the transported-object management mode when the identification information relating to the one of the one or more attachments indicates a specific attachment or when a user selects the specific attachment, and make a determination regarding the object using the object wireless signal from the object instead of the one or more wireless signals from the one or more attachments.

15. The working vehicle according to claim 13, wherein the controller is configured or programmed to cause the memory and/or the storage to store object management information in which the object information and placement information indicating the drop-off position are associated with each other.

16. The working vehicle according to claim 15, further comprising a time counter; wherein the controller is configured or programmed to cause the memory and/or the storage to store the placement information associated with time information measured by the time counter when the receiver received the object wireless signal.

17. The working vehicle according to claim 15, further comprising a communicator to perform data communication with an external information processor; wherein the controller is configured or programmed to cause the communicator to transmit the object management information to the external information processor.

18. The working vehicle according to claim 1, further comprising a communicator to perform data communication with an external information processor; wherein the controller is configured or programmed to cause the communicator to transmit, to the external information processor at one or more first intervals, the vehicle position information and attached attachment information relating to the attachment which is attached.

19. A management system comprising:

a working vehicle; and an information processor external to the working vehicle; wherein the working vehicle includes:

a machine body;

a prime mover;

a hitch to attach and detach one of one or more attachments selectively thereto and therefrom using power from the prime mover;

a receiver to receive one or more wireless signals which is/are transmitted from one or more transmitters in or on the one or more attachments and which is/are compliant with a near field communication standard, and measure a received signal strength of each of the received one or more wireless signals;

a controller;

a position detector to acquire vehicle position information indicating a position of the machine body; and a communicator to perform data communication with the information processor; wherein the one or more wireless signals each includes identification information and vibration information relating to the corresponding attachment;

the controller is configured or programmed to, among the one or more wireless signals received by the receiver from the one or more attachments in a vicinity of the machine body, acquire the vibration information included in one or more wireless signals with a received signal strength greater than a first predetermined value, and not acquire the vibration information included in one or more wireless signals with a received signal strength equal to or lower than the first predetermined value;

the controller is configured or programmed to, based on the vibration information, categorize the one or more wireless signals with a received signal strength greater than the first predetermined value into a wireless signal from a transmitter in or on an attachment which vibrated when attached to the hitch and one or more wireless signals from one or more transmitters in or on one or more attachments not attached to the hitch;

the controller is configured or programmed to cause the communicator to transmit, to the information processor at one or more first intervals, the vehicle position information and attached attachment information relating to the attachment which is attached; and the information processor is configured or programmed to, when the information processor stops receiving the vehicle position information and the attached attachment information because of stoppage of the prime mover of the working vehicle, store, as storage location information indicating a storage location of the attachment attached to the working vehicle, the vehicle position information last received.

20. The management system according to claim 19, further comprising a portable terminal; wherein the information processor is configured or programmed to cause the communicator to transmit, to the portable terminal, the storage location information indicating the storage location of the attachment.

21. The management system according to claim 19, wherein the information processor is configured or programmed to, if the information processor receives the vehicle position information and the attached attachment information at one or more second intervals longer than the one or more first intervals because of stoppage of the prime mover of the working vehicle, store, as the storage location information indicating the storage location of the attachment attached to the working vehicle, the vehicle position information received at the one or more second intervals.

22. A management system comprising:

the working vehicle according to claim 1; and a portable terminal; wherein the portable terminal includes:

a terminal receiver to receive the one or more wireless signals transmitted from the one or more transmitters in or on the one or more attachments;

a terminal position detector to acquire terminal position information indicating a position of the portable terminal;

a terminal memory and/or a storage; and a terminal controller; wherein the terminal controller is configured or programmed to:

if the vibration information included in any of the one or more wireless signals does not indicate vibration of the corresponding attachment, determine that the corresponding attachment from which the wireless signal is transmitted is the not-attached attachment; and generate management information and cause the terminal memory and/or a storage to store the management information, the management information being information in which the identification information relating to the corresponding attachment determined as being the not-attached attachment is associated with storage location information indicating a storage location of the not-attached attachment, the storage location information being the terminal position information acquired by the terminal position detector when the terminal receiver received the wireless signal.

23. The management system according to claim 22, wherein the terminal controller is configured or programmed to prepare a storing list including the management information and cause the terminal memory and/or a storage to store the storing list.

24. The management system according to claim 23, wherein the terminal controller is configured or programmed to exclude, from the storing list, the identification information relating to one of the one or more attachments determined as being an attached attachment.

25. The management system according to claim 22, wherein the portable terminal includes a terminal time counter; and the terminal controller is configured or programmed to associate the identification information relating to the corresponding attachment determined as being the not-attached attachment with time information measured by the terminal time counter when the terminal position detector acquired the terminal position information.

26. The management system according to claim 23, wherein the portable terminal includes a terminal communicator to perform data communication with an external information processor; and the terminal controller is configured or programmed to cause the terminal communicator to transmit the storing list to the external information processor.

27. The management system according to claim 26, wherein the terminal controller is configured or programmed to determine that one of the one or more attachments is an attached attachment if the vibration information included in the corresponding wireless signal indicates vibration of the one of the one or more attachments and the identification information relating to one of the one or more attachments indicated by attached attachment information received by the terminal communicator from the external information processor matches the identification information included in the corresponding wireless signal.

28. The management system according to claim 27, wherein the terminal controller is configured or programmed to determine that one of the one or more attachments is a moved attachment moved by a carrier if the vibration information included in the corresponding wireless signal indicates vibration of the one of the one or more attachments and the identification information relating to one of the one or more attachments indicated by the attached attachment information received by the terminal communicator from the external information processor does not match the identification information included in the corresponding wireless signal.

29. The management system according to claim 23, wherein the portable terminal includes a display; and the terminal controller is configured or programmed to approve the storing list upon receipt of an instruction to approve the storing list displayed on the display from a user, and correct the storing list upon receipt of an instruction to correct the storing list displayed on the display from the user.

30. The management system according to claim 22, wherein the one or more transmitters include one or more beacon transmitters to periodically transmit one or more advertisement signals including the identification information and the vibration information relating to the one or more attachments in or on which the one or more transmitters is/are provided; and the terminal receiver includes a beacon scanner to receive the one or more advertisement signals.

31. The management system according to claim 30, wherein the terminal controller is configured or programmed to determine whether each of the one or more attachments from which the one or more advertisement signals are transmitted is the not-attached attachment based on the vibration information included in the one or more advertisement signals received by the terminal receiver in a predetermined period of time from when an instruction to start preparing a storing list was provided.

32. The management system according to claim 31, wherein the predetermined period of time is an interval at which each of the one or more advertisement signals is transmitted, the interval starting when the instruction to start preparing the storing list is provided.

* * * * *